United States Patent
Ishii

(10) Patent No.: US 12,532,232 B2
(45) Date of Patent: Jan. 20, 2026

(54) HANDOVER PROCEDURE FOR SOFT CELL IDENTITY CHANGE

(71) Applicant: SHARP KABUSHIKI KAISHA, Osaka (JP)

(72) Inventor: Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 393 days.

(21) Appl. No.: 18/064,979

(22) Filed: Dec. 13, 2022

(65) Prior Publication Data

US 2024/0196283 A1 Jun. 13, 2024

(51) Int. Cl.
*H04W 36/00* (2009.01)

(52) U.S. Cl.
CPC ... *H04W 36/0061* (2013.01); *H04W 36/0079* (2018.08)

(58) Field of Classification Search
CPC ............... H04W 36/0061; H04W 36/0079
See application file for complete search history.

(56) References Cited

U.S. PATENT DOCUMENTS

| | | | | |
|---|---|---|---|---|
| 2010/0103845 A1* | 4/2010 | Ulupinar | ............... | H04L 69/22 370/254 |
| 2014/0038616 A1* | 2/2014 | Burbidge | .......... | H04W 36/0079 455/442 |
| 2014/0301371 A1 | 10/2014 | Maeda et al. | | |
| 2015/0050933 A1* | 2/2015 | Saily | ................. | H04W 36/0085 455/435.1 |
| 2015/0156686 A1 | 6/2015 | Kikuchi | | |
| 2016/0198377 A1* | 7/2016 | Centonza | ........ | H04W 36/00837 370/331 |
| 2023/0292201 A1 | 9/2023 | Ishii et al. | | |
| 2023/0300697 A1 | 9/2023 | Ishii | | |
| 2023/0308978 A1 | 9/2023 | Sugiyama et al. | | |
| 2024/0056910 A1* | 2/2024 | Eklöf | .............. | H04W 36/00692 |

OTHER PUBLICATIONS

3GPP TR 22.839 V18.1.0 (Dec. 2021) 3rd Generation Partnership Project; Technical Specification Group Services and System Aspects; Study on Vehicle-Mounted Relays; Stage 1 (Release 18).

(Continued)

*Primary Examiner* — Kibrom T Hailu
(74) *Attorney, Agent, or Firm* — NIXON & VANDERHYE P.C.

(57) ABSTRACT

A wireless terminal of a cellular telecommunication system communicates with a first cell served by a mobile base station relay. The wireless terminal comprises receiver circuitry and processor circuitry. The receiver circuitry is configured to receive, from the first cell, a reconfiguration message comprising second cell information including a cell identity and an operating frequency of a second cell and an indication indicating whether or not the first cell will be replaced by the second cell. The processor circuitry is configured to: (1) perform, based on the reconfiguration message, a handover procedure to handover to the second cell, and (2) perform a cell selection procedure in a case that the handover procedure fails. During the cell selection procedure, the first cell is not considered as a candidate in a case that the indication indicates that the first cell will be replaced by the second cell.

12 Claims, 47 Drawing Sheets

(56) References Cited

OTHER PUBLICATIONS

3GPP TS 38.304 V17.1.0 (Jun. 2022) 3rd Generation Partnership Project; Technical Specification Group Radio Access Network; NR; User Equipment (UE) procedures in Idle mode and RRC Inactive state (Release 17).
3GPP TS 38.331 V17.1.0 (Jun. 2022) 3rd Generation Partnership Project; Technical Specification Group Radio Access Network; NR; Radio Resource Control (RRC) protocol specification (Release 17).
U.S. Appl. No. 18/475,114, filed Sep. 2023, Ishii.

* cited by examiner

| RECEIVING NEIGHBORING CELL INFORMATION FROM A SERVING CELL INCLUDING AN INDICATION WHETHER OR NOT THE SERVING CELL WILL BE REPLACED BY THE NEIGHBORING CELL | 36-1 |

↓

| PERFORMING, BASED ON THE NEIGHBORING CELL INFORMATION, A CELL RESELECTION PROCEDURE IN WHICH (1) ONE OR MORE MEASUREMENTS TO FIND THE NEIGHBORING CELL ARE PERFORMED BASED ON THE INDICATION, AND (2) A DECISION TO RESELECT THE NEIGHBORING CELL IS PERFORMED BASED ON THE INDICATION | 36-2 |

*Fig. 36*

| GENERATING OR OBTAINING NEIGHBORING CELL INFORMATION FROM A SERVING CELL INCLUDING AN INDICATION WHETHER OR NOT THE SERVING CELL WILL BE REPLACED BY THE NEIGHBORING CELL | 37-1 |

↓

| TRANSMITTING THE NEIGHBORING CELL INFORMATION TO THE WIRELESS TERMINAL | 37-2 |

*Fig. 37*

HANDOVER PROCEDURE FOR SOFT CELL IDENTITY CHANGE

TECHNICAL FIELD

The technology relates to wireless communications, and particularly to mobile base stations and operations thereof.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 58, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE, and is connected via the NG interface to the 5GC. The 5G NR, New Radio, gNB is connected to AMF, Access and Mobility Management Function, and UPF, User Plane Function, in the 5GC, 5G Core Network.

In certain urban environments, installing additional base stations on buildings or other infrastructure sites may face typical deployment challenges and burdens, such as real estate availability and costs, or constraining regulations. In the same urban environments, in conjunction with the high density of users, one can also expect the presence and availability of many vehicles around, e.g., for public/private passengers transportation, goods delivery, food trucks etc., typically moving at low/pedestrian speed (or temporarily stationary). Some of the vehicles can follow a certain known/predictable itinerary (e.g., buses or trams, etc.), or be situated in specific locations (e.g., outside stadiums), through or around areas where extra cellular coverage and capacity would be needed. Those vehicles would indeed offer a convenient and efficient place in which to install on board base stations acting as relays, for providing 5G coverage and connectivity to neighboring UEs outside the vehicle. Vehicle relays are obviously very suitable and optimal for connecting users or devices inside the vehicle itself, not only in urban areas but also other environments and vehicle speeds, e.g. for passengers in buses, car/taxi, or trains. In other scenarios, e.g., during an outdoor sport race or pedestrian events, vehicles equipped with relays could conveniently move along with users or devices that are outside the vehicle and provide service to them.

The technical benefits of using vehicle relays may include, among others, the ability of the vehicle relay to get better macro coverage than the nearby UE, thanks to better RF/antenna capabilities, thus providing the UE with a better link to the macro network. Additionally, a vehicle relay is expected to have less stringent power or battery constraints than UEs.

In 3rd Generation Partnership Project, 3GPP, a study on vehicle-mounted relays, VMRs, has started to analyze gaps between the existing functionalities and required functionalities. During the study, it is assumed that a VMR will provide the 5G radio interface, NR-Uu interface, to UEs. This means that the VMR will be equipped with base station, e.g., gNB, functionalities to serve one or more cells, and the coverage of the one or more cells may move geographically.

What is needed are, e.g., methods, apparatus, and/or techniques to deal with challenges caused by the mobility of base stations.

SUMMARY

In one of its example embodiment and modes, the technology disclosed herein concerns a wireless terminal of a cellular telecommunication system. The wireless terminal communicates with a first cell served by a mobile base station relay. The wireless terminal comprises receiver circuitry and processor circuitry. The receiver circuitry is configured to receive, from the first cell, a reconfiguration message comprising second cell information including a cell identity and an operating frequency of a second cell and an indication indicating whether or not the first cell will be replaced by the second cell. The processor circuitry is configured to: (1) perform, based on the reconfiguration message, a handover procedure to handover to the second cell, and (2) perform a cell selection procedure in a case that the handover procedure fails. During the cell selection procedure, the first cell is not considered as a candidate in a case that the indication indicates that the first cell will be replaced by the second cell. Methods of operating such wireless terminals are also disclosed.

In another example embodiment and mode, the technology disclosed herein concerns an access node of a cellular telecommunication system. The access node serves a wireless terminal via a first cell served by a mobile base station relay. The access node comprises processor circuitry and transmitter circuitry. The processor circuitry is configured to generate a reconfiguration message comprising second cell information including a cell identity and an operating frequency of a second cell and an indication indicating whether or not the first cell will be replaced by the second cell. The transmitter circuitry is configured to transmit, via the mobile base station relay, to the wireless terminal, the reconfiguration message. In a case that the indication indicates that the first cell will be replaced by the second cell, the first cell is not considered as a candidate during a cell selection procedure performed by the wireless terminal, the cell selection procedure being initiated after a failure of a handover procedure directed by the reconfiguration message. Methods of operating such access nodes are also disclosed.

In yet other example embodiments and modes, the technology disclosed herein concerns a mobile base station relay of a cellular telecommunication system. The mobile base station relay communicates with an access node and serves a wireless terminal via a first cell. The mobile base station relay comprises receiver circuitry and transmitter circuitry. The receiver circuitry is configured to receive, from the access node, a reconfiguration message comprising second cell information including a cell identity and an operating frequency of a second cell and an indication indicating whether or not the first cell will be replaced by the second cell. The transmitter circuitry is configured to transmit, to the wireless terminal, via the first cell, the reconfiguration message. In a case that the indication indicates that the first cell will be replaced by the second cell, the first cell is not considered as a candidate during a cell selection procedure performed by the wireless terminal, the cell selection procedure being initiated after a failure of a handover procedure directed by the reconfiguration message.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 36 is a flowchart view showing representative, example steps or acts performed by an example wireless terminal of the communications system of the example embodiment and mode of FIG. 34.

FIG. 37 is a flowchart view showing representative, example steps or acts performed by an example mobile station relay of the communications system of the example embodiment and mode of FIG. 34.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

1.0 Introduction: Generic Network Architecture and Operation

Figure 1:
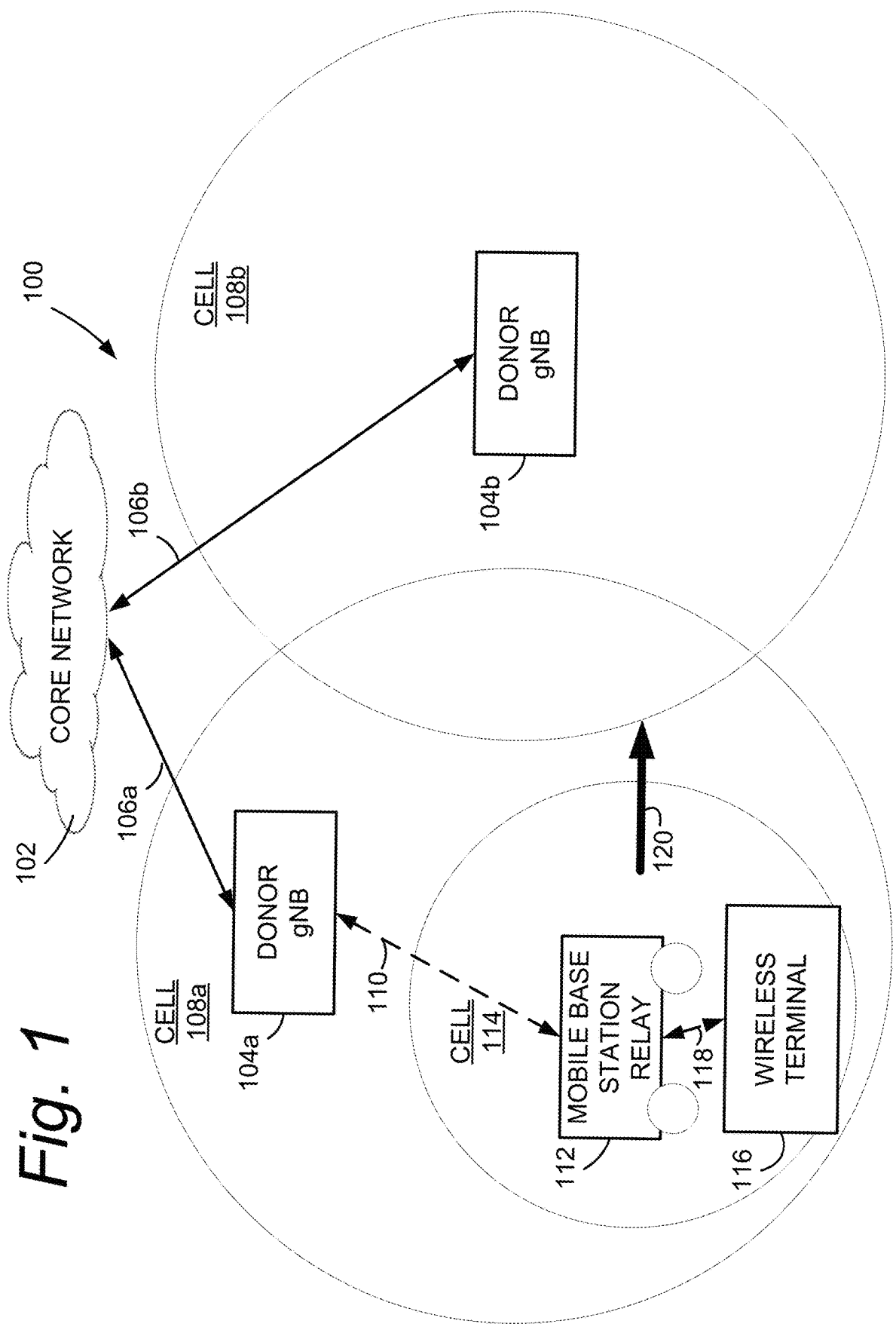
FIG. 1 is a diagrammatic view of a communications system showing both a core network and radio access network, with the radio access network including a mobile base station relay.

FIG. 1 shows a system diagram of an example 5G network 100 which comprises a vehicle-mounted relay. The 5G network 100 also comprises a core network 102 connected to one or more radio access network (RAN) nodes, such as Donor gNB 104a and donor gNB 104b, which are connected to the core network 102 by wirelines 106a and 106b, respectively. The donor gNB 104a serves at least one cell 108a. Likewise, the donor gNB 104b serves at least one cell 108b.

FIG. 1 also shows a mobile base station relay 112, which may be mounted on a vehicle. The mobile base station relay is illustrated by way of example as being under or within the coverage of the cell 108a and connected to the donor node 104b via a wireless backhaul link 110. The mobile base station relay 112 serves at least one cell 114. A wireless terminal 116 is served via a wireless access link 118. The wireless terminal 116 may be, for example, a user equipment (UE), an integrated access and backhaul (JAB) node or another mobile station relay.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN.

A core network, CN, such as core network (CN) 102 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, core network (CN) 102 may comprise one or more management entities, which may be an Access and Mobility Management Function, AMF.

A radio access network, RAN, typically comprises plural access nodes, one example access nodes 104a, 104b, and 112 being illustrated in FIG. 1. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, for a UE in IDLE Mode, a "serving cell" is a cell on which the wireless terminal in idle mode is camped. See, e.g., 3GPP TS 38.304. For a UE in RRC_CONNECTED not configured with carrier aggregation, CA/dual connectivity, DC, there is only one serving cell comprising the primary cell. For a UE in RRC_CONNECTED configured with CA/DC the term 'serving cells' is used to denote the set of cells comprising of the Special Cell(s) and all secondary cells. See, e.g., 3GPP TS 38.331.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

The wireless terminal communicates with its serving radio access network over a radio or air interface. Communication between radio access network (RAN) 22 and wireless terminal over the radio interface occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element, RE, is the smallest time-frequency unit for downlink transmission in the subframe. That is, one symbol on one sub-carrier in the subframe comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of 2 slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

As understood from the foregoing, the radio access network in turn communicates with one or more core networks (CN) 102 over a RAN-CN interface (e.g., N2 interface).

In a typical deployment scenario, the cell 108a or 108b may be a macro cell, and thus may, if so needed or so planned, cover a relatively large area. On the other hand, the coverage of the cell 114 served by the mobile base station relay 112 may be smaller in extent, e.g., limited to inside the vehicle and/or a nearby area, for example.

In some configurations, the 5G system 100 may perform mobility management functions for the wireless backhaul link 110 of the mobile base station relay 112. Such mobility management functions may include, for example, handovers and connection establishment/re-establishment operations, e.g., connection establishment/re-establishment. In a mobility situation such as that shown in FIG. 1, as the mobile base station relay 112 moves from the coverage of the cell 108a towards the coverage of the cell 108b as depicted by arrow 120, the mobile base station relay 112 may report measurement reports comprising information with regard to absolute/relative signal strength/quality of the signals from the donor gNB 104a and the donor gNB 104b. Based on the measurement reports, the donor gNB 104a may initiate a handover procedure to handover the mobile base station relay 112 to the donor gNB 104b as a target gNB. Meanwhile, in a case that the wireless terminal 116 keeps a proximity to the mobile base station relay 112, the wireless terminal 116 may not be aware of the handover on the wireless backhaul link 110. An example of the wireless terminal 116 keeping a proximity to mobile base station relay 112 is the wireless terminal 116 being inside the vehicle.

Figure 2:
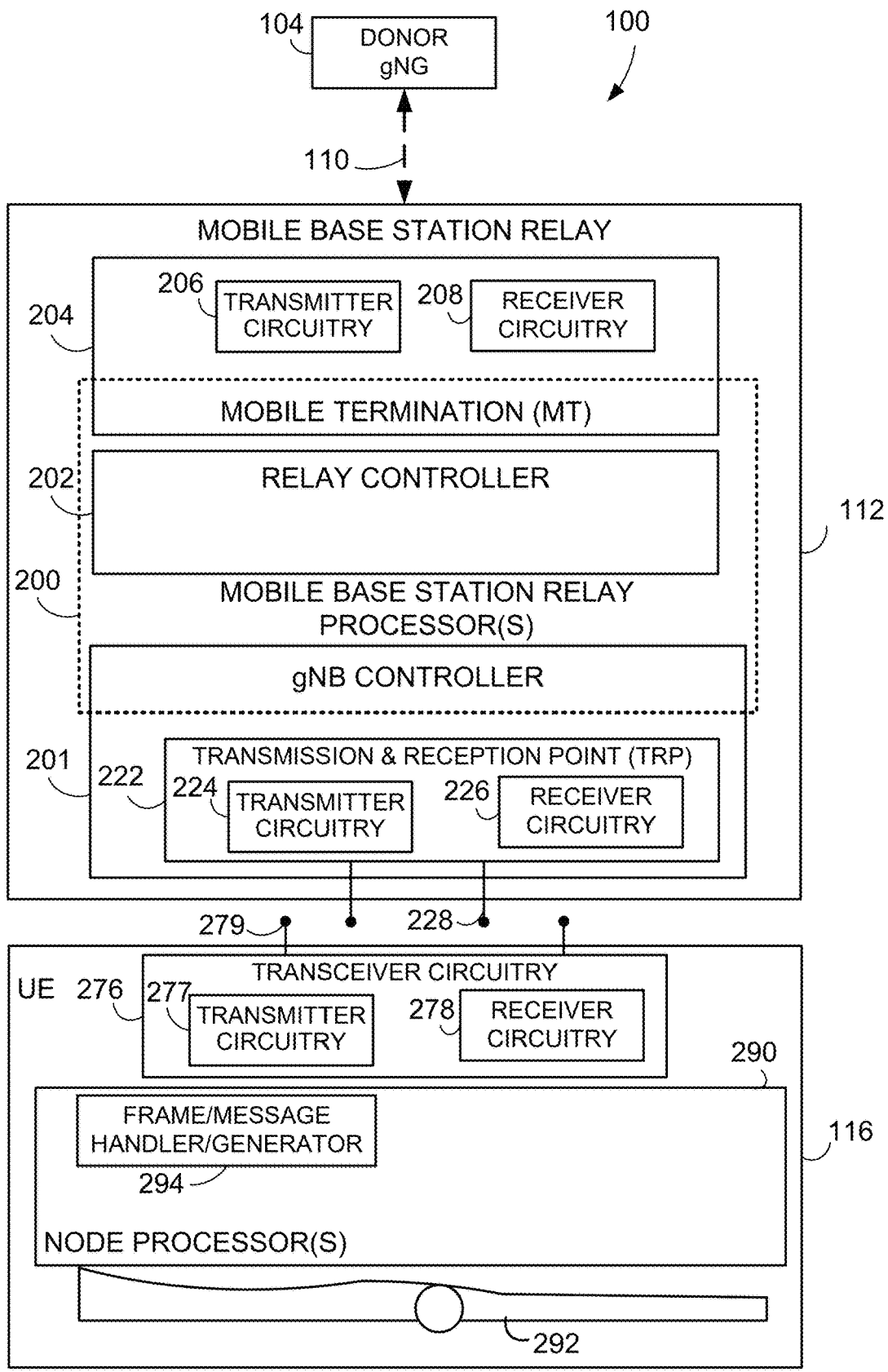
FIG. 2 is a schematic view of nodes of the communications system of FIG. 1, including an example donor node, an example mobile base station relay node, and a wireless terminal node according to an example embodiment and mode.

FIG. 2 shows an example embodiment and mode of an example, representative and generic mobile base station relay 112 and example, representative wireless terminal 116 or UE, such as those depicted in FIG. 1. As shown in FIG. 2, mobile base station relay 112 may comprise one or more mobile station relay processors or mobile station processor circuitry, shown generically as mobile station relay processor 200.

In addition, mobile base station relay 112 may comprise gNB function 201, relay function 202, and mobile termination (MT) function 204. The gNB function 201 may also be referred to herein as gNB controller 201; the relay function 202 may also be referred to herein as relay controller 202; the mobile termination (MT) function 204 may also be referred to herein as mobile termination (MT) controller 204.

The MT function 204 may further comprise transmitter circuitry and receiver circuitry, e.g., transmitter 206 and receiver 208 for the upstream link. The uplink stream may be the wireless backhaul link 110 to cell 114, for example. The MT function 204 may be responsible for maintaining a connection with a donor gNB 114, e.g., the donor gNB 114a or 114b in FIG. 1, for which reason donor gNB is generically labeled as gNB 114 in FIG. 2. In a case that the aforementioned NR-Uu interface is used for the wireless backhaul link 110, the functionality of the MT function 204 may be similar to that of a UE.

The gNB function 201 may further comprise at least one transmission and reception point (TRP) 222. The transmission and reception point (TRP) 222 may further comprise transmitter circuitry and receiver circuitry, e.g., at least one transmitter 224, at least one receiver 226 and one or more antennas 228 for the downstream link, e.g., the wireless access link 118. The gNB function 201 may behave like a regular gNB and may be responsible for managing the cell 114 to serve the wireless terminal 116. The relay function 202 may perform relaying user data and/or signaling traffic from the downstream link to the upstream link, and vice versa.

FIG. 2 also shows various example constituent components and functionalities of wireless terminal 116. For example, FIG. 2 shows wireless terminal 116 as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 2 further shows wireless terminal 116 also comprising wireless terminal processor circuitry, e.g., one or more wireless terminal processor(s) 290. The wireless terminal 116, e.g., wireless terminal processor(s) 290, may comprise frame/message generator/handler 294. As is understood by those skilled in the art, in some telecommunications system messages, signals, and/or data are communicated over a radio or air interface using one or more "resources", e.g., "radio resource(s)".

The wireless terminal 116 may also comprise interfaces 292, including one or more user interfaces. Such user interfaces may serve for both user input and output operations and may comprise (for example) a screen such as a touch screen that can both display information to the user and receive information entered by the user. The user interface 292 may also include other types of devices, such as a speaker, a microphone, or a haptic feedback device, for example.

It should be understood that the mobility of the cell 114 means that the at least one TRP 222 serving the cell 114 moves geographically at least at some point in time, e.g., the mobile base station relay 112 with its transmission and reception point (TRP) 222 need not always be at a fixed location. The mobility of the TRP 222, when the mobile base station relay 112 moves, causes coverage of the cell 114 to move as well. The mobility may not include a change on the range of the cell while the TRP is at a fixed location.

2.0 Serving Cell Mobility Information: Overview

Figure 3:
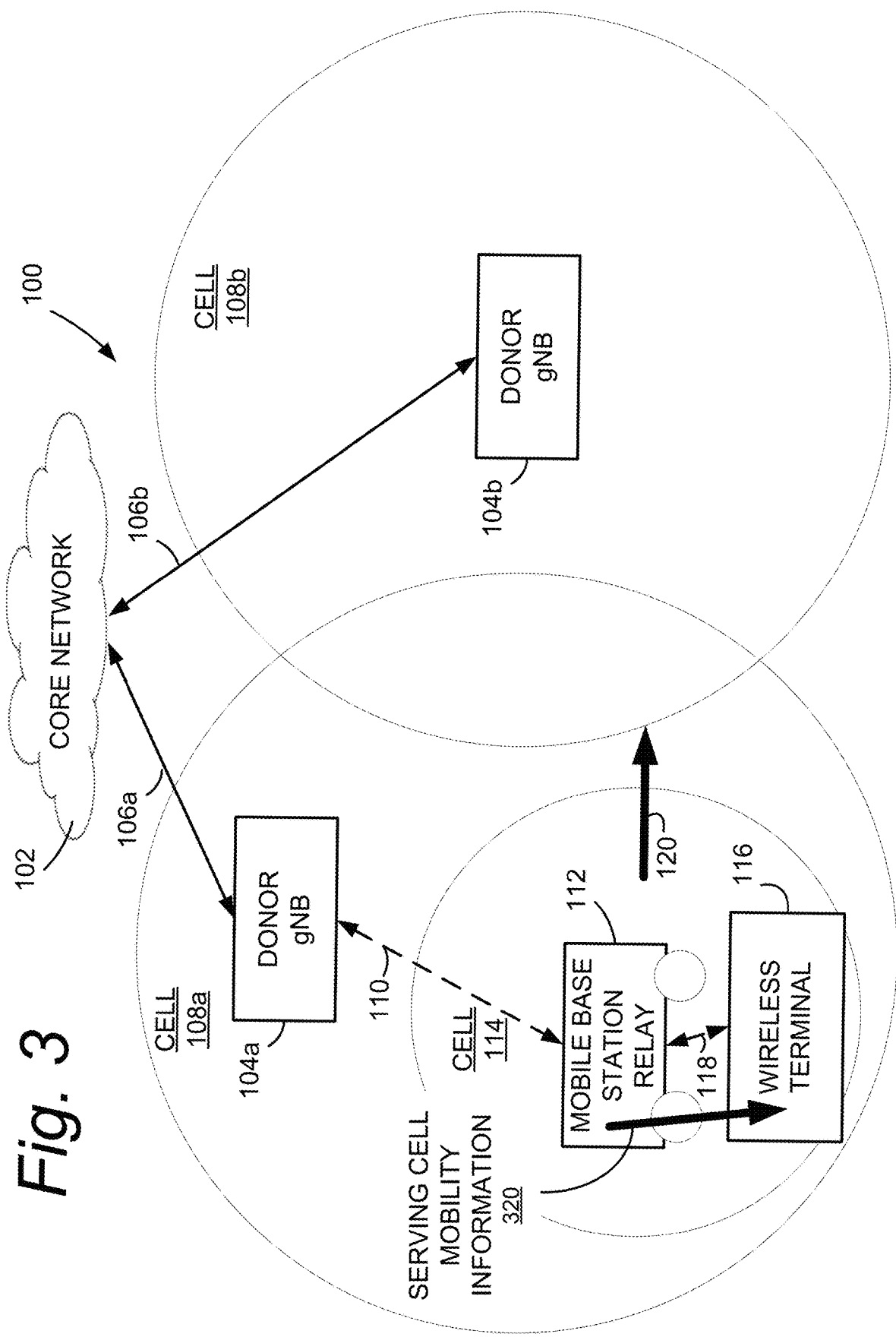
FIG. 3 is a diagrammatic view of a communications system showing both a core network and radio access network, with the radio access network including a mobile base station relay which transmits serving cell mobility information.
Figure 4:
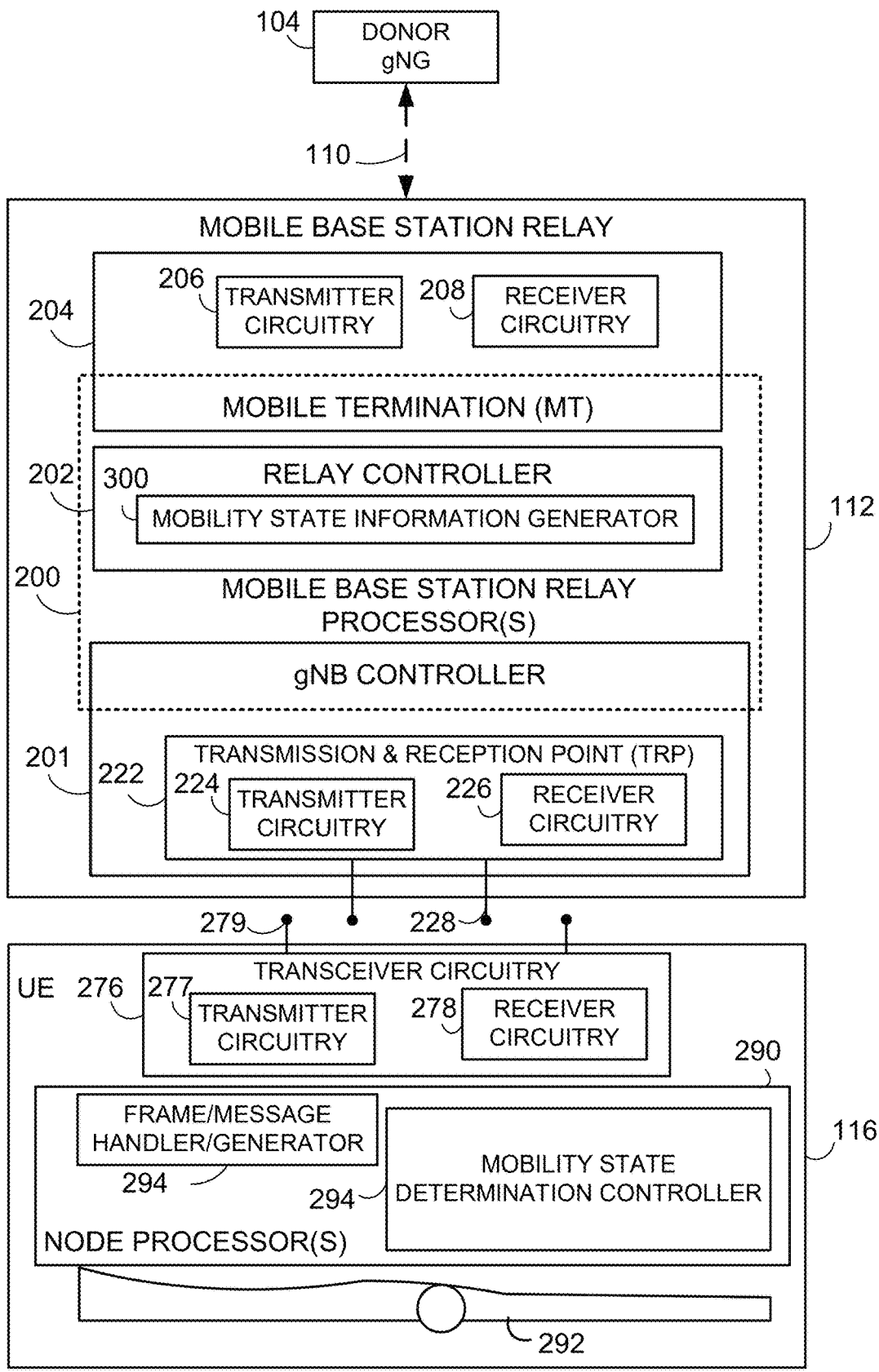
FIG. 4 is a schematic view of example structures and functionalities of an example communications system such as that of FIG. 3 and wherein a mobile base station relay node provides serving cell mobility information to one or more wireless terminals.

FIG. 3 illustrates an exemplary scenario of an example embodiment and mode. FIG. 4 shows structure and functionalities of nodes which may participate in the example scenario of FIG. 3. The structure and functionalities of the example embodiment and mode of FIG. 3 and FIG. 4 are essentially the same as those shown by corresponding reference numerals in FIG. 1 and FIG. 2, unless otherwise noted or evident from the context. In a conventional cellular system, such as Long-Term Evolution (LTE), cells served by base stations are designed to be stationary. Based on this principle, a wireless terminal performs various procedures, including cell selection/reselection, measurements, registrations and handovers. By the introduction of mobile base station relays, such as the mobile base station relay 112 of FIG. 3 and FIG. 4, e.g., in the manner understood with reference to FIG. 1 and FIG. 2, for example, mobility of cells may possibly affect behaviors of wireless terminals, such as the wireless terminal 116 of FIG. 3 and FIG. 4.

In the example embodiment and mode of FIG. 3 and FIG. 4, mobile base station relay 112 includes mobility state information generator 300. With its mobility state information generator 300 the mobile base station relay 112 may inform the wireless terminal 116 of information regarding its mobility, e.g., mobility of the mobile base station relay 112. The information regarding mobility of mobile base station relay 112, which the cell 114 through mobile base station relay 112 provides, is herein referred as "serving cell mobility information", or "serving cell mobility information 320". Specifically, the cell 114 of FIG. 3 may transmit the serving cell mobility information 320 to the wireless terminal 116. As shown in FIG. 4, the mobile base station relay 112 may comprise mobility state information generator 300 which generates and/or stores the serving cell mobility information which mobile base station relay 112 provides to wireless terminal 116. The mobility state information generator 300 may comprise or be realized by mobile station relay processor 200, e.g., by relay controller 202. The mobility state information generator 300 may obtain the serving cell mobility information which it transmits in one or more of several ways. For example, the mobility state information generator 300 may obtain the serving cell mobility information from pre-configured information, from configured information received from the donor gNB or the core network, or from a device which may be equipped in the vehicle that detects and/or monitors the mobility and optionally other parameters or characteristics of the vehicle and its travel.

Upon receipt by wireless terminal 116, the serving cell mobility information 320 may be used by the wireless terminal 116 to determine mobility state of the cell that the wireless terminal 116 is camping on or attempts to camp on. FIG. 4 thus further shows wireless terminal 116 as comprising mobility state determination controller 330. The mobility state determination controller 330 may process and may act upon the serving cell mobility information received by wireless terminal 116 through transceiver circuitry 276. For example, the serving cell mobility information 320 may be further used by applications and/or processes running on the wireless terminal 116. One example of usage for the cell mobility information is disclosed in a cell reselection determination or procedure, as described with reference to the example embodiment and mode of FIG. 11-FIG. 14, for example.

2.1 Serving Cell Mobility Information: Manner of Transmission

The serving cell mobility information 320 may be broadcasted in the cell 114 via system information. In this case, the serving cell mobility information 320 may be included in Master Information Block (MIB), System Information Block Type 1 (SIB1) and/or other system information blocks (SIBs), per 3GPP TS 38.331. See, e.g., 3GPP TS 38.331 V16.2.0 (2020-09), 3rd Generation Partnership Project; Technical Specification Group Radio Access Network; NR; Radio Resource Control (RRC) protocol specification (Release 16), which is incorporated herein by reference in its entirety and hereinafter also referred to as "3GPP TS 38.331".

Additionally or alternatively, the serving cell mobility information 320 may be transmitted to the wireless terminal 116 via a dedicated signaling, such as Radio Resource Control (RRC) signaling per 3GPP TS38.331. In the case of the RRC dedicated signaling, an RRC message, such as an RRCReconfiguration message or an RRCRelease message may be used. Other types of signaling may also be utilized.

2.2 Serving Cell Mobility Information: Contents

The serving cell mobility information 320 may include one or more attributes or elements to represent the mobility state of the serving cell. These attributes may be included in information elements of a message in which the serving cell mobility information 320 is transmitted.

In one example implementation, one of such attributes may be a cell mobility indicator as a Boolean value, indicating whether or not the cell is "mobile". For example, a base station mounted on a vehicle to move, such as a bus, a train and a taxi, may set to a value or symbol indicative of the cell being "mobile", e.g., the cell mobility indicator may be set to "mobile". For a stationary base station, or a base station mounted on a vehicle but not to move (stationary), such as a temporary base station equipped in a van for an event, the cell mobility indicator may be set with "stationary" (or "fixed" or "not mobile"), or alternatively, the cell mobility indicator may not be present in the system information. Listing 1 shows an example implementation of an example cell mobility indicator, cellMobilityIndicator, comprised in the MIB, e.g., which may be included in the Master Information Block (MIB). The wireless terminal 116 that receives the MIB may determine whether or not the cell is "mobile", e.g., served by a mobile base station relay, based on the cell mobility indicator.

Listing 1

```
MIB ::=                      SEQUENCE {
    systemFrameNumber            BIT STRING (SIZE (6)),
    subCarrierSpacingCommon      ENUMERATED {scs15or60,
scs30or120},
    ssb-SubcarrierOffset         INTEGER (0..15),
    dmrs-TypeA-Position          ENUMERATED {pos2, pos3},
    pdcch-ConfigSIB1             PDCCH-ConfigSIB1,
    cellBarred                   ENUMERATED {barred, notBarred},
    intraFreqReselection         ENUMERATED {allowed,
                                 notAllowed},
    cellMobilityIndicator        ENUMERATED {mobile,
                                 stationary}
}
-- TAG-MIB-STOP
-- ASN1STOP
```

In another example implementation, preferably in a case that the MIB is used, the serving cell mobility information 320 may comprise a range of physical cell identities, PCIs. In the 5G cellular system, there are 1,008 unique PCIs available in the system, and one of the PCIs is encoded in a primary synchronization signal (PSS) and a secondary synchronization signal (SSS) broadcasted in a cell. In this implementation, a selected set of PCIs or a range of PCIs may be reserved for mobile base station relays, herein referred as "reserved PCIs". Upon selecting a cell, the wireless terminal 116 may decode the PSS and the SSS to obtain the PCI of the cell, and then determine if the PCI is included in the reserved PCIs. If the determination is positive, the wireless terminal 116 may consider that the cell is "mobile", otherwise the cell is "stationary", e.g., a conventional cell. In one exemplary implementation, the reserved PCIs may be pre-determined or pre-configured to the wireless terminal 116. In another exemplary implementation, a list of the reserved PCIs may be broadcasted in system information, such as MIB, SIB1 and/or other SIB(s), and thus received by and known to wireless terminal 116.

In addition, the one or more attributes representing the mobility state of the serving cell may further include, but not be limited to, one or more of the following:
  (1) current moving state, e.g., currently moving, currently not moving, capable of moving, etc;
  (2) speed, e.g., velocity, or class of speed, e.g., high, mid or low;
  (3) a direction of moving; and
  (4) a current position of the cell, e.g., the location of the TRP.

A stationary cell, such as the cell 108a and the cell 108b, may choose to broadcast or not to broadcast the serving cell mobility information 320 for itself. In a case of such a stationary cell choosing to broadcast the serving cell mobility information for itself, the serving cell mobility information 320 may indicate the mobility state as being "stationary". In a case of such a stationary cell choosing not to broadcast, a wireless terminal, such as the wireless terminal 116 of FIG. 3, may consider the cell as "stationary", even though no cell mobility information is specifically received.

2.3 Serving Cell Mobility Information: Operation

Figure 5:
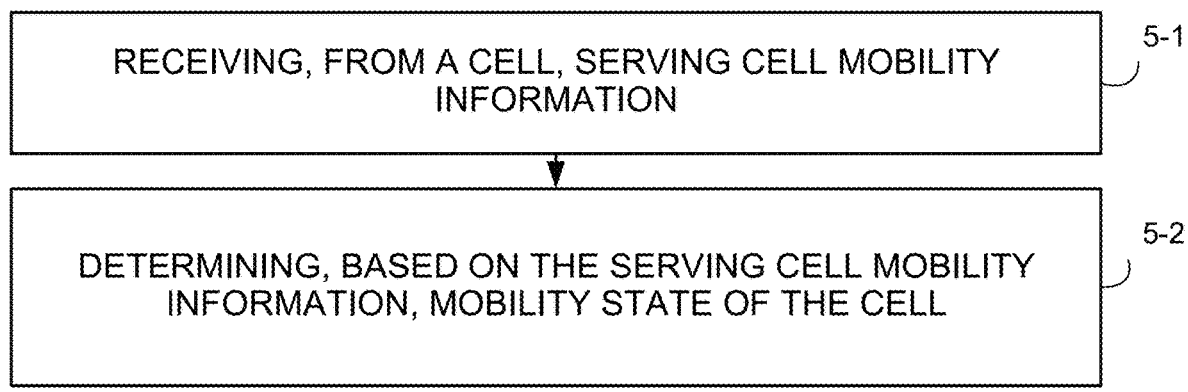
FIG. 5 is a flowchart view showing representative, example steps or acts performed by a wireless terminal of the communications system of the example embodiment and mode of FIG. 3.

FIG. 5 is a flow chart showing example, representative, generic basic steps or acts performed by a wireless terminal of the example embodiment and mode of FIG. 3. Act 5-1 comprises receiving, from a cell, serving cell mobility information, such as the serving cell mobility information 320 of FIG. 3. In one example implementation, the serving cell mobility information may be included in a signal(s) broadcasted by the cell, such as a master information block (MIB), a system information block (SIB), and/or primary/secondary synchronization signals (PSS/SSS). In another example implementation, the serving cell mobility information may be included in a dedicated signaling, such as a radio resource control (RRC) message. Act 5-2 comprises determining, based on the serving cell mobility information, mobility state of the cell. The mobility state determination of act 5-2 may be performed by the mobile station relay processor 200, e.g., by mobility state determination controller 300. The mobility state of the cell may indicate whether or not at least one transmission and reception point (TRP) serving the cell geographically moves. For example, the cell mobility information for serving cell may set to "mobile" in a case a base station serving the cell is a mobile base station relay. Whereas the cell mobility information for serving cell may set to "stationary" in a case a base station serving the cell is a fixed base station, e.g., a fixed TRP. Although not specifically shown in FIG. 5, it is understood that the wireless terminal 116 may perform further operations based on the received serving cell mobility information. Such further operations may include a cell reselection determination/procedure as described with reference to the example embodiment and mode of FIG. 11-FIG. 14, for example.

Figure 6:
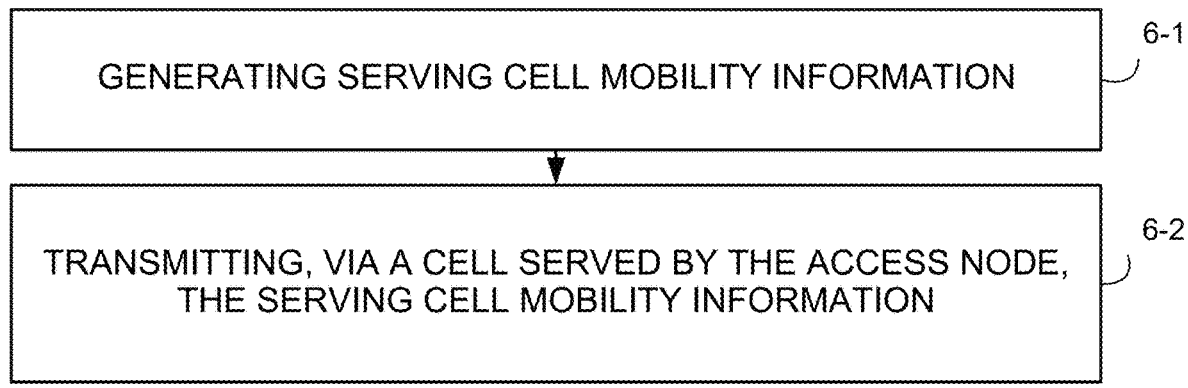
FIG. 6 is a flowchart view showing representative, example steps or acts performed by a mobile base station relay node of the communications system of the example embodiment and mode of FIG. 3.

FIG. 6 is a flow chart showing example representative, generic basic steps or acts performed by an access node of the example embodiment and mode of FIG. 3, e.g., the mobile base station relay 112 of FIG. 3 or a stationary/fixed base station such as the donor gNB 104a/104b of FIG. 3. Act 6-1 comprises generating serving cell mobility information, such as the serving cell mobility information 320 of FIG. 3. Act 6-2 comprises transmitting, via a cell served by the access node, the serving cell mobility information. As mentioned above, in one example implement, the serving cell mobility information may be included in a signal(s) broadcasted by the cell, such as a master information block (MIB), a system information block (SIB), and/or primary/secondary synchronization signals (PSS/SSS). In another example implement, the serving cell mobility information may be included in a dedicated signaling, such as a radio resource control (RRC) message. The serving cell mobility information may be used by a wireless terminal 116 to determine mobility state of the cell. The mobility state of the cell may indicate whether or not at least one transmission and reception point (TRP) serving the cell geographically moves. For example, the serving cell mobility information may set to "mobile" in a case an access node serving the cell is a mobile base station relay. Whereas the serving cell mobility information may set to "stationary" in a case access node serving the cell is a fixed base station (e.g., a fixed TRP).

3.0 Neighboring Cell Mobility Information: Overview

In the previous embodiment, e.g., the example embodiment and mode of FIG. 3-FIG. 6, the serving cell mobility information is aimed to indicate mobility state, e.g., "mobile" or "stationary", of a cell that broadcasts the cell mobility information. In the communications system 100(7) of an example embodiment and mode of FIG. 7-FIG. 10, a serving cell may provide one or more instances of mobility information for a neighboring cell(s). Such instances of mobility information for a neighboring cell may herein be referred as "neighboring cell mobility information". Each of the one or more instances of neighboring cell mobility information may be associated with a corresponding neighboring cell. Similar to the example embodiment and mode of FIG. 3-FIG. 6, when receiving from the serving cell, a wireless terminal of the example embodiment and mode of FIG. 7-FIG. 10 may use the one or more instances of the neighboring cell mobility information for applications and/or processes, such as cell reselection. The neighboring cell mobility information may preferably be transmitted to and received by the wireless terminal via system information, but it is also possible that other signaling and transmissions may be utilized, such as dedicated signaling, for example, disclosed in the previous example embodiment and mode.

3.1 Neighboring Cell Mobility Information: Example Scenario

Figure 7:
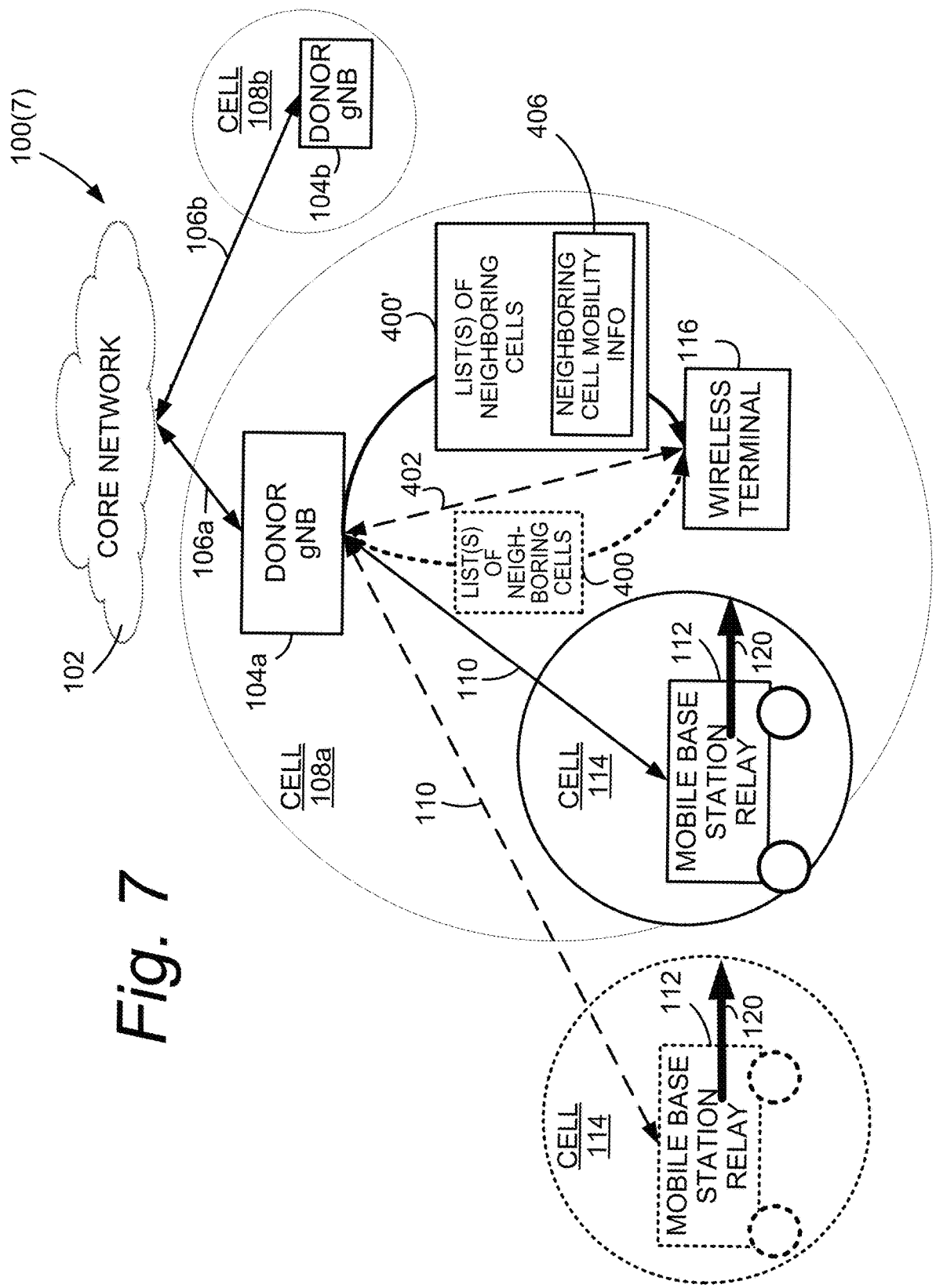
FIG. 7 is a diagrammatic view of a communications system showing both a core network and radio access network, with the radio access network including a Donor gNB node which transmits neighboring cell mobility information to a wireless terminal.

FIG. 7 illustrates an exemplary operation and scenario for an example embodiment and mode wherein neighboring cell mobility information is transmitted. As shown in FIG. 7, a wireless terminal 116 camps on the cell 108a served by the donor gNB 104a via a wireless access link 402. The wireless terminal may obtain, via the cell 108a, a list(s) 400 of neighboring cells. The list(s) 400 of neighboring cells is preferably included in one or more system information blocks (SIBs) broadcasted by the cell 108a, such as SIB3, SIB4 and SIB5. The list(s) 400 of neighboring cells may comprise one or more identities, e.g., physical cell identities, PCIs, of neighboring cells, such as the cell 108b, and may preferably further comprise a radio band/frequency associated with each of some of the neighboring cells operated in inter-frequency bands. At a time in FIG. 7 at which the mobile base station relay 112 is shown in dotted lines the mobile base station relay 112 is not at a nearby location, e.g., not yet in the coverage of the cell 108a, so at such time the list(s) 400 of neighboring cells may not include the identity of the cell 114. As the vehicle mounting the mobile base station relay 112 approaches towards the cell 108a as shown at time in which the mobile base station relay 112 is depicted by solid lines in FIG. 7, the mobile base station relay 112 may establish the wireless backhaul link 110 to the donor gNB 104a. The establishment of the wireless backhaul link 110 may trigger the donor gNB 104a to update the list(s) 400 of neighboring cells resulting in updated list(s) 400' of neighboring cells, and to start broadcasting updated the list(s) 400' of neighboring cells.

The updating of the list(s) of neighboring cells may include adding the identity of the cell 114 to the list(s) 400' of neighboring cells, as well as removing or adding any other cell identities that may be appropriate at the time. In certain circumstances the list(s) 400 of neighboring cells may include just one neighboring cell, e.g., the cell 114 of the mobile base station relay 112 shown in FIG. 7.

In an implementation of the example embodiment and mode of FIG. 7 the list(s) of neighboring cells may be associated with one or more instances of neighboring cell mobility information 406 to indicate mobility state of one or more corresponding neighboring cells. For example, one or more of the cells listed in the list(s) of neighboring cells 400' may be a mobile cell, such as a cell having mobile base station relay 112, and for each such mobile cell the list may include or point to neighboring cell mobility information 406, as illustrated in FIG. 7 and described with example reference to Listing 2 below.

Alternatively or additionally, the Donor gNB 104a may transmit, e.g., broadcast, the neighboring cell mobility information in other form, such as without a list of neighboring cells. For example, the Donor gNB 104a may send the wireless terminal 116 a signal or SSB which, without reference to other cells, provides the neighboring cell mobility information for the cell 114 served by mobile base station relay 112.

3.2 Neighboring Cell Mobility Information: Example Nodes

Figure 8:
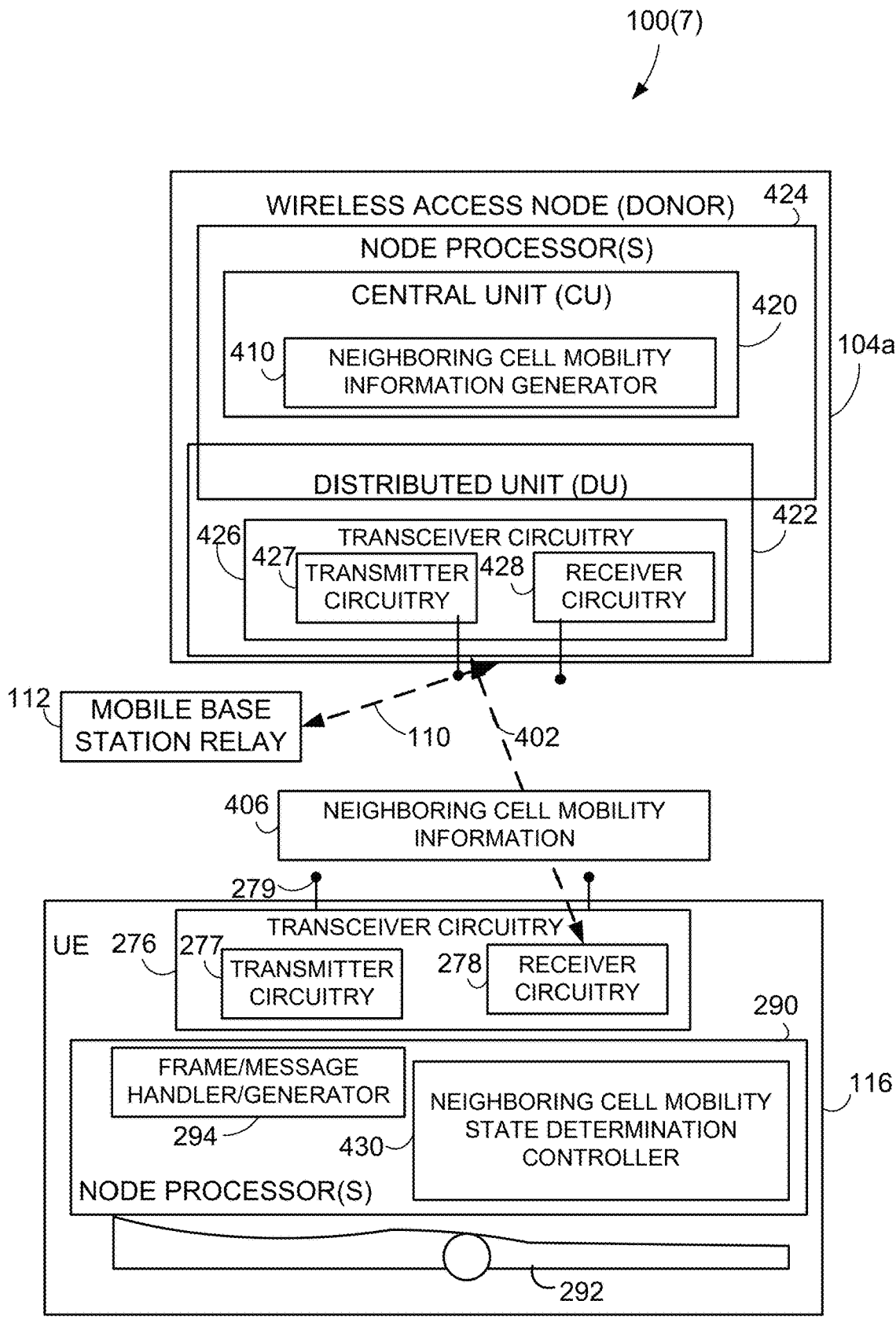
FIG. 8 is a schematic view of example structures and functionalities of an example communications system of the example embodiment and mode of FIG. 7, including a donor gNB which transmits neighboring cell mobility information.

FIG. 8 shows an example embodiment and mode communications system 100(7) showing, e.g., a donor gNB which transmits neighboring cell mobility information, either in the form of the list(s) 400 of neighboring cells or otherwise. The structure and functionalities of the example embodiment and mode of FIG. 7 and FIG. 8 are essentially the same as those shown by corresponding reference numerals in FIG. 1 and FIG. 2, unless otherwise noted or evident from the context. In the example embodiment and mode of FIG. 7 and FIG. 8, Donor gNB 104a includes neighboring cell mobility state information generator 410. With its neighboring cell mobility state information generator 410 the Donor gNB 104a may inform the wireless terminal 116 of information regarding mobility of one or more neighboring cells. Specifically, the Donor gNB 104a may transmit the neighboring cell mobility information 406 to the wireless terminal 116. As shown in FIG. 8, the neighboring cell mobility state information generator 410 of Donor gNB 104a may comprise or be realized by Donor gNB 104a processor 424, as hereinafter described. The Donor gNB 104a preferably obtains the neighboring cell mobility information which it transmits from the core network.

FIG. 8 shows wireless access node, e.g., Donor gNB 104a, in one example implementation as comprising central unit 420 and distributed unit 422. The central unit 420 and distributed unit 422 may be realized by, e.g., be comprised of or include, one or more processor circuits, e.g., node processor(s) 424. The one or more node processor(s) 424 may be shared by central unit 420 and distributed unit 422, or each of central unit 420 and distributed unit 422 may comprise one or more node processor(s) 424. Moreover, central unit 420 and distributed unit 422 may be co-located at a same node site, or alternatively one or more distributed units 422 may be located at sites remote from central unit 420 and connected thereto by a packet network. The distributed unit 422 may comprise transceiver circuitry 426, which in turn may comprise transmitter circuitry 427 and receiver circuitry 428. The transceiver circuitry 426 may include antenna(e) for the wireless transmission. Transmitter circuitry 427 may include, e.g., amplifier(s), modulation circuitry and other conventional transmission equipment. Receiver circuitry 428 may comprise, e.g., amplifiers, demodulation circuitry, and other conventional receiver equipment. As further shown in FIG. 8, node processor(s) 424 of gNB 104a may comprise the neighboring cell mobility state information generator 410.

FIG. 8 shows the gNB node processor(s) 424 as comprising neighboring cell mobility state determination controller 430. The neighboring cell mobility state determination controller 430 may process and may act upon the neighboring cell mobility information 406 received by wireless terminal 116 through transceiver circuitry 276. For example, the neighboring cell mobility information 406 may be further used by applications and/or processes running on the wireless terminal 116. One example of usage for the neighboring cell mobility information 406 is cell reselection.

3.3 Neighboring Cell Mobility Information: Example Information Content

In one example implementation, the neighboring cell mobility information 406 may comprise the one or more attributes, elements, representing the mobility state, as disclosed in the example embodiment and mode of FIG. 3-FIG. 6. That is, the one or more attributes or elements may comprise the aforementioned cell mobility indicator, and may possibly further comprise other attributes, such as a speed, a direction and a position.

Listing 2 shows an example implementation wherein a SIB3 provides information with regard to intra-frequency neighboring cells, where an optional information element, cellMobilityInfo, may be associated with each of some of the neighboring cells listed in intraFreqNeighCellList. The information element, cellMobilityInfo, may comprise the cell mobility indicator, cellMobilityIndicator, disclosed in the example embodiment and mode of FIG. 3-FIG. 6, and may further comprise a cell mobility speed class, cellMobilitySpeedClass, a direction, cellMobilityDirection and a position of the cell, cellPosition. It is possible to apply this example implementation in a similar manner to SIB4, although not illustrated as such, that provides a list of inter-frequency neighboring cells, and/or SIB5, also shown, that provides a list of inter-RAT, Radio Access Technology, neighboring cells.

LISTING 2

```
SIB3 ::=                             SEQUENCE {
    intraFreqNeighCellList               IntraFreqNeighCellList
OPTIONAL,  -- Need R
    intraFreqBlackCellList               IntraFreqBlackCellList
OPTIONAL,  -- Need R
    lateNonCriticalExtension OCTET STRING
OPTIONAL,
    ...,
    [[
    intraFreqNeighCellList-v1610         IntraFreqNeighCellList-v1610
OPTIONAL,  -- Need R
    intraFreqWhiteCellList-r16           IntraFreqWhiteCellList-r16
OPTIONAL,  -- Cond SharedSpectrum2
    intraFreqCAG-CellList-r16            SEQUENCE (SIZE (1..maxPLMN))
OF IntraFreqCAG-CellPerPLMN-r16          OPTIONAL   -- Need R
    ]]
}
IntraFreqNeighCellList ::=               SEQUENCE (SIZE (1..maxCellIntra))
OF IntraFreqNeighCellInfo
IntraFreqNeighCellList-v1610::=          SEQUENCE (SIZE
(1..maxCellIntra)) OF IntraFreqNeighCellInfo-v1610
IntraFreqNeighCellInfo ::=               SEQUENCE {
    physCellId                           PhysCellId,
    q-OffsetCell                         Q-OffsetRange,
    q-RxLevMinOffsetCell                 INTEGER (1..8)
OPTIONAL,  -- Need R
    q-RxLevMinOffsetCellSUL              INTEGER (1..8)
OPTIONAL,  -- Need R
    q-QualMinOffsetCell                  INTEGER (1..8)
OPTIONAL,  -- Need R
    cellMobilityInfo                     CellMobilityInfo
OPTIONAL,  -- Need R
    ...
}
CellMobilityInfo ::=                     SEQUENCE {
    cellMobilityIndicator                ENUMERATED {mobile, stationary}
    cellMobilitySpeedClass               ENUMERATED {High, Mid, Low, spare}
OPTIONAL,  -- Need R
    cellMobilityDirection                ENUMERATED {N, NE, E, SE, S, SW, W,
NW} OPTIONAL,   -- Need R
    cellMobilityPosition cellPosition,              -- Need R
    ...
}
```

In this example implementation, upon updating the list(s) of neighboring cells, the donor gNB 104*a* may add an instance of IntraFreqNeighCellInfo to IntraFreqNeighCellList, where the instance may include physCellId set to the PCI of the cell 114 and cellMobilityInfo comprising cellMobilityIndicator set to "mobile" and possibly the other optional attributes, elements. When the mobile base station relay 112 moves away from the cell 108*a*, the donor gNB 104*a* may remove the instance of IntraFreqNeighCellInfo from IntraFreqNeighCellList.

It should be understood that the example embodiment and mode of FIG. 7-FIG. 8 may be used as a complement to the example embodiment and mode of FIG. 3-FIG. 6. For example, the MIB may include the serving cell mobility information only comprising the cell mobility indicator, while one or more SIBs may include the neighboring cell mobility information comprising other attributes, e.g., speed, direction, etc. The example embodiment and mode of FIG. 7-FIG. 8 may be also used as an alternative of the example embodiment and mode of FIG. 3-FIG. 6, in a case, for example, that reserved PCIs cannot be allocated.

3.4 Neighboring Cell Mobility Information: Example Operation

Figure 9:
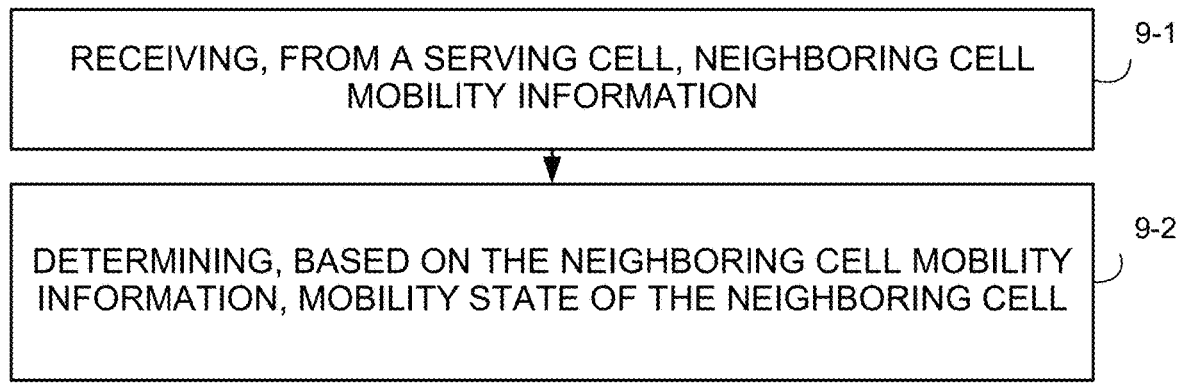
FIG. 9 is a flowchart view showing representative, example steps or acts performed by a wireless terminal of the communications system of the example embodiment and mode of FIG. 7.

FIG. 9 is a flow chart showing example representative steps or acts performed by a wireless terminal 116 of the example embodiment and mode of FIG. 7-FIG. 8. Act 9-1 comprises receiving, from a serving cell, neighboring cell mobility information, such as the neighboring cell mobility information 406 of FIG. 7 and FIG. 8, wherein the neighboring cell mobility information may be associated with an identity of a neighboring cell, such as the identity of the cell 114 of FIG. 7. Such an identity of a neighboring cell may be included in the list(s) of neighboring cells 400 of FIG. 7. In one example implementation, the neighboring cell mobility information may be included in one or more system information blocks (SIBs). In another configuration, the neighboring cell mobility information may be included in a dedicated signaling, such as a radio resource control (RRC) message.

Act 9-2 comprises determining, based on the neighboring cell mobility information, mobility state of the neighboring cell. The mobility state may comprise an indication indicating whether or not at least one transmission and reception point (TRP) serving the neighboring cell geographically moves. For example, the cell mobility indicator may set to "mobile" in a case a base station serving the neighboring cell is a mobile base station relay. Whereas the cell mobility indicator may set to "stationary" in a case a base station serving the neighboring cell is a fixed base station (e.g., a fixed TRP). The mobility state may further comprise a speed, a direction and/or a position of the neighboring cell.

Figure 10:
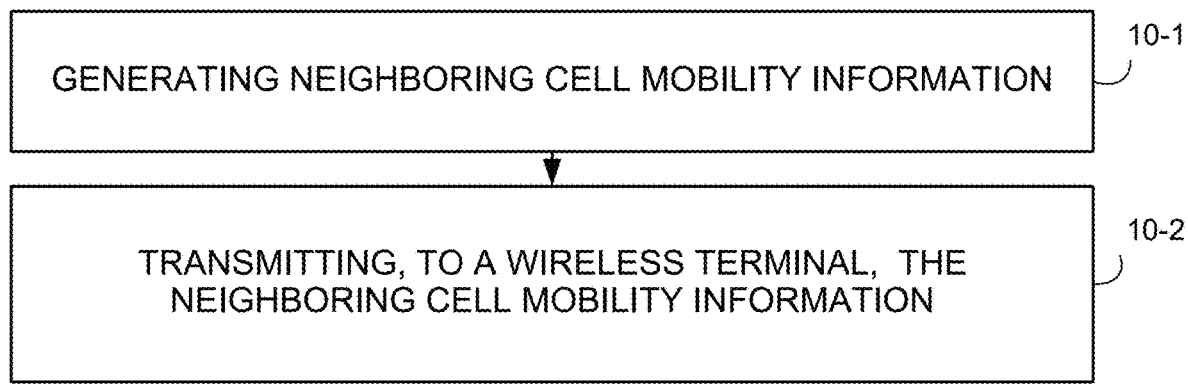
FIG. 10 is a flowchart view showing representative, example steps or acts performed by a gNB base station node of the communications system of the example embodiment and mode of FIG. 7.

FIG. 10 is a flow chart showing example representative steps or acts performed by an access node of the present embodiment, e.g., the mobile base station relay 112 of FIG. 7, or a stationary/fixed base station such as the donor gNB 104*a*/104*b* of FIG. 7. Act 10-1 comprises generating neighboring cell mobility information, such as the neighboring cell mobility information 406 of FIG. 7, wherein the neighboring cell mobility information may be associated with an identity of a neighboring cell, such as the identity of the cell 114 of FIG. 7. Such an identity of a neighboring cell may be included in the list(s) of neighboring cells 400 of FIG. 7.

Act 10-2 comprises transmitting, to a wireless terminal, e.g., the wireless terminal 116 of FIG. 7, the neighboring cell mobility information. In one example implementation, the neighboring cell mobility information may be included in one or more system information blocks (SIBs). In another example implementation, the neighboring cell mobility information may be included in a dedicated signaling, such as a radio resource control (RRC) message. The neighboring cell mobility information may be used by a wireless terminal to determine mobility state of the neighboring cell. The mobility state may comprise an indication indicating whether or not at least one transmission and reception point (TRP) serving the neighboring cell geographically moves. For example, the cell mobility indicator may set to "mobile" in a case a base station serving the neighboring cell is a mobile base station relay. Whereas the cell mobility indicator may set to "stationary" in a case a base station serving the neighboring cell is a fixed base station, e.g., a fixed TRP. The mobility state may further comprise a speed, a direction and/or a position of the neighboring cell.

4.0 Cell Reselection Based on Cell Mobility Information: Overview

The example embodiment and mode of FIG. 11-FIG. 14 describes example use of cell mobility information, referring to either or both of the serving cell mobility information disclosed in the example embodiment and mode of FIG. 3-FIG. 6 and the neighboring cell mobility information disclosed in the example embodiment and mode of FIG. 7-FIG. 10, for a wireless terminal to perform a cell reselection procedure. Accordingly, as used herein, particularly with reference to FIG. 11-FIG. 14, the terms "mobility information" and "cell mobility information", which may be used interchangeably, encompass either or both of serving cell mobility information and neighboring cell mobility information.

As previously indicated, a conventional cell reselection procedure may be designed based on the assumption that cells are stationary. When a cell is "stationary", the TRP(s) of that stationary cell does not move. However, in a case that the assumption does not hold, e.g., in a case that the cell(s) do physically/geographically move, the cell reselection procedure may need to take into account the mobility of cells.

4.1 Cell Reselection Based on Cell Mobility Information: Example Scenario

Figure 11:
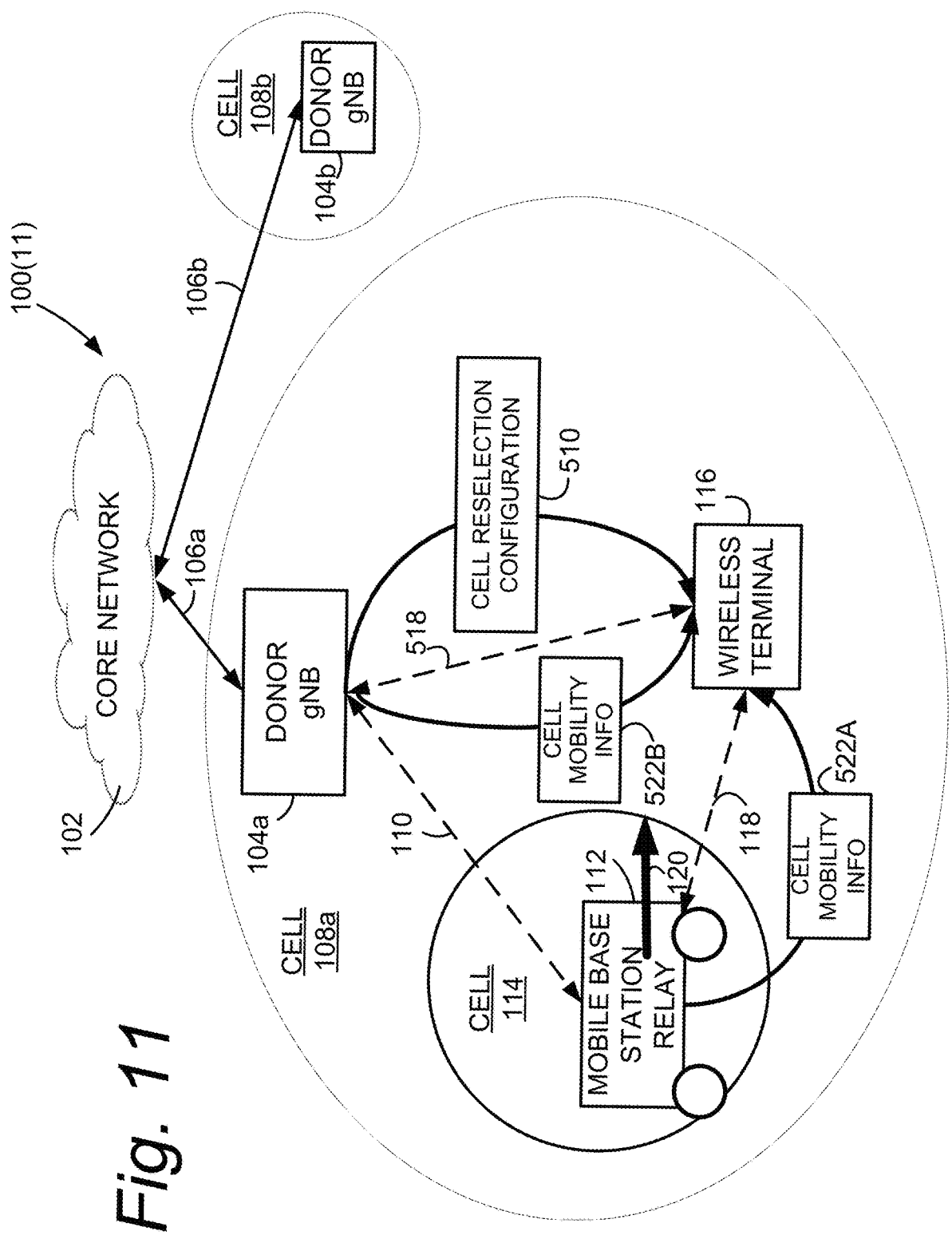
FIG. 11 is a diagrammatic view of a communications system showing both a core network and radio access network, with one or both of a Donor gNB node and a mobile base station relay transmitting cell mobility information and cell reselection configuration to a wireless terminal which may perform a cell reselection determination or procedure.

FIG. 11 shows an example scenario of such a case, wherein the wireless terminal 116 in an idle state, e.g., RRC_IDLE, or in an inactive state, e.g., RRC_INACTIVE, may first camp on the cell 108*a*. Cell 108*a* is shown in FIG. 11 as a stationary cell. In FIG. 11, the mobile base station relay 112 is carried by or mounted on a vehicle. As the vehicle equipped with the mobile base station relay 112 approaches toward the wireless terminal 116, the wireless terminal 116 may discover the cell 114 which is served by mobile base station relay 112. It is desired that the likelihood of the wireless terminal 116 reselecting the cell 114 be configurable based on the mobility of the cell 114, e.g., dependent on the extent and nature of mobility of cell 114. For example, in some situations it may be desired that the wireless terminal 116 be more likely to reselect the cell 114 if the wireless terminal 116 rides on the vehicle that carries mobile base station relay 112. In other situations, it may be desired that the wireless terminal 116 be more likely to stay on the cell 108*a*, a stationary macro cell, while the wireless terminal 116 is not in the vehicle carrying mobile base station relay 112, especially when the vehicle which carries mobile base station relay 112 moves in high speed.

In the example embodiment and mode of FIG. 11, the mobile base station relay 112, specifically the transmitter 224 of FIG. 2, may broadcast the cell mobility information for cell 114. The cell mobility information is transmitted over the wireless access link 118. It may be preferred to use the MIB or the PSS/SSS to carry the cell mobility information of cell 114 for the example embodiment and mode of FIG. 11, since such signals are detected first when a wireless terminal 116 discovers a cell. The wireless terminal 116 that receives the cell mobility information may use the mobility indicator included in the cell mobility information to alter the cell reselection procedure, as disclosed below.

4.2 Cell Reselection Based on Cell Mobility Information: Example Nodes

Figure 12:
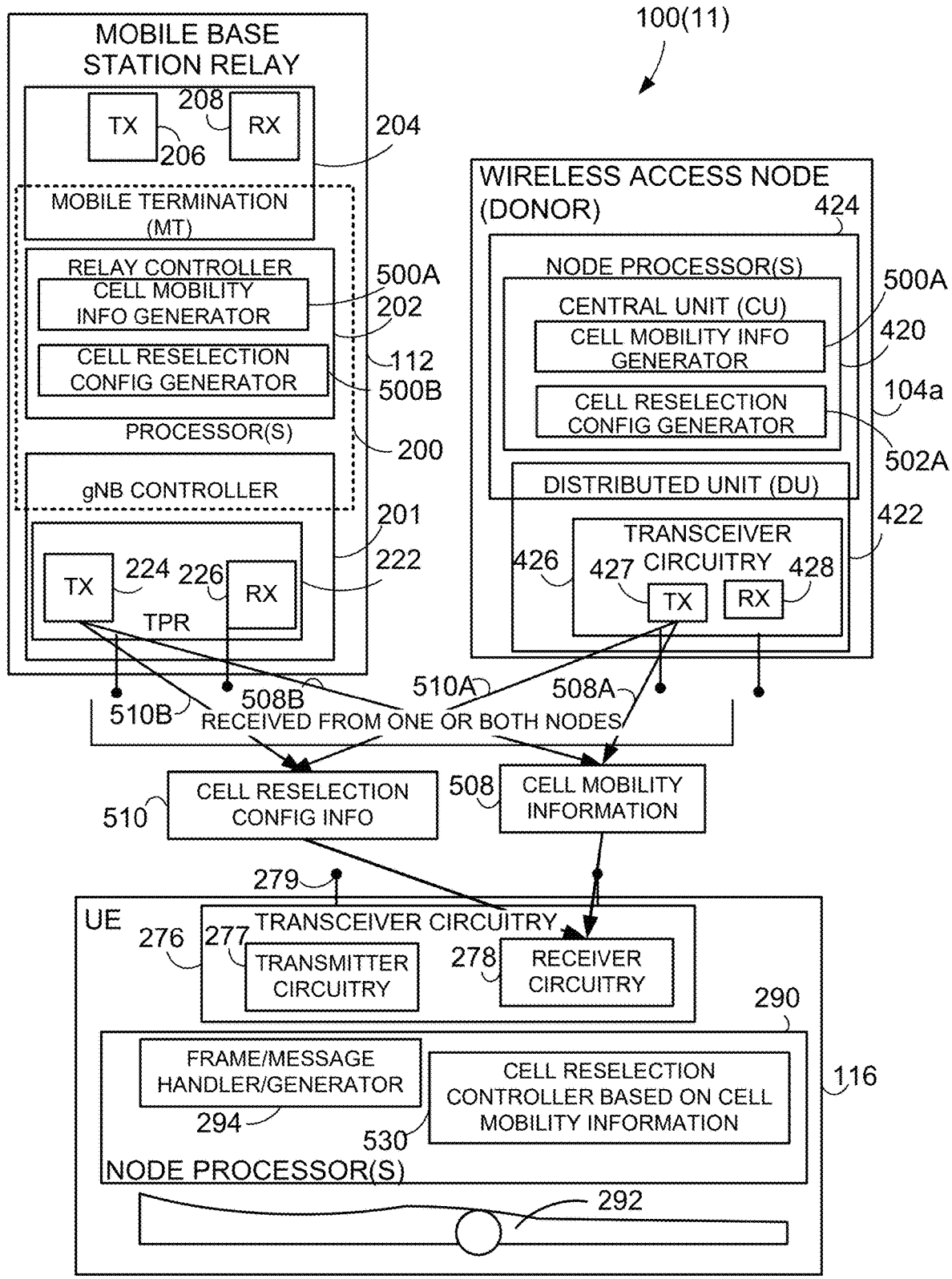
FIG. 12 is a schematic view of an example embodiment and mode of a communications system showing example structures and functionalities of a donor gNB, a mobile base station relay, and a wireless terminal according to the example embodiment of FIG. 11.

FIG. 12 shows example structures and functionalities of the example embodiment and mode communications system 100(11) of FIG. 11, showing radio access network including a donor gNB node 104 and a mobile base station relay 112, either of which may transmit cell mobility information and cell reselection configuration information. The structure and functionalities of the example embodiment and mode of FIG. 11 and FIG. 12 are essentially the same as those shown by corresponding reference numerals in the preceding figures, unless otherwise noted or evident from the context. In the example embodiment and mode of FIG. 11 and FIG. 12, Donor gNB 104a includes cell mobility state information generator 500A and cell reselection configuration information generator 502A. One or more, and preferably both, of cell mobility state information generator 500A and cell reselection configuration information generator 502A may comprise or be realized by node processor(s) 424 of Donor gNB 104a. Specifically, the Donor gNB 104a may transmit the cell mobility information 508 generated by cell mobility state information generator 500A to the wireless terminal 116 as cell mobility state information 508A and the cell reselection configuration generated by the cell reselection configuration information generator 502A to the wireless terminal 116 as cell reselection configuration 510A.

FIG. 11 and FIG. 12 further show mobile base station relay 112 as comprising cell mobility state information generator 500B and cell reselection configuration information generator 502B. One or more, and preferably both, of cell mobility state information generator 500B and cell reselection configuration information generator 502B of mobile base station relay 112 may comprise or be realized by mobile station relay processor 200, for example by relay controller 202. The mobile base station relay 112 may transmit the cell mobility information generated by cell mobility state information generator 500B to the wireless terminal 116 as cell mobility state information 508B and the cell reselection configuration generated by the cell reselection configuration information generator 502B to the wireless terminal 116 as cell reselection configuration 510B.

As shown in FIG. 12, either one or both of cell mobility state information 508A and cell mobility state information 508B generated by Donor gNB 104a and mobile base station relay 112, respectively, and/or one or both of cell reselection configuration 510A and cell reselection configuration 510B generated by Donor gNB 104a and mobile base station relay 112, respectively, may be received by wireless terminal 116. As used herein, cell mobility state information 508 generically refers to either of cell mobility state information 508A or cell mobility state information 508B, or both; while cell reselection configuration 510 generically refers to either cell reselection configuration 510A or cell reselection configuration 510B, or both.

The wireless terminal 116 comprises cell reselection controller 530. The cell reselection controller 530 may use the cell mobility state information 508 and the cell reselection configuration 510 to perform a cell reselection procedure, as herein described. The cell reselection controller 530 may comprise or be realized by wireless terminal processor(s) 290.

4.3 Cell Reselection Based on Cell Mobility Information: Example Operation

The example scenario of FIG. 11 depicts a case where the wireless terminal 116 reselects the mobile cell 114 from, e.g., while in but preparing to leave, the stationary cell 108a. First, the wireless terminal 116 may obtain, from the cell 108a, a currently serving cell, a cell reselection configuration 510 via system information broadcast over the wireless access link 518. The cell reselection configuration 510 may comprise parameters, such as thresholds, offset values, timer values, and/or counter values to be used for evaluations of candidate cells. In addition, the cell reselection configuration 510 of the example embodiment and mode of FIG. 11-FIG. 14 may also comprise a set of parameters designated to be used for evaluation of cells whose mobility state is "mobile". This set of parameters, referred as "reselection parameters for mobile cells", may take effect when the wireless terminal 116 discovers a "mobile" cell, such as the cell 114, but on the other hand may take no effect when the wireless terminal 116 discovers a "non-mobile" cell, e.g., a "stationary" or "fixed" cell, such as the cell 108b. In the scenario of FIG. 11, the wireless terminal 116 camping on the cell 108a may (1) eventually discover the "mobile" cell 114 approaching toward the wireless terminal 116, (2) receive broadcast signal(s) over the wireless access link 118, (3) obtain the cell mobility information indicating that the cell is "mobile", (4) evaluate the cell 114 based on the cell reselection configuration as well as the reselection parameters for mobile cells, and (5) finally make a decision whether or not to reselect the cell 114.

Cell mobility information may be transmitted from the mobile base station relay 112 to the wireless terminal 116 as shown in FIG. 11 by the cell mobility information 522A. The cell mobility information 522A transmitted from mobile base station relay 112 may be the serving cell mobility information disclosed in the example embodiment and mode of FIG. 3-FIG. 6, and as such provides the mobility state of the serving cell which, in this illustration, is the cell 114. Additionally, or alternatively, cell mobility information may also be transmitted from the donor gNB 104a. The cell mobility information transmitted from Donor gNB 104a is shown in FIG. 11 as cell mobility configuration 522B, and may be the neighboring cell mobility information disclosed in the example embodiment and mode of FIG. 7-FIG. 10, and which indicates the mobility state of the neighboring cell, e.g., the cell 104 served by mobile base station relay 112.

In a typical cellular network, a cell reselection may be performed based on pre-determined/pre-configured criteria. For example, 3GPP TS 38.304 V16.2.0 (2020 September), 3rd Generation Partnership Project; Technical Specification Group Radio Access Network; NR; User Equipment (UE) procedures in Idle mode and RRC, Inactive State (Release 16), herein "3GPP TS 38.304", which is incorporated herein by reference, specifies cell-ranking criteria as shown in Listing 3.

Listing 3

The cell-ranking criterion $R_s$ for serving cell and $R_n$ for neighbouring cells is defined by:

$$R_s = Q_{meas,s} + Q_{hyst} - Qoffset_{temp}$$

$$R_n = Q_{meas,n} - Qoffset - Qoffset_{temp}$$

where:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in 3GPP TS 38.331 [3]. |

The UE shall perform ranking of all cells that fulfil the cell selection criterion S, which is defined in section 5.2.3.2 of 3GPP TS 38.304.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave according to clause 5.2.4.4 of 3GPP TS 38.304.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to clause 5.2.4.4 of 3GPP TS 38.304.

In all cases, the UE shall reselect the new cell, only if the following conditions are met:
the new cell is better than the serving cell according to the cell reselection criteria specified above during a time interval $Treselection_{RAT}$;
more than 1 second has elapsed since the UE camped on the current serving cell.
NOTE: If rangeToBestCell is configured but absThreshSS-BlocksConsolidation is not configured on an NR frequency, the UE considers that there is one beam above the threshold for each cell on that frequency.
. . .

$Treselection_{RAT}$

This specifies the cell reselection timer value. For each target NR frequency and for each RAT other than NR, a specific value for the cell reselection timer is defined, which is applicable when evaluating reselection within NR or towards other RAT, e.g., $Treselection_{RAT}$ for NR is $Treselection_{NR}$, for E-UTRAN is $Treselection_{EUTRA}$.
NOTE: $Treselection_{RAT}$ is not broadcast in system information but used in reselection rules by the UE for each RAT.

$Treselection_{NR}$
This specifies the cell reselection timer value $Treselection_{RAT}$ for NR. The parameter can be set per NR frequency as specified in 3GPP TS 38.331 [3].

As an exemplary implementation of the example embodiment and mode of FIG. 11-FIG. 14, the reselection parameters for mobile cells may comprise a timer value, $T_{reselectionVMR}$. The timer may be used to differentiate a likelihood of reselecting a mobile cell from a likelihood of reselecting a stationary cell. The timer may also be used to differentiate a likelihood of a wireless terminal in a vehicle reselecting a mobile cell mounted on the vehicle which carries the wireless terminal, from a likelihood of a wireless terminal not in the vehicle reselecting the mobile cell. In the scenario of FIG. 11, if the wireless terminal 116 rides and stays on the vehicle which carries the mobile base station relay 112, it is expected that the signal from the mobile base station relay 112 may be stable for relatively long time, whereas when the wireless terminal 116 is outside of the vehicle that carries the mobile base station relay 112, the wireless terminal 116 will eventually lose the signal as the vehicle moves away. Therefore, in a typical deployment scenario, $T_{reselectionVMR}$ may be set longer than $T_{reselectionNR}$, or $T_{reselectionEUTRA}$, encouraging wireless terminals in the vehicle to reselect a "mobile" cell while discouraging wireless terminals outside of the vehicle.

In another exemplary implementation, the reselection parameters for mobile cells may comprise one or more offset values. For example, in a case that a neighboring cell is "mobile", e.g., the cell 114 while the wireless terminal is camping on the cell 104a, an offset value $Q_{VMRn}$ may be applied to the cell reselection criterion $R_n$ in Listing 1 as follows:

$$R_n = Q_{meas,n} - Qoffset - Qoffset_{temp} - Q_{VMRn}$$

Accordingly, the wireless terminal 116 is likely to reselect a "mobile" cell only when the signal strength/quality from the cell is strong enough.

Additionally, or alternatively, in a case that a serving cell is mobile, e.g., the cell 114 is a serving cell of the wireless terminal 116, one or more offset values for encouraging the wireless terminal 116 to stay camping on the mobile serving cell, e.g., the cell 114, may be configured as a part of the reselection parameters for mobile cells. For example, an offset value $Q_{VMRs}$ may be used for the cell reselection criterion $R_s$ in Listing 1 as follows:

$$R_s = Q_{meas,s} + Q_{hyst} - Qoffset_{temp} + Q_{VMRs}$$

In doing so, once it has reselected the cell 114, the wireless terminal 116 is likely to stay on camping the cell 114.

Figure 13:
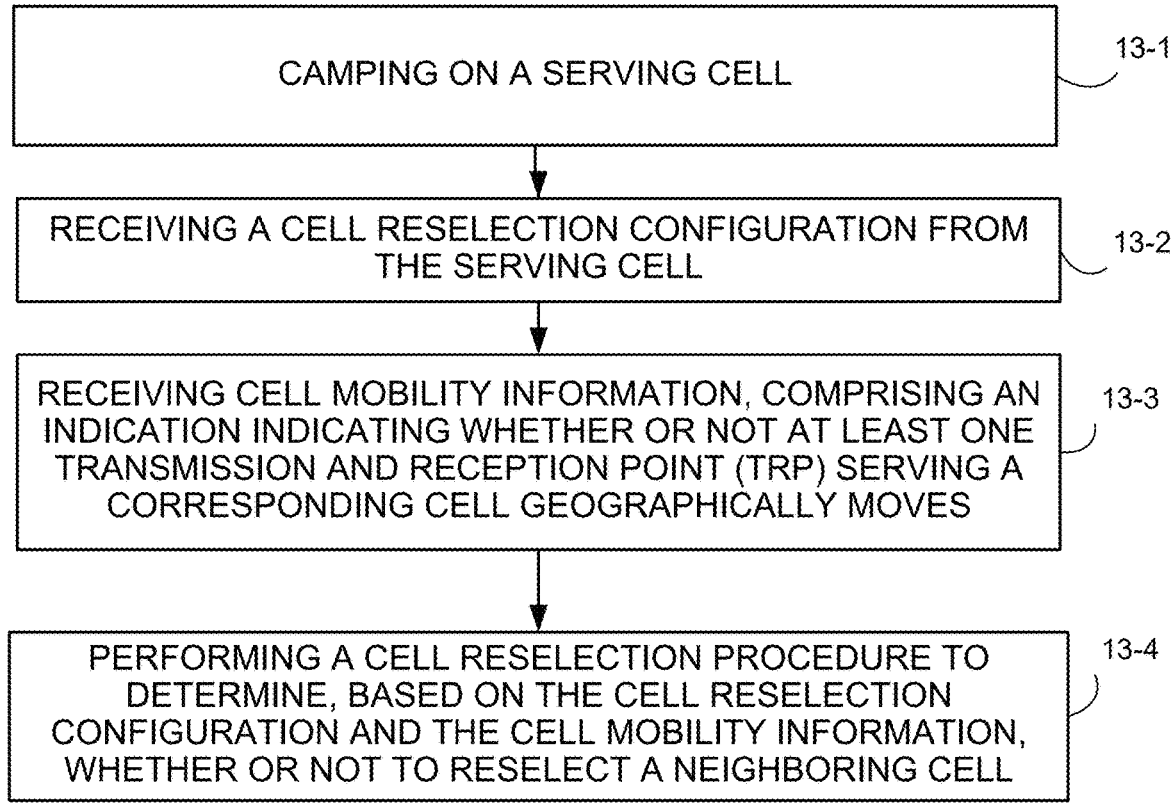
FIG. 13 is a flowchart view showing representative, example steps or acts performed by a wireless terminal of the communications system of the example embodiment and mode of FIG. 11.

FIG. 13 is a flow chart showing example representative steps or acts performed by a wireless terminal 116 of the example embodiment and mode of FIG. 11-FIG. 14. Act 13-1 comprises camping on a serving cell. Act 13-2 comprises receiving a cell reselection configuration from the serving cell. Act 13-3 comprises receiving cell mobility information, comprising an indication indicating whether or not at least one transmission and reception point (TRP) serving a corresponding cell geographically moves. Act 13-4 comprises performing a cell reselection procedure to determine, based on the cell reselection configuration and the cell mobility information, whether or not to reselect a neighboring cell. Act 13-4 may be performed by cell reselection controller 530. In one example implementation, the corresponding cell is the serving cell. In this example implementation in which the corresponding cell is the serving cell, the cell mobility information may be received from the serving cell. In another example implementation, the corresponding cell is the neighboring cell. In this example implementation in which the corresponding cell is the neighboring cell, the cell mobility information may be received either from the serving cell or the neighboring cell. In addition, the cell reselection configuration may comprise one or more parameters designated for evaluating the corresponding cell during the cell reselection procedure.

Figure 14:
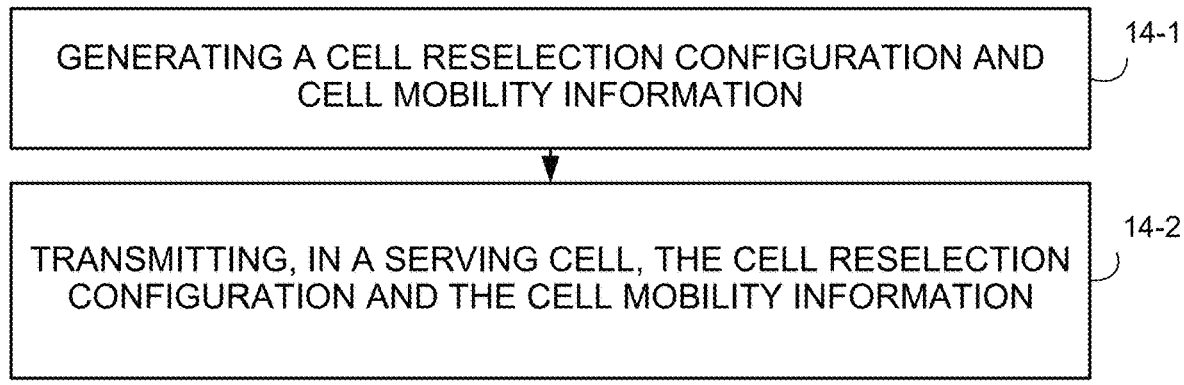
FIG. 14 is a flowchart view showing representative, example steps or acts performed by either or both of a gNB base station node and a mobile base station relay of the communications system of the example embodiment and mode of FIG. 11.

FIG. 14 is a flow chart showing example representative steps or acts performed by an access node, such as the mobile base station relay 112 of FIG. 11 or a stationary/fixed base station such as the donor gNB 104a/104b of FIG. 11, which communicates with a wireless terminal such as the wireless terminal 116 of FIG. 11. Act 14-1 comprises generating a cell reselection configuration and cell mobility information. The cell mobility information may be either or both of the serving cell mobility information, as disclosed in the example embodiment and mode of FIG. 3-FIG. 6, and the neighboring cell mobility information as disclosed in the example embodiment and mode of FIG. 7-FIG. 10. The information of act 14-1 may be generated at Donor gNB 104a by the cell mobility state information generator 500A and the cell reselection configuration information generator 502A, and/or at mobile base station relay 112 by the cell mobility state information generator 500B and the cell reselection configuration information generator 502B.

Act 14-2 comprises transmitting, in a serving cell, the cell reselection configuration and the cell mobility information. The cell reselection configuration and the cell mobility information may be used by the wireless terminal to perform a cell reselection procedure to determine whether or not the wireless terminal reselects a neighboring cell. In other words, the cell reselection configuration and the cell mobility information are configured to be used by the wireless terminal to perform a cell reselection procedure to determine whether or not the wireless terminal reselects a neighboring cell. Furthermore, the mobility state may comprise an indication indicating whether or not at least one transmission and reception point (TRP) serving a corresponding cell geographically moves. The corresponding cell may be either the serving cell or the neighboring cell. In addition, the cell reselection configuration may comprise one or more parameters designated for evaluating the corresponding cell during the cell reselection procedure.

5.0 Neighboring Cell Relative Mobility Information

The preceding embodiment, e.g., the example embodiment and mode of FIG. 11-FIG. 14, focuses on scenarios and operations wherein the cell mobility information indicates mobility state of a cell of concern. The cell mobility information of the preceding embodiment may be of two types, either serving cell mobility information or neighboring cell mobility information. Of these two types, the serving cell mobility information indicates mobility state of a serving cell, e.g., a cell that broadcasts the serving cell mobility information, whereas the neighboring cell mobility information indicates mobility state of a neighboring cell. In principle, the "mobility state" represents state of mobility relative to the ground, e.g., to some fixed geographic or terrestrial coordinate.

In the example embodiment and mode of FIG. 15-FIG. 18, information indicating a relative movement between two cells is disclosed. The information may be explicitly or implicitly transmitted by a serving cell to one or more wireless terminals that camp on the serving cell, in order to indicate, for example, relative mobility/movement of a neighboring cell. Herein such information that indicates relative movement between two cells is referred as "neighboring cell relative mobility information".

Figure 15:
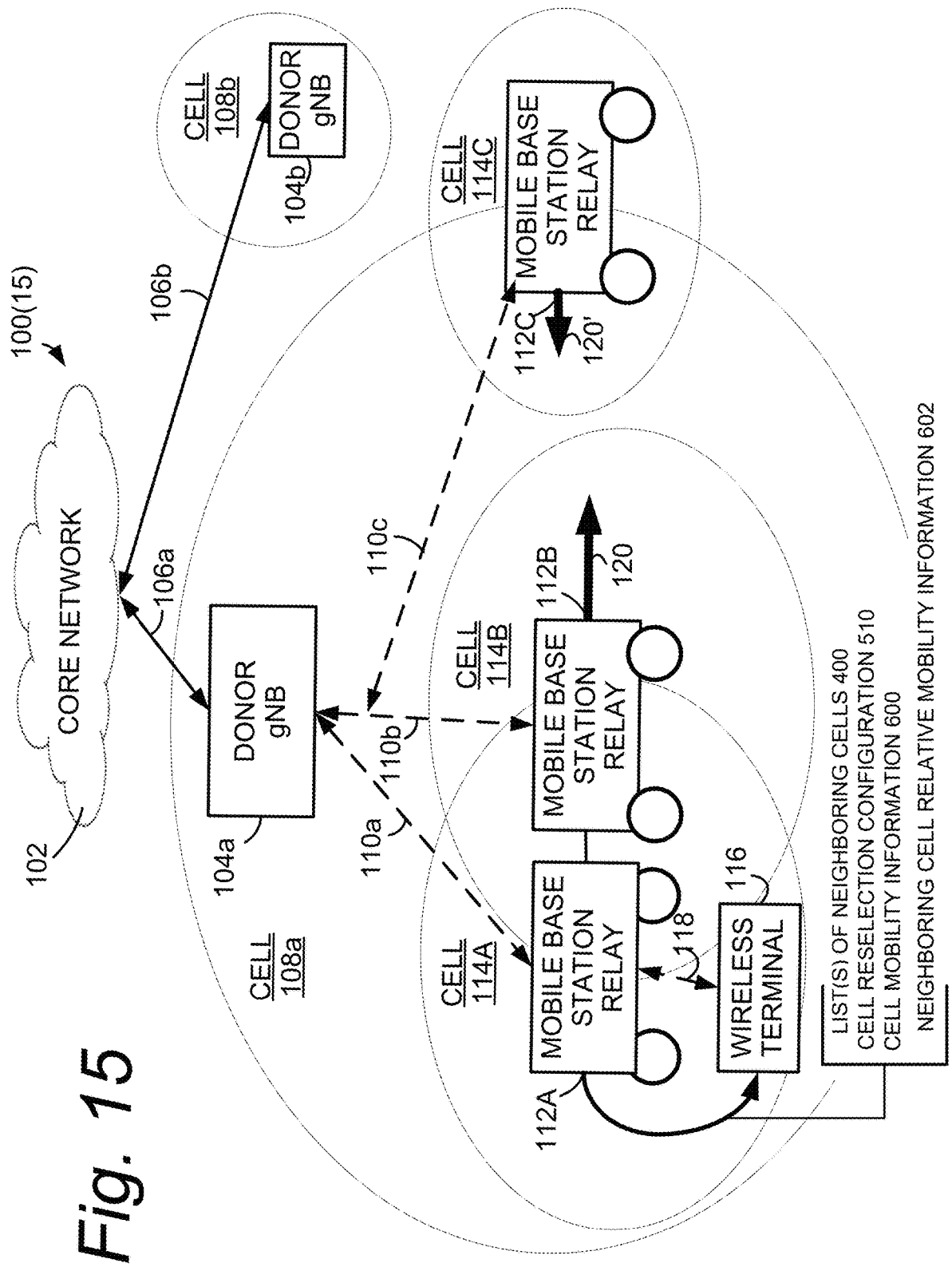
FIG. 15 is a diagrammatic view of a communications system showing both a mobile base station relay transmitting neighboring cell relative mobility information and, optionally, cell reselection configuration to a wireless terminal which may perform a cell reselection determination or procedure.

5.1 Cell Reselection Based on Neighboring Cell Relative Mobility Information: Example Scenario FIG. 15 illustrates an example scenario which may employ the neighboring cell relative movement information. FIG. 15 is similar to the scenarios previously disclosed, such as FIG. 3, FIG. 7 and FIG. 11. However, in FIG. 15 two mobile base station relays 112A and 112B move conjointly, e.g., move together or in unison, and serve cell 114A and cell 114B, respectively. For example, the two base mobile station relays 112A and 112B move at a same velocity in the direction depicted by arrow 120. In an example deployment scenario, the mobile base station relays 112A and 112B may be equipped in different cars of a same train. In the scenario of FIG. 15 the wireless terminal 116 initially camps on the cell 114A, in which the wireless terminal may receive (1) the aforementioned list(s) 400 of neighboring cells; (2) cell reselection configuration 510; and (3) cell mobility information 600. The cell mobility information 600 may comprise serving cell mobility information 320 and/or neighboring cell mobility information 406. Additionally, the wireless terminal 116 of this embodiment and mode may further receive, from the cell 114A via wireless access link 118A, (4) neighboring cell relative mobility information 602, which may indicate the relative mobility/movement of each of neighboring cells, such as cell 114B and cell 114C. The cell 114C is shown as being served by mobile base station relay 112C, which is shown as traveling in a direction 120' which is different than direction 120. The transmission and reception of the cell reselection configuration, the cell mobility information, and the neighboring cell relative mobility information may occur in several ways, such as, for example, one or more of such configurations/information being included in the list(s) 400 of neighboring cells.

Figure 16:
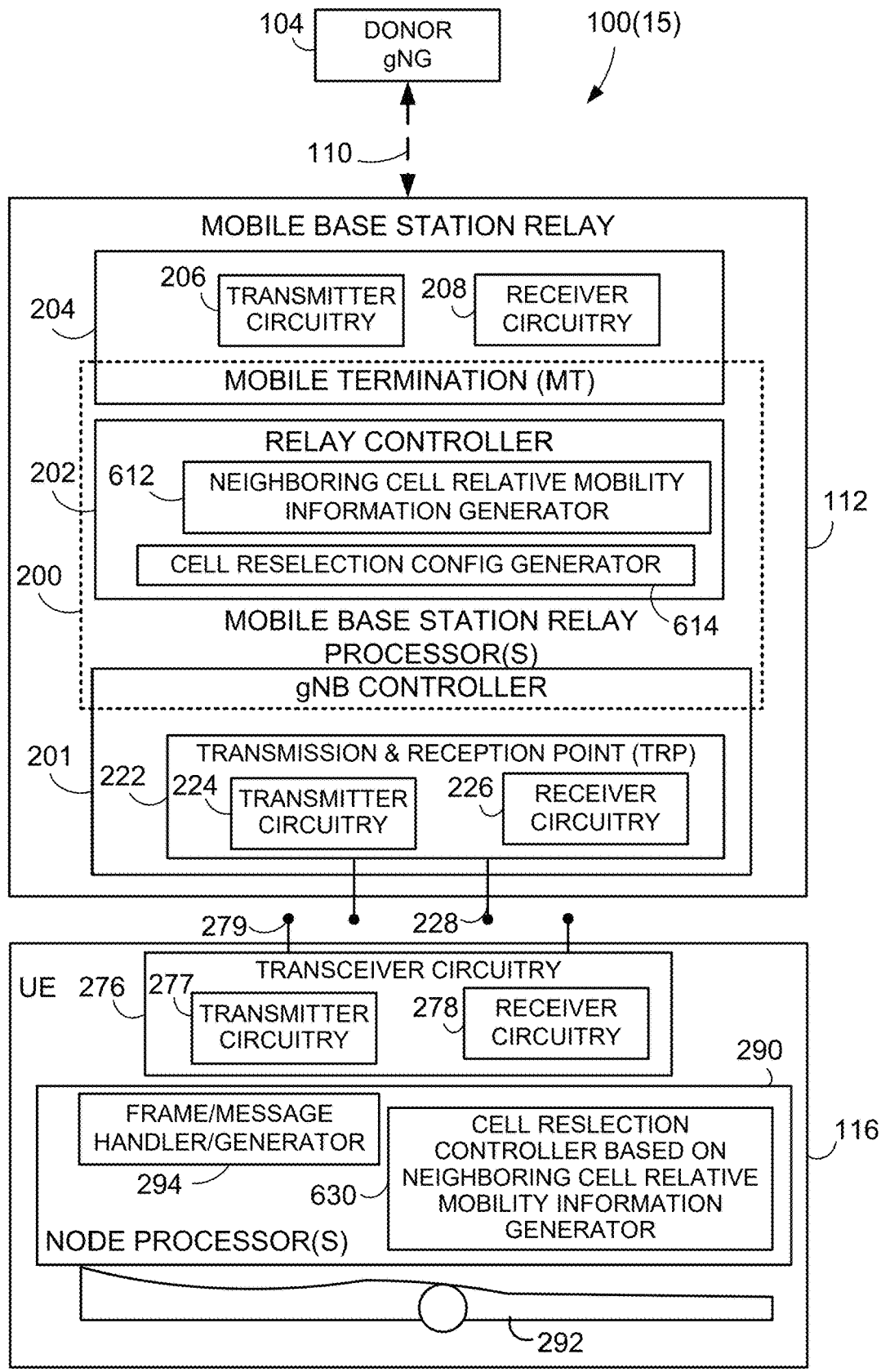
FIG. 16 is a schematic view of an example embodiment and mode communications system showing example structures and functionalities of a mobile base station relay and a wireless terminal according to the example embodiment of FIG. 15.

5.2 Cell Reselection Based on Neighboring Cell Relative Mobility Information: Example Nodes FIG. 16 shows example structures and functionalities of the example embodiment and mode communications system 100(15) of FIG. 15, showing radio access network including a donor gNB node 104, mobile base station relay 112, and wireless terminal 116. The mobile base station relay 112 shown in FIG. 16 may be representative of any one of the mobile base station relays of FIG. 15, e.g., mobile base station relay 112A, mobile base station relay 112B, and mobile base station relay 112C. The structures and functionalities of the example embodiment and mode of FIG. 15 and FIG. 16 are essentially the same as those shown by corresponding reference numerals in the preceding figures, unless otherwise noted or evident from the context.

As in the preceding embodiment and modes, the mobile base station relay 112 includes gNB controller 201; relay controller 202; and mobile termination (MT) function 204. The gNB controller includes transmission and reception point (TRP) 222, which in turn comprises transmitter 224 and receiver 226.

In the example embodiment and mode of FIG. 15 and FIG. 16, mobile base station relay 112 includes neighboring cell relative mobility information generator 612 and cell reselection configuration generator 614. The cell reselection configuration 510 generated by cell reselection configuration generator 614 may comprise one or more cell reselection parameters. One or both of neighboring cell relative mobility information generator 612 and cell reselection configuration generator 614 may comprise or be realized by node processor(s) 200 of mobile base station relay 112. Specifically, the mobile base station relay 112 may transmit neighboring cell relative mobility information 602, generated by neighboring cell relative mobility information generator 612, to the wireless terminal 116. The mobile base station relay 112 may optionally transmit cell reselection configuration 510 generated by the cell reselection configuration generator 614 to the wireless terminal 116.

In the example embodiment and mode of FIG. 15 and FIG. 16, the node processor(s) 200 of mobile base station relay 112 is configured to generate at least one message comprising an identity of a neighboring cell and neighboring cell relative mobility information indicating mobility state of the neighboring cell relative to the serving cell. The transmitter 224 is configured to transmit the message from the serving cell to the wireless terminal. As explained herein, the neighboring cell relative mobility information is used by the wireless terminal to perform a cell reselection procedure. Such cell reselection procedure may result in a reselection of the neighboring cell.

The mobile base station relay 112 may transmit neighboring cell relative mobility information 602 in a broadcast signal(s) or in system information, such as in a master information block, MIB, or in one or more other system information blocks (SIBs).

As in the preceding embodiment and modes, the wireless terminal 116 comprises transceiver circuitry 276 and node processor(s) 290. The transceiver circuitry 276 comprises terminal transmitter circuitry 277 and terminal receiver circuitry 278.

In the embodiment and mode of FIG. 15-FIG. 18 the wireless terminal 116 comprises cell reselection controller 630. The cell reselection controller 630 may use the neighboring cell relative mobility information 602 to perform a cell reselection procedure, as herein described. The cell reselection controller 630 may comprise or be realized by wireless terminal processor(s) 290.

In the embodiment and mode of FIG. 15-FIG. 16, the receiver circuitry 278 is configured to receive, from the serving cell, at least one message comprising an identity of a neighboring cell and neighboring cell relative mobility information indicating mobility state of the neighboring cell relative to the serving cell. The node processor(s) 290, e.g., cell reselection controller 630, is configured to perform a cell reselection procedure based on the neighboring cell relative mobility information, as herein explained. Such cell reselection procedure may result in a reselection of the neighboring cell.

In an example implementation, the neighboring cell may be mobile relative to the serving cell in a case that at least one transmission and reception point, TRP, 222 for the neighboring cell moves relative to at least one TRP 222 for the serving cell. Conversely, the neighboring cell may be considered to be stationary relative to the serving cell in a case that at least one transmission and reception point, TRP, 222 for the neighboring cell does not move relative to at least one TRP 222 for the serving cell.

5.3 Cell Reselection Based on Neighboring Cell Relative Mobility Information: Example Operation In one example implementation, the neighboring cell relative mobility information 602, transmitted by the mobile base station relay 112A via the cell 114A, may comprise an indication, e.g., a relative mobility indication, for each of some or all of the cells included in the list(s) 400 of neighboring cells. Such relative mobility indication may signify or indicate whether the each of some or all of the neighboring cells is stationary or mobile relative to the cell 114A. For example, the relative mobility indication for the cell 114B, served by the mobile base station relay 112B conjointly moving with the mobile base station relay 112A, may indicate that the cell 114B is stationary relative to the cell 114A. On the other hand, the relative mobility indication for the cell 114C, served by mobile base station relay 112C mounted in a different vehicle, may indicate that the cell 112C is relatively mobile with regard to the cell 114A.

As an exemplary implementation, the relative mobility indicator for each of some or all of the cells included in the list(s) of neighboring cells, e.g., list(s) 400 of neighboring cells, may be included as a part of the aforementioned neighboring cell mobility information 406. Listing 4 shows an example format for a system information block, such as System Information Block SIB3. In the example format of SIB3 shown in Listing 4, for each cell in the list(s) 400 of neighboring cells, the cell mobility information 600 optionally includes neighboring cell relative mobility information 602. For example, in Listing 4 each cell is represented by information element IntraFreqNeighCellInfo, the list(s) 400 of neighboring cells is/are represented by information element IntraFreqNeighCellList, the cell mobility information 600 is represented by information element CellMobilityInfo, and the optional field neighboring cell relative mobility information 602 is represented by information element cellRelativeMobilityIndicator. In the Listing 4 example format, information element cellRelativeMobilityIndicator indicates whether the cell specified by the IntraFreqNeighCellInfo is relatively stationary or mobile with regard to the serving cell that broadcasts SIB3.

Listing 4

```
SIB3 ::=                            SEQUENCE {
    intraFreqNeighCellList              IntraFreqNeighCellList
    OPTIONAL,  -- Need R
    intraFreqBlackCellList              IntraFreqBlackCellList
    OPTIONAL,  -- Need R
    lateNonCriticalExtension            OCTET STRING
    OPTIONAL,
    ...,
    [[
    intraFreqNeighCellList-v1610        IntraFreqNeighCellList-v1610
    OPTIONAL,  -- Need R
    intraFreqWhiteCellList-r16          IntraFreqWhiteCellList-
r16                                         OPTIONAL, -- Cond
SharedSpectrum2
```

-continued

Listing 4

```
    intraFreqCAG-CellList-r16                    SEQUENCE (SIZE
(1..maxPLMN)) OF IntraFreqCAG-CellPerPLMN-r16
OPTIONAL    -- Need R
    ]]
}
IntraFreqNeighCellList ::=                      SEQUENCE (SIZE
(1..maxCellIntra)) OF IntraFreqNeighCellInfo
IntraFreqNeighCellList-v1610::=                 SEQUENCE (SIZE
(1..maxCellIntra)) OF IntraFreqNeighCellInfo-v1610
IntraFreqNeighCellInfo ::=                      SEQUENCE {
    physCellId                                  PhysCellId,
    q-OffsetCell                                Q-OffsetRange,
    q-RxLevMinOffsetCell                        INTEGER (1..8) OPTIONAL,  --
Need R
    q-RxLevMinOffsetCellSUL                     INTEGER (1..8) OPTIONAL,  --
Need R
    q-QualMinOffsetCell                         INTEGER (1..8) OPTIONAL,  --
Need R
    cellMobilityInfo                            CellMobilityInfo OPTIONAL,  --
Need R
    ...
}
CellMobilityInfo ::=                     SEQUENCE {
    cellMobilityIndicator                   ENUMERATED {mobile, stationary }
    cellMobilitySpeedClass                  ENUMERATED {High, Mid, Low, spare}
OPTIONAL,  -- Need R
    cellMobilityDirection                   ENUMERATED {N, NE, E, SE, S, SW, W,
NW} OPTIONAL,  -- Need R
    cellMobilityPosition cellPosition,                    -- Need R
    cellRelativeMobilityIndicator ENUMERATED {mobile,
stationary} OPTIONAL, -- Cond cellMobInd
    ...
}
```

In the format shown in Listing 4, the indicator "cellRelativeMobilityIndicator" may be relevant only in a case that both a serving cell and a corresponding neighboring cell are mobile. Thus, the neighboring cell relative mobility information 602 for a corresponding neighboring cell may be optionally present, e.g., may be present only when both the serving cell mobility information indicates that the serving cell is mobile and the neighboring cell mobility information also indicates that the neighboring cell is mobile.

Table 1 shows information about cell mobility broadcasted by the cell 114A of FIG. 15. The serving cell mobility information 320 may indicate that the serving cell 114A is mobile, whereas neighboring cell mobility information 602 may indicate that the two neighboring cells, cell 114B and cell 114C are mobile, and may also indicate that the cell 108a and 108b are stationary, e.g., stationary relative to the ground. In addition, the indicator cellRelativeMobilityIndicator, expressed as "relative mobility" in Table 1 and herein also known as neighboring cell relative mobility information 602, may indicate that cell 114B, conjointly moving with cell 114A, is relatively stationary, while the cell 114C is relatively mobile since cell 114C also moves, but not conjointly with cell 114A, e.g., cell 114C moves differently than cell 114A. In moving "differently" cell 114C moves at either a different rate or different direction than the reference cell, e.g., cell 114A. The indicator for cell 108a or cell 108b, e.g., neighboring cell relative mobility information 602, may not be present, e.g., may be omitted, since they are stationary cells.

TABLE 1

| Cell | Mobility | Relative mobility |
| --- | --- | --- |
| Cell 114A (serving cell) | mobile | N/A |
| Cell 114B (neighboring cell) | Mobile | Stationary |

TABLE 1-continued

| Cell | Mobility | Relative mobility |
| --- | --- | --- |
| Cell 114C (neighboring cell) | Mobile | Mobile |
| Cell 108a (neighboring cell) | stationary | not present |
| Cell 108b (neighboring cell) | stationary | not present |

In similar manner, Table 2 shows information about cell mobility, e.g., cell mobility information 600, broadcasted by the cell 114C of FIG. 15, wherein the "mobile" neighboring cells, e.g., cell 114A and 114B, are mobile relative to cell 114C.

TABLE 2

| Cell | Mobility | Relative mobility |
| --- | --- | --- |
| Cell 114C (serving cell) | mobile | N/A |
| Cell 114A (neighboring cell) | Mobile | Mobile |
| Cell 114B (neighboring cell) | Mobile | Mobile |
| Cell 108a (neighboring cell) | Stationary | not present |
| Cell 108b (neighboring cell) | Stationary | not present |

In another configuration, the neighboring cell relative mobility information, such as the neighboring cell relative mobility information 602 of FIG. 15, may further comprise additional parameters with regard to mobility/movement of a neighboring cell relative to a serving cell. For example, such parameters may include a relative speed/velocity and/or a speed class (e.g., high/mid/low) between the serving cell and a neighboring cell.

As an example implementation, the neighboring cell relative mobility information 602 may be utilized by a wireless terminal to improve performance of a cell reselection procedure while the wireless terminal is in an idle state, e.g., RRC_IDLE, or in an inactive state, e.g., RRC_INACTIVE. In the scenario illustrated in FIG. 15, the wireless terminal 116 camps on the cell 114A. The cell 114A may configure the wireless terminal 116 with list(s) 400 of neighboring cells and a cell reselection configuration 510, preferably along with cell mobility information 600, to perform the cell reselection procedure in accordance with one or more of the previously disclosed embodiments. However, in an example implementation of the example embodiment and mode of FIG. 15-FIG. 18, the wireless terminal 116 may be further configured with neighboring cell relative mobility information 602. As a result, the wireless terminal may obtain the information shown in Table 1, which indicates that (1) the serving cell, e.g., cell 114A, is mobile, (2) the neighboring cell 114B is mobile and relatively stationary, (3) the neighboring cell 114C is mobile but not relatively stationary, and (4) the other neighboring cells 108a and 108b are stationary. Based on information such as that of Table 1, the wireless terminal may treat the cell 114B in a special or distinct manner during the cell reselection procedure. That is, the wireless terminal 116 may evaluate the candidate cells for cell reselection using the neighboring cell relative mobility information 602 as a factor. For example, the neighboring cell relative mobility information 602 may indicate that a candidate cell moving relative to the serving cell, and thus also possibly toward the wireless terminal 116, may be a better candidate than another cell that moves conjointly with the serving cell. In another example, the neighboring cell relative mobility information may be used to prioritize a candidate cell that moves conjointly with the serving cell, over another candidate cell moving relative to the serving cell. Example cell re-selection scenarios and/or evaluation criteria for cell re-selection scenarios are described below.

For example, a preceding embodiment discloses use of a timer $T_{reselectionVMR}$ to differentiate a likelihood of reselecting a mobile cell from a likelihood of reselecting a stationary cell. The timer may also be used to differentiate a likelihood of a wireless terminal in a vehicle reselecting a mobile cell mounted on the vehicle, from a likelihood of a wireless terminal not in the vehicle reselecting the mobile cell. In an example implementation of the example embodiment and mode of FIG. 15-FIG. 18, the wireless terminal, configured by a serving cell with multiple timer configurations, may select and invoke a suitable timer upon evaluating a neighboring cell, based on the mobility of the currently serving cell, e.g., serving cell mobility information 320, as well as the mobility of the neighboring cell, e.g., mobility to the ground and/or relative mobility. Five example cases are described below.

Case 1: a serving cell is stationary, and a neighboring cell is also stationary, e.g., stationary relative to the ground. In this case 1, the regular reselection timer, such as $T_{reselectionNR}$ or $T_{reselectionEUTRA}$, may be used to reselect the stationary neighboring cell. This is the situation, for example, in FIG. 7 wherein wireless terminal 116, camping on cell 108a, uses the regular reselection timer, $T_{reselectionNR}$ or $T_{reselectionEUTRA}$, when evaluating cell 108b.

Case 2: a serving cell is stationary, and a neighboring cell is mobile, e.g., mobile in relation to the ground. In this case, the timer $T_{reselectionVMR}$ may be used. For example, wireless terminal 116 of FIG. 11, camping on the stationary cell 108a, may use $T_{reselectionVMR}$ to evaluate cell 114. As disclosed in the previous embodiment, it may be assumed that $T_{reselectionVMR}$ is longer than $T_{reselectionNR}$ or $T_{reselectionEUTRA}$, in order to discourage the wireless terminal to reselect the mobile neighboring cell unless the wireless terminal is certain to move along with the mobile neighboring cell.

Case 3: a serving cell is mobile, and a neighboring cell is stationary, e.g., stationary in relation to the ground. In one example scenario, the timer $T_{reselectionVMR}$ may be used to encourage the wireless terminal inside a vehicle covered by the serving cell to stay on the serving cell. In this scenario, for example, wireless terminal 116 of FIG. 3, camping on the mobile cell 114, may use the timer $T_{reselectionVMR}$ to evaluate the stationary cell 108a or 108b. In another example scenario of the same case, the wireless terminal may be configured to use the regular timer, $T_{reselectionNR}$ or $T_{reselectionEUTRA}$. This is based on a consideration where the mobile serving cell should be stable as far as the wireless terminal stays on the vehicle and thus a shorter timer value is suitable to detect the wireless terminal departs off from the vehicle in a timely manner.

Case 4: a serving cell is mobile, and a neighboring cell is mobile, e.g., mobile in relation to the ground, and relatively moving from the serving cell. In this case, the timer $T_{reselectionVMR}$ may be used with the same reason described in Case 2, e.g., to discourage camping on the neighboring cell. For example, wireless terminal 116 of FIG. 15, camping on the mobile cell 114A, may use $T_{reselectionVMR}$ to evaluate cell 114C.

Case 5: a serving cell is mobile, and a neighboring cell is mobile, e.g., in relation to the ground, but relatively stationary to the serving cell. This case is similar to Case 1 in terms of relationship between the two cells, and thus the regular reselection timer, $T_{reselectionNR}$ or $T_{reselectionEUTRA}$, may be used. For example, wireless terminal 116 of FIG. 15, camping on the mobile cell 114A, may use $T_{reselectionNR}$ or $T_{reselectionEUTRA}$ to evaluate the mobile cell 114B conjointly moving with cell 114A.

Table 3 shows a summary of the above five cases, describing example timer configurations for cell reselections, based on mobility state of a serving cell and a neighboring cell, as well as relative mobility of the neighboring cell.

TABLE 3

| Case | Serving cell mobility state | Neighboring cell mobility state | Neighboring cell relative mobility | Cell reselection timer to be used |
|---|---|---|---|---|
| Case 1 | stationary | stationary | — | $T_{reselectionNR}$ or $T_{reselectionEUTRA}$ |
| Case 2 | stationary | mobile | — | $T_{reselectionVMR}$ |
| Case 3 | mobile | stationary | — | $T_{reselectionVMR}$, or ($T_{reselectionNR}$ or $T_{reselectionEUTRA}$) |
| Case 4 | mobile | mobile | Mobile | $T_{reselectionVMR}$ |
| Case 5 | mobile | mobile | Stationary | $T_{reselectionNR}$ or $T_{reselectionEUTRA}$ |

In one example implementation, the cell selection timer to be used for each case of Table 3 may be pre-determined or pre-configured to the wireless terminal. In another example implementation, the cell selection timer to be used for each case of Table 3 may be network-configured by a base station serving a serving cell via system information broadcast. In this latter example implementation, the serving cell may include information representing cell reselection timer configurations, e.g., Table 3, in one or more master/system information blocks, MIB/SIBs. Using the pre-determined, pre-configured or network-configured cell reselection timer configurations, the wireless terminal may select and apply an adequate timer when evaluating a neighboring cell, based on mobility state of the serving cell and the neighboring cell, as well as relative mobility of the neighboring cell.

In addition, the set of cell reselection timers does not have be limited to the ones described above, e.g., does not have to be limited to $T_{reselectionNR}$, $T_{reselectionEUTRA}$ and $T_{reselectionVMR}$. That is, the pre-determined, pre-configured or network configured cell reselection timer configurations may have flexibilities in assigning any timer value in each case of Table 3. For example, it is possible to assign a different timer configuration for each of the cases.

Thus, in general, the neighboring cell relative mobility information such as neighboring cell relative mobility information 602 may be used to differentiate the behavior/performance of the cell reselection procedure. For example, the wireless terminal may be configured with at least two sets of cell reselection configuration parameters: a first set may be used for evaluating a neighboring cell whose relative mobility is stationary, e.g., moving conjointly, and one or more other set(s) may be used for evaluating a neighboring cell for other cases. Each set may comprise the cell reselection timer configuration(s), e.g., $T_{reselectionVMR}$, or $T_{reselectionNR}$ or $T_{reselectionEUTRA}$), as disclosed above, and may further comprise cell reselection parameters, e.g., thresholds, offsets, etc., such as $Q_{meas,s}$, $Q_{hyst}$, $Q_{offsettemp}$ and/or $Q_{VMRn}$ disclosed previously. The values of such parameters may differ by each set. If a neighboring cell, e.g., cell 114B of FIG. 15, conjointly moves with a serving cell, e.g., cell 114A of FIG. 15, the cell reselection parameters in the first set may be used. Otherwise, a different set of cell reselection parameters may be used. The at least two sets of cell reselection parameters may be pre-determined, pre-configured to the wireless terminal, or network-configured, e.g., by system information broadcast, to the wireless terminal.

Figure 17:
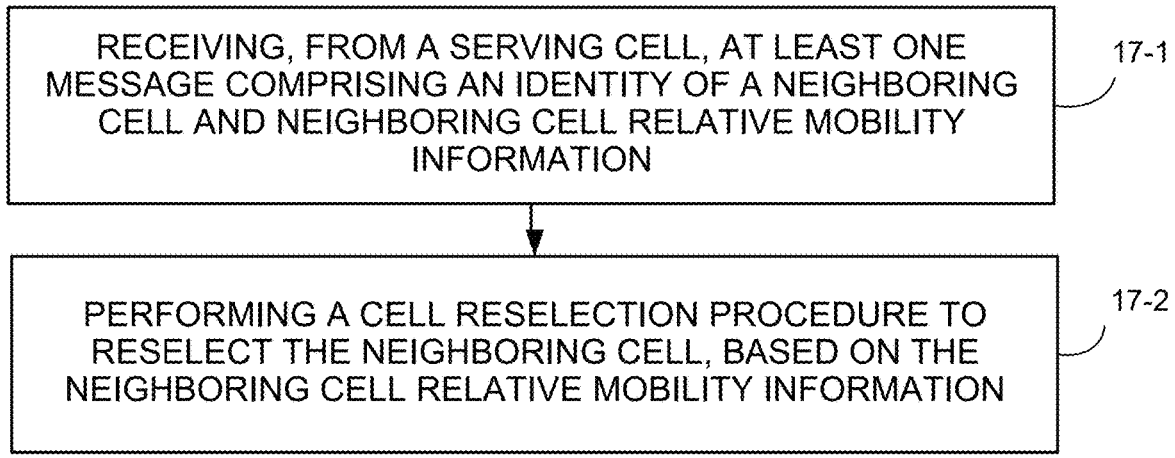
FIG. 17 is a flowchart view showing representative, example steps or acts performed by a wireless terminal of the communications system of the example embodiment and mode of FIG. 15.

FIG. 17 is a flow chart showing example representative steps or acts performed by a wireless terminal, e.g., the wireless terminal 116 of FIG. 15. Act 17-1 comprises receiving, from a serving cell, at least one message comprising an identity of a neighboring cell and neighboring cell relative mobility information. The neighboring cell relative mobility information indicates mobility state of the neighboring cell relative to the serving cell. In one configuration, the mobility state comprises an indication indicating whether the neighboring cell is stationary or mobile relative to the serving cell. In another configuration, the mobility state further comprises a speed or a speed class of the neighboring cell relative to the serving cell. Act 17-2 comprises performing a cell reselection procedure based on the neighboring cell relative mobility information. The cell reselection procedure may result in reselection of the neighboring cell. During the cell reselection procedure, a set of cell reselection parameters to be used to evaluate the neighboring cell may be determined based on the neighboring cell relative mobility information. The set cell reselection parameters may comprise a timer configuration(s), a threshold(s) or an offset value(s). The set of reselection parameters may be pre-determined, pre-configured to the wireless terminal or network configured to the wireless terminal.

Figure 18:
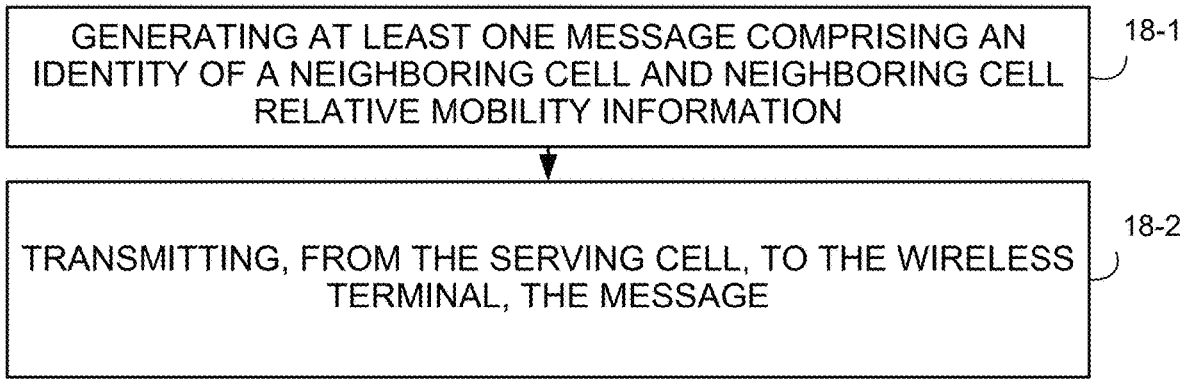
FIG. 18 is a flowchart view showing representative, example steps or acts performed by a mobile base station relay of the communications system of the example embodiment and mode of FIG. 15.

FIG. 18 is a flow chart showing example representative steps or acts performed by an access node e.g., the mobile base station relay 112A, 112B or 112C of FIG. 15. Act 18-1 comprises generating at least one message comprising an identity of a neighboring cell and neighboring cell relative mobility information. The neighboring cell relative mobility information indicates mobility state of the neighboring cell relative to the serving cell. In one configuration, the mobility state comprises an indication indicating whether the neighboring cell is stationary or mobile relative to the serving cell. In another configuration, the mobility state further comprises a speed or a speed class of the neighboring cell relative to the serving cell. Act 18-2 comprises transmitting, from the serving cell to the wireless terminal, the message. The neighboring cell relative mobility information is used by the wireless terminal to perform a cell reselection procedure. The cell reselection procedure may result in reselection of the neighboring cell. During the cell reselection procedure, a set of cell reselection parameters to be used to evaluate the neighboring cell may be determined based on the neighboring cell relative mobility information. The set cell reselection parameters may comprise a timer configuration(s), a threshold(s) or an offset value(s). The set of reselection parameters may be pre-determined, pre-configured to the wireless terminal or network configured to the wireless terminal.

6.0 Vehicle Information for Vehicle Mounted Relays

In the example embodiment and mode of FIG. 19-FIG. 26, "vehicle information" is provided by a vehicle mounted relay, VMR, to wireless terminals served by the VMR. The vehicle information may be aimed, e.g., chosen, selected, generated, or formatted, etc., to provide information representing a vehicle, a carrier, or any other types of object(s) where the VMR is mounted, for the purpose of distinguishing between VMR's and/or identifying a specific VMR. The "vehicle information" is also herein known as vehicle mounted relay, VMR, vehicle information, or "VMR vehicle information", since the vehicle information may pertain to a vehicle on which or in which the mobile base station relay is carried or mounted. As used herein, the expression "on which the mobile base station relay is mounted" also covers a situation of the mobile base station relay being carried on or mounted/carried in a vehicle. The vehicle information may also be known as vehicle identification information. The vehicle information may include, but is not limited to, one of or a combination of the parameters/information elements listed in Listing 5.

Listing 5

Vehicle owner or operator, such as an individual name, a company name, a common carrier name, etc.
Vehicle identification, such as a train number, a bus number, a car number, e.g., vehicle identification number, VIN, etc.
Vehicle itinerary, such as an origin, a destination, a route number, a schedule, etc.
Vehicle type, such as "train", "bus", "taxi", "private", etc.
Vehicle route attributes, such as "fixed route", "unfixed route", etc.

Figure 19:
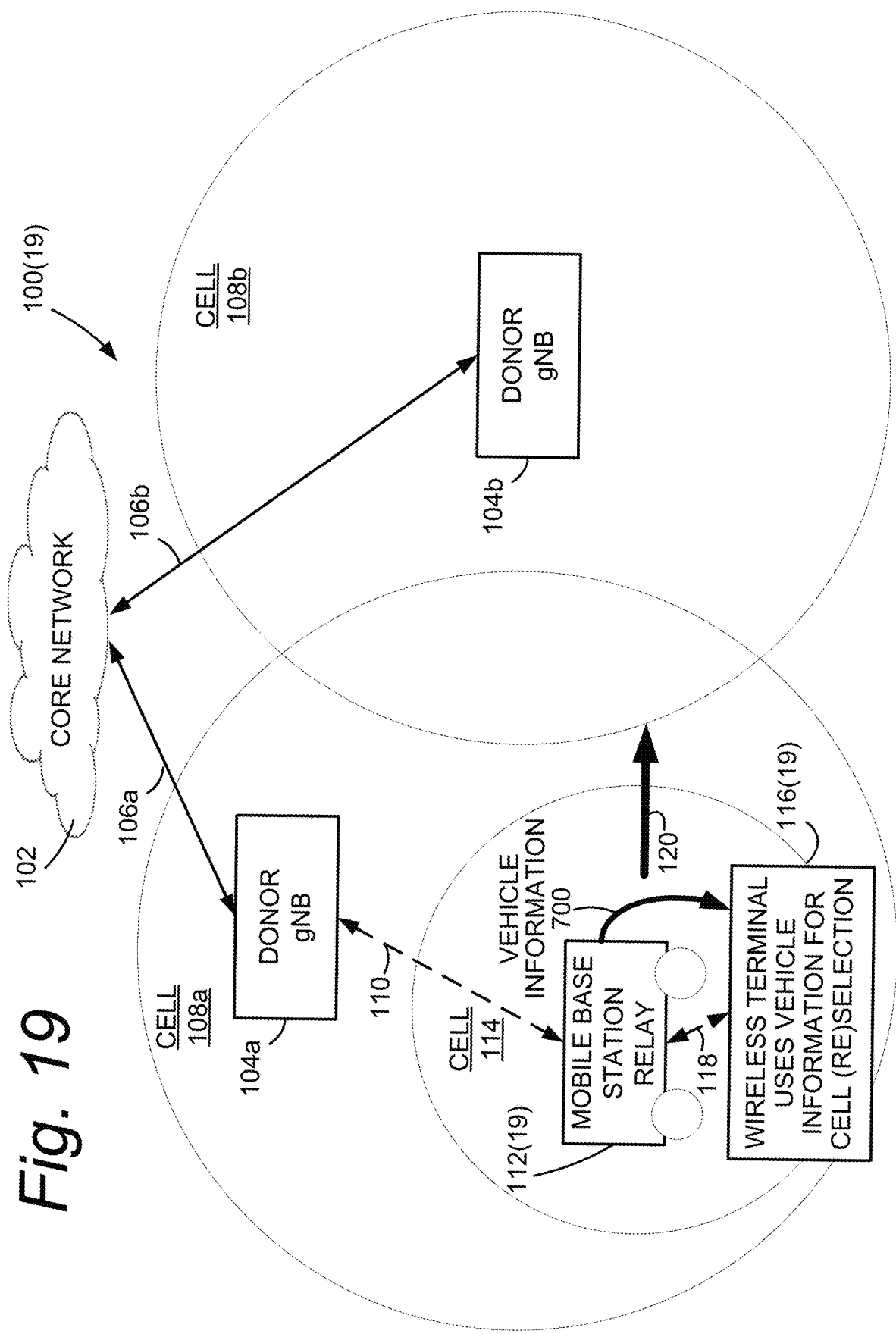
FIG. 19 is a diagrammatic view of a communications system showing both a core network and radio access network, with the radio access network including a mobile base station relay which transmits vehicle identification information.

FIG. 19 illustrates an example scenario in which "vehicle information" is provided by a vehicle mounted relay (VMR) to wireless terminals served by the VMR. For example, FIG. 19 illustrates an example communication system 100(19) where the vehicle information may be used, based on the communication system shown in FIG. 1. In particular, FIG. 19 shows that mobile station relay 112(19) provides vehicle information 700 to wireless terminal 116(19), which is in the coverage area of cell 114.

Figure 20:
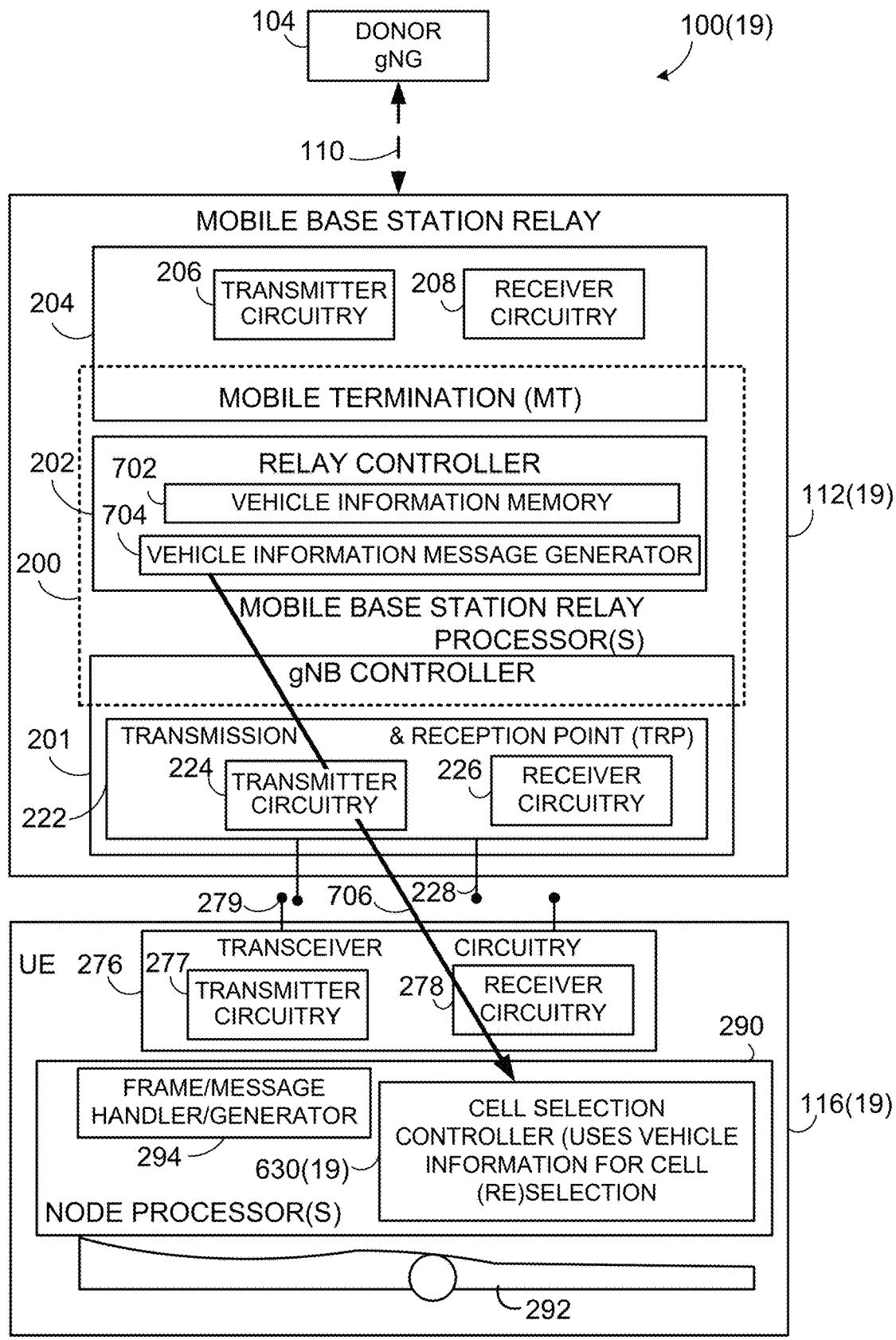
FIG. 20 is a schematic view of an embodiment and mode communications system showing example structures and functionalities of a donor gNB, a mobile base station relay, and a wireless terminal according to the example embodiment of FIG. 19.

FIG. 20 shows example structures and functionalities of the example embodiment and mode communications system 100(19) of FIG. 19. FIG. 20 shows, e.g., radio access network including a donor gNB node 104, mobile base station relay 112(19), and wireless terminal 116(19). The structures and functionalities of the example embodiment and mode of FIG. 19 are essentially the same as those shown by corresponding reference numerals in the preceding figures, unless otherwise noted or evident from the context.

As in the preceding embodiment and modes, the mobile base station relay 112(19) includes gNB controller 201; relay controller 202; and mobile termination (MT) function 204. The gNB controller includes transmission and reception point (TRP) 222, which in turn comprises transmitter 224 and receiver 226.

In the example embodiment and mode of FIG. 19, and as shown in more detail in FIG. 20, mobile base station relay 112(19) includes vehicle information memory 702 and vehicle message generator 704. The vehicle information memory 702 and/or vehicle information message generator 704 may comprise or be realized by node processor(s) 200 of mobile base station relay 112(19), or may comprise another processor(s) or memory device(s) as herein described with reference to FIG. 26, for example. The vehicle information 700 stored in vehicle information memory 702 may be configured in the vehicle information memory 702, e.g., pre-configured or entered/stored therein through an interface, such as a user input device, or configured during use such as by being downloaded or wirelessly received from another node or entity. The vehicle information message generator 704 is configured and operated to access content or data of the vehicle information memory 702 to generate a vehicle information message, such as the vehicle information message shown as arrow 706 in FIG. 20. In various modes and embodiments, the vehicle information message generator 704 may include the vehicle information in a vehicle information message 706 which may take the form of a dedicated message, a broadcast signal(s), or system information, such as in a master information block, MIB, or in one or more other system information blocks (SIBs).

FIG. 20 shows wireless terminal 116(19) as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 20 further shows wireless terminal 116(19) also comprising wireless terminal processor circuitry, e.g., one or more wireless terminal processor(s) 290. The wireless terminal 116(19), e.g., wireless terminal processor(s) 290, may comprise frame/message generator/handler 294. The wireless terminal 116(19) may also comprise interfaces 292, including one or more user interfaces. Such user interfaces may serve for both user input and output operations, and may comprise (for example) a screen such as a touch screen that can both display information to the user and receive information entered by the user. The user interface 292 may also include other types of devices, such as a speaker, a microphone, or a haptic feedback device, for example.

In the embodiment and mode of FIG. 19-FIG. 26, the wireless terminal 116(19) comprises cell (re)selection controller 630(19). The cell (re)selection controller 630(19) may use the vehicle information 700 to perform a cell selection procedure or a reselection procedure, as herein described. Herein, "use" of the vehicle information 700 to perform a cell selection procedure or a reselection procedure may include using the vehicle information as input for criteria for the cell selection procedure or the reselection procedure. Since the controller 630(19) may perform either a cell selection procedure or a reselection procedure according to a particular situation, the controller 630(19) is referred to as cell (re)selection controller 630(19), with the "(re)" indicating that cell reselection may be performed if a cell has previously been selected. The cell (re)selection controller 630(19) may comprise or be realized by wireless terminal processor(s) 290.

In the embodiment and mode of FIG. 19-FIG. 26, the receiver circuitry 278 is configured to receive the vehicle information 700 from the serving cell, e.g., at least one message comprising the vehicle information 700, such as vehicle information message 706. The node processor(s) 290, e.g., cell (re)selection controller 630(19), is configured to perform a cell reselection procedure based on the vehicle information 700, as herein explained. Such cell reselection procedure may result in a reselection of a neighboring cell.

6.1 Vehicle Information for Manual VMR Selection

Figure 21:
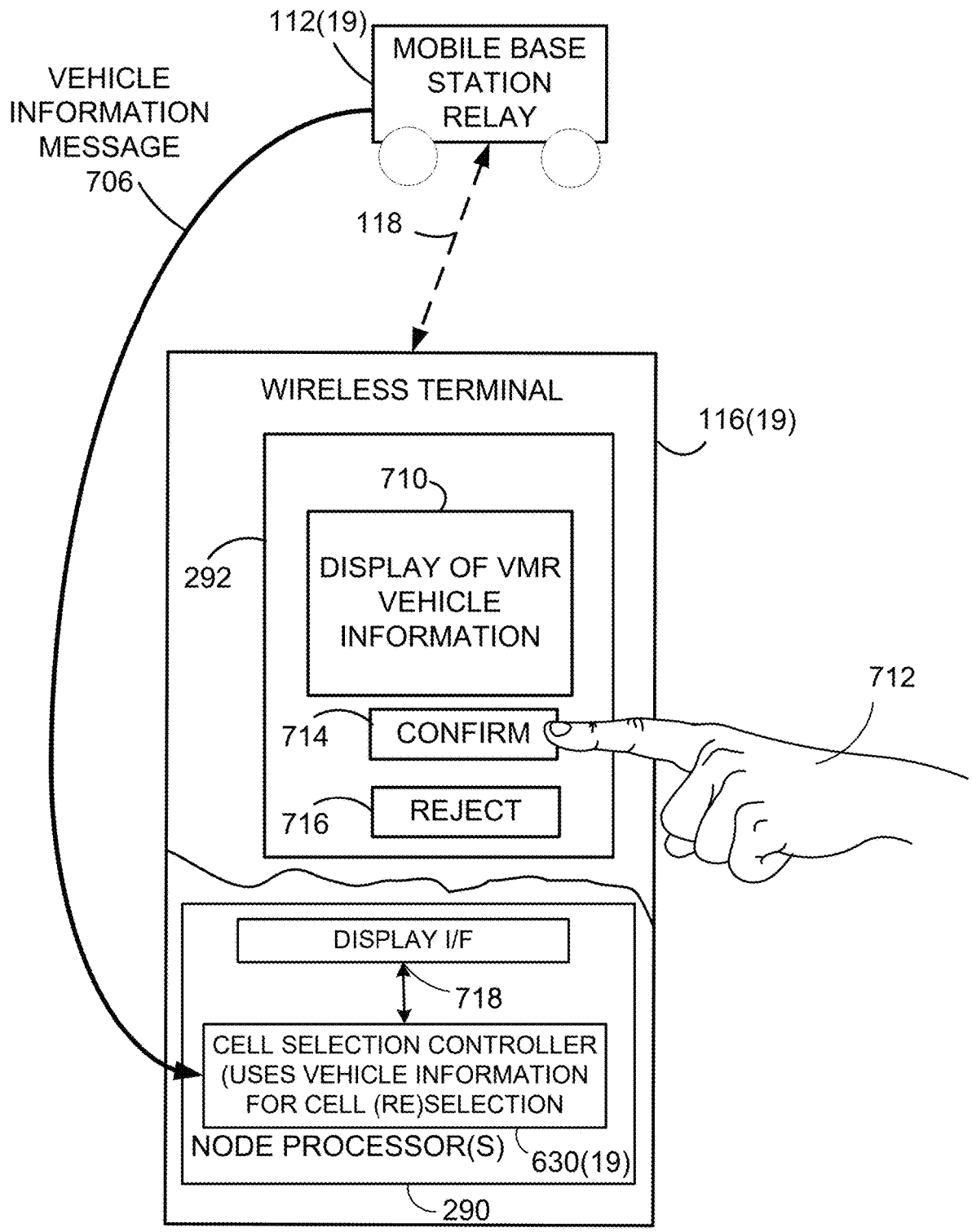
FIG. 21 is a diagrammatic view showing a mobile base station relay which transmits vehicle identification information to a wireless terminal, and wherein the wireless terminal uses the received vehicle information to perform a manual VMR selection.

FIG. 21 illustrates one example embodiment and mode and one example use case scenario in which the vehicle information may be used by a wireless terminal to perform a manual VMR selection. FIG. 21 particularly shows that user interface 292 of wireless terminal 116(19) may comprise a display, such as a touch panel display, on which the vehicle identification information received from the mobile base station relay 112(19) is provided or represented in user-discernable form, e.g., visually, as illustrated by the text "display of VMR vehicle information" depicted in display field 710 of user interface 292. The display of the VMR vehicle information may allow a user 712 of the wireless terminal to confirm/acknowledge the user's intention to use a VMR mounted in a specific vehicle. In such a use case, the wireless terminal 116(19) may use its user interface 292 to present the vehicle information in a literal, graphical, or other audio/visible means, and receive a confirmation/acknowledgement from the user. FIG. 21 shows user 712 selecting between an option to "confirm" or "reject" the particular VMR illustrated in field 710, the particularly VMR having its vehicle identification information shown in field. 710. For example, the user 712 may select between a "confirm" touch field 714 and a "reject" touch field 716 on the touch screen of user interface 292. As shown in FIG. 21, the cell (re)selection controller 630(19) may be connected to a display interface 718 which drives the display of the vehicle identification information on field 710 and which senses touch or activation of either of the confirm touch field 714 or the reject touch field 716. Entry by the user 712 of a "confirm" or "reject" input is not limited to input via a touch screen, but could be by other input devices as well such as a keyboard or even voice recognition, for example.

Manual VMR selection as described with reference to FIG. 21, for example, may be useful in a scenario such as that depicted in FIG. 22A and FIG. 22B, wherein there are two vehicles, vehicle 730-1 and vehicle 730-2, located in proximity. Vehicle 730-1 and vehicle 730-2 are equipped with mobile base station relays 112(19)-1 and 112(19)-2, respectively. In both FIG. 22A and FIG. 22B, wireless terminal 116(19) is located inside, e.g., located in or carried on, vehicle 730-1(19).

Figure 22A:
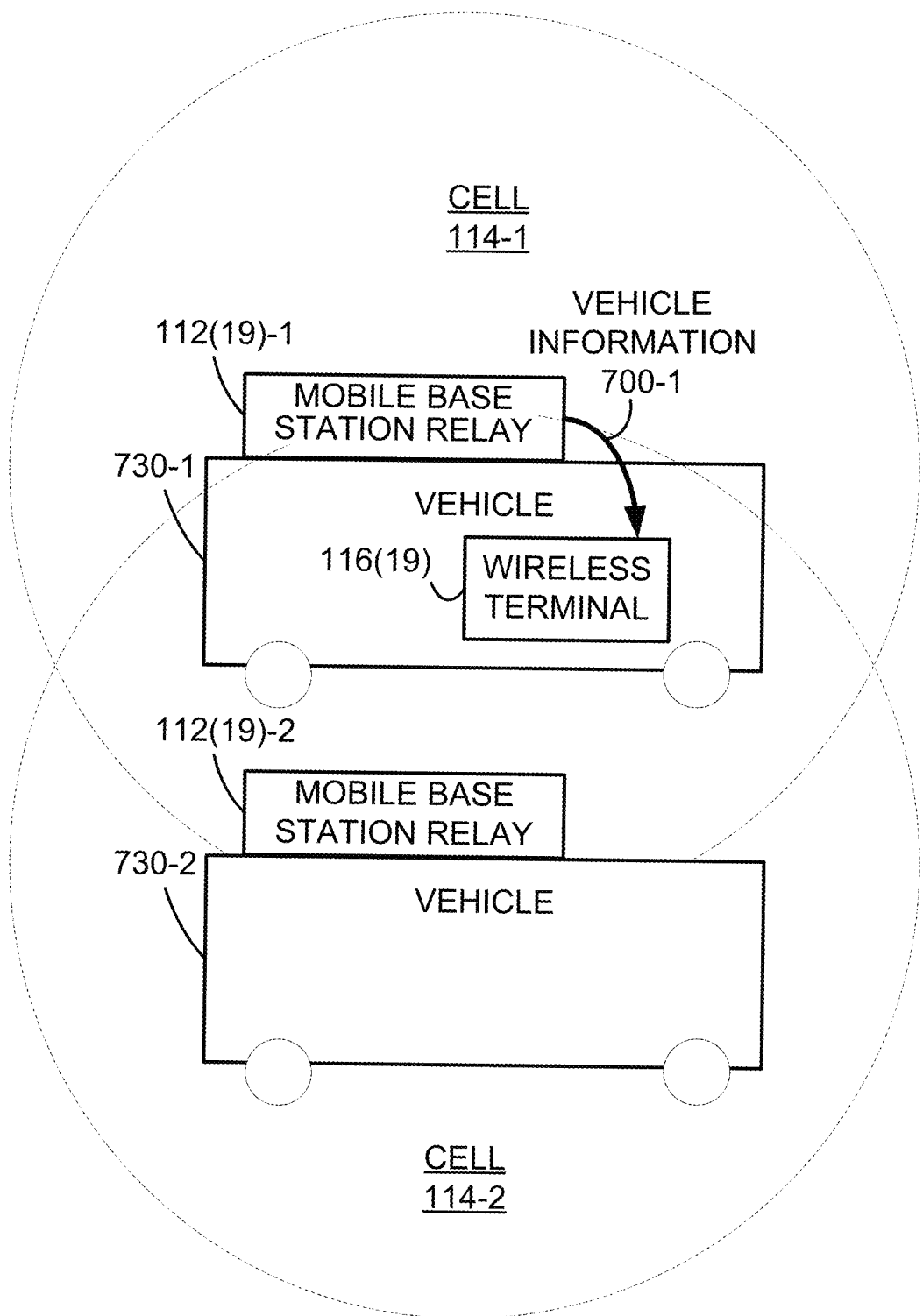
FIG. 22A is a diagrammatic view showing an example scenario in which a wireless terminal, which camps on a mobile base station relay carried by a vehicle in which a user of the wireless terminal travels, receives vehicle information indicating the vehicle in which the user travels, thereby providing the user with an opportunity to confirm or affirm the vehicle information, and thereby also influence a cell selection or reselection procedure.

FIG. 22A shows a scenario where wireless terminal 116(19) camps on mobile base station relay 112(19)-1, from which wireless terminal 116(19) obtains vehicle information 700-1. In the scenario of FIG. 22A, wireless terminal 116(19) may display a human-recognizable representation of vehicle information 700-1, such as a bus number, and/or a destination of vehicle 730-1. Such display of the human-recognizable representation of vehicle information 700-1 may be, for example, provided in display field 710 of FIG. 21. The display of the human-recognizable representation of vehicle information 700-1 may help a user of wireless terminal 116(19) to manually acknowledge or confirm mobile base station relay 112(19)-1. The user may recognize that the vehicle information 700-1 presented by the user interface 292 of wireless terminal 116(19) matches user's recognition of the vehicle, i.e., vehicle 730-1, that the user is currently in, and thus the user may take an affirmative action, e.g., confirm or make an acknowledgement, on the user interface, such as confirming the displayed vehicle information, as discussed above for example in conjunction with FIG. 21. Thus, FIG. 22A shows an example scenario in which a wireless terminal 116(19), which camps on a mobile base station relay 112(19)-1 carried by a vehicle 730-1 in which a user of the wireless terminal travels, receives vehicle information 700-1 indicating the vehicle 730-1 in which the user travels, thereby providing the user with an opportunity to confirm or affirm the vehicle information 700-1, and thereby also influence a cell selection or reselection procedure for wireless terminal 116(19).

Figure 22B:
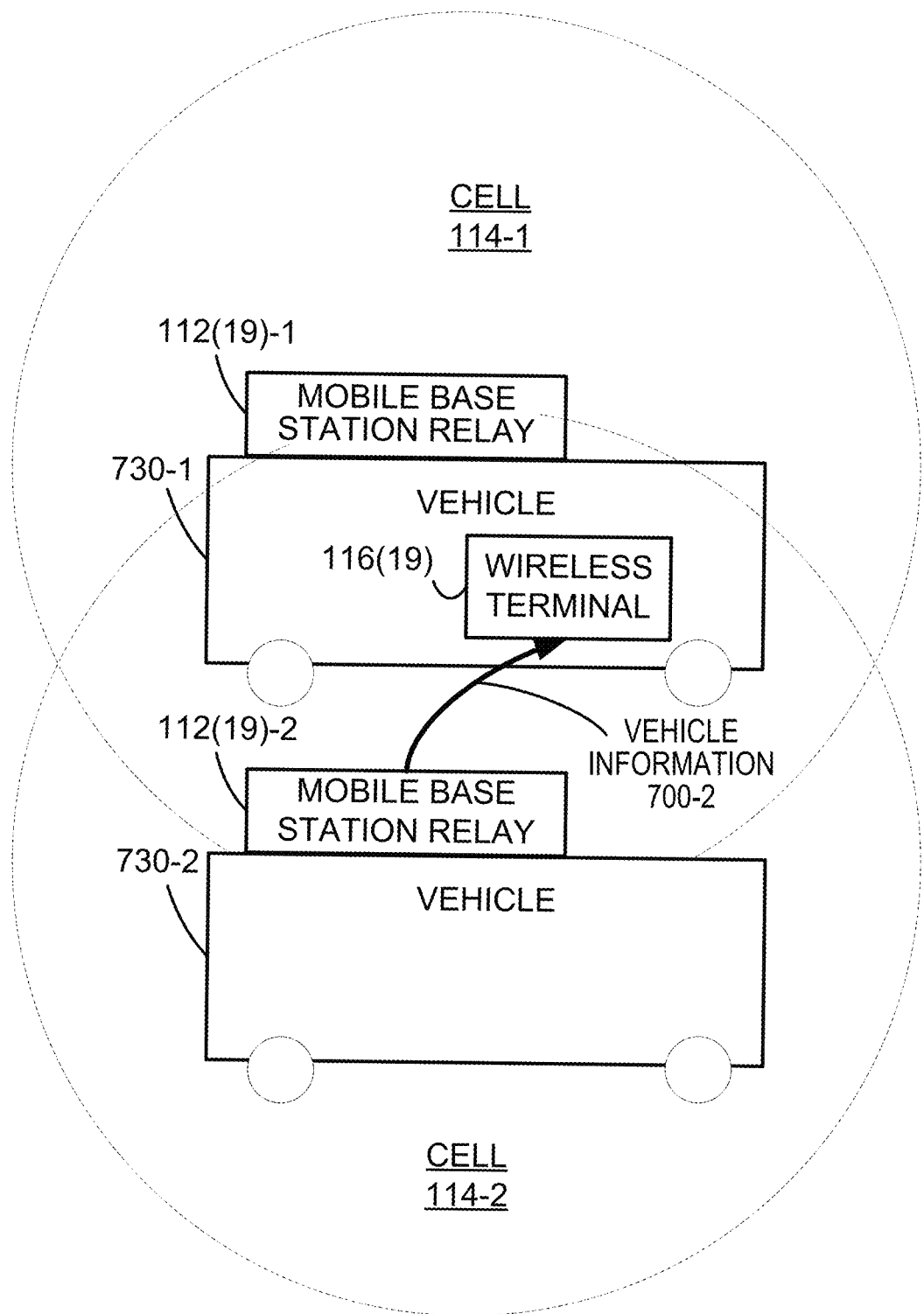
FIG. 22B is a diagrammatic view showing an example scenario in which a wireless terminal, which camps on a mobile base station relay carried by a vehicle other than a vehicle in which a user of the wireless terminal travels, receives vehicle information indicating the other vehicle, thereby providing the user with an opportunity to reject or negatively acknowledge the vehicle information, and thereby also influence a cell selection or reselection procedure.

FIG. 22B shows another scenario in which wireless terminal 116(19) camps on mobile base station relay 112 (19)-2, from which wireless terminal 116(19) obtains vehicle information 700-2. In the scenario of FIG. 22B, wireless terminal 116(19) may display a human-recognizable representation of vehicle information 700-2, such as a bus number, and/or a destination of vehicle 730-2. In this case the user may recognize or realize that the vehicle information 700-2 presented by the user interface of wireless terminal 116(19) does not match the user's recognition of the vehicle, i.e., vehicle 730-1, that the user currently occupies or travels in, and thus the user may take a negative action, e.g., rejection or negative-acknowledgement, on the user interface 292, such as denying the displayed vehicle information by activating or selecting reject field 716 as shown in FIG. 21. Thus, FIG. 22B shows an example scenario in which a wireless terminal 116(19), which camps on a mobile base station relay 112(19)-2 carried by a vehicle 730-2 other than the vehicle 730-1 in which the user of the wireless terminal 116(19) travels, receives vehicle information 700-2 indicating the other vehicle 730-2, thereby providing the user with an opportunity to reject or negatively acknowledge the vehicle information 700-2, and thereby also influence a cell selection or reselection procedure for wireless terminal 116(19).

The wireless terminal 116(19) of the example embodiment and mode of FIG. 21, FIG. 22A, and FIG. 22B may alter its behavior on cell selection/reselection procedures, depending on the user action. For example, in the scenario depicted in FIG. 22A, the act of the user confirming the vehicle information presented on wireless terminal 116, i.e., an affirmative action, may permit or cause wireless terminal 116(19) to treat cell 114-1, served by mobile base station relay 112(19)-1, as a mobile cell, as disclosed in the example embodiment and mode of FIG. 11-FIG. 14 and/or section 4.3 hereof. For example, in such case that wireless terminal 116(19) may apply $Q_{VMRs}$ for the computation of $R_s$, to ensure that wireless terminal is likely to stay on camping the cell 114-1.

On the other hand, in the scenario depicted in FIG. 22B, preferably based on the user's negative action, wireless terminal 116(19) may treat cell 114-2, which wireless terminal 116(19) camps on, in a manner different from the scenario of FIG. 22A for cell 114-1. In one implementation, wireless terminal 116(19) may treat cell 114-2 as a non-mobile cell, e.g., ignoring cellMobilityIndicator disclosed in the example embodiment and mode of FIG. 3 and FIG. 4 and/or section 2.2 hereof and/or ignoring cellMobilityInfo disclosed in the example embodiment and mode of FIG. 7-FIG. 10 and/or section 3.3 hereof). Such treatment(s) may mean that wireless terminal may treat cell 114-1 as a regular cell and no special treatment may be performed. In another implementation, wireless terminal 116(19) may apply one or more designated cell reselection parameters/criteria for cell 114-2. For example, $R_s$ for cell 114-2 may be derived by Expression [1].

$$R_s = Q_{meas,s} + Q_{hyst} - Q\text{offset}_{temp} - Q_{unselected} \qquad \text{Expression [1]:}$$

In Expression [1], $Q_{unselected}$ is an offset value aimed to reduce the likelihood of wireless terminal 116(19) staying on cell 114-2. $Q_{unselected}$ may be pre-configured to wireless terminal 116(19) or configured to wireless terminal via signaling from mobile base station relay 112(19)-2, such as system information.

6.2 Vehicle Information for Automatic Cell Selection

Figure 23:
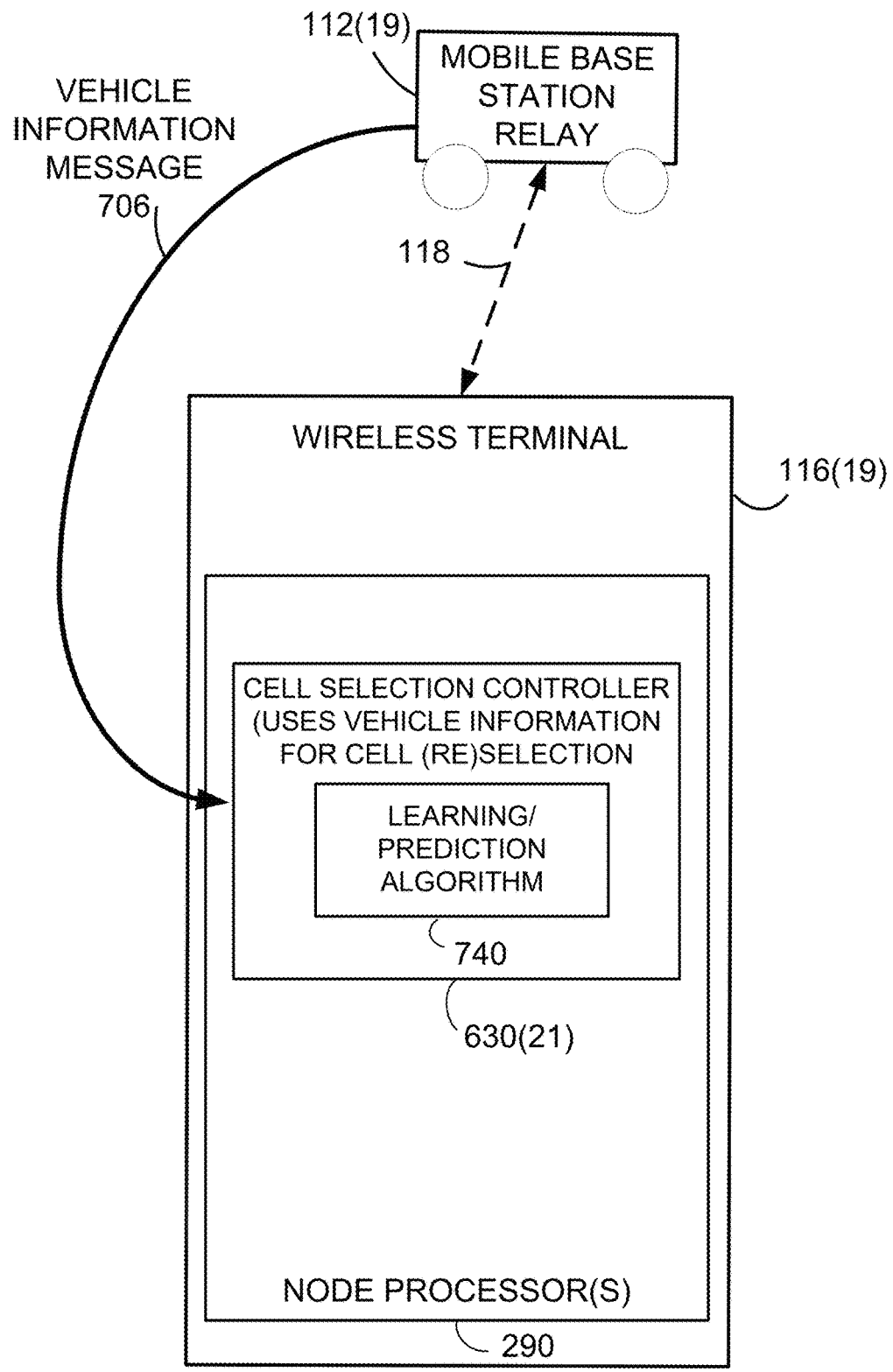
FIG. 23 is a diagrammatic view showing a mobile base station relay which transmits vehicle identification information to a wireless terminal, and wherein the wireless terminal uses the received vehicle information in automatic cell selection/reselection with predicted/scheduled mobility.

As another use case or example implementation, the vehicle information may be used in automatic cell selection/reselection for a wireless terminal with predicted/scheduled mobility. Such a wireless terminal may be equipped with a learning/prediction algorithm, such as Machine Learning and Artificial Intelligence with training data. For example, as illustrated in FIG. 23, the processor 290 of the wireless terminal 116(19), may execute instructions, stored on non-transitory processor readable media, comprising a learning/prediction algorithm 740. The learning/prediction algorithm generates, based on the vehicle information and learning data, an inference of whether or not the wireless terminal is likely to be associated with the vehicle. As used herein, a wireless terminal being "associated with the vehicle" includes the wireless terminal and the vehicle being in a relationship or proximity and/or possessing a common mobility. For example, a wireless terminal residing in and moving along with a vehicle may be considered to be associated with the vehicle. As such, a cell served by a mobile base station relay carried in or on the vehicle is likely to be considered as a cell for selection or re-selection by the wireless terminal. The learning/prediction algorithm 740 may be performed by cell (re)selection controller 630(21) of wireless terminal 116(19). The training data that may be utilized may be, for example, schedule of for each day of a week, commute routes and/or public transportation usage. The learning algorithm 740 may generate an inference to help the wireless terminal 116(19) in determining whether to select/reselect a cell served by a mobile base station relay. For example, in a case that the learning algorithm 740 infers that a camped cell is likely to match the user's predicted behavior, the wireless terminal 116(19) may treat this inference as an affirmative action disclosed above. In another case that the learning algorithm 740 infers that a camped cell is unlikely to match the user's predicted behavior, the wireless terminal 116(19) may treat this inference as a negative action disclosed above.

6.3 Vehicle Information Encoding

The vehicle information of any of the example implementations of FIG. 18-FIG. 26 may be encoded in one of or a combination of multiple methods. One of such multiple methods may utilize pre-defined values/codes. Table 4 shows example pre-defined values for the elements of the vehicle information listed in Listing 5. In this case that the vehicle information is to be displayed in user interface, the wireless terminal may translate the pre-defined values to a human-readable format.

TABLE 5

| Owner | Value | Vehicle ID | Origin/dest | Value | Type | Value | Route att. | Value |
|---|---|---|---|---|---|---|---|---|
| A | 0 | (integer) | Town a | 23 | Train | 0 | Fixed | 0 |
| B | 1 | | Town b | 33 | Bus | 1 | Unfixed | 1 |
| C | 2 | | Town c | 55 | Taxi | 2 | | |
| D | 3 | | Town d | 11 | Private | 3 | | |
| reserved | 4-255 | | ... | ... | Reserved | 4-15 | | |

Another method for encoding is that the vehicle information may be encoded with a human-readable text format, for example, "Owner A, Bus number 213, town a→town b". Such human-readable text may be directly used for display purposes.

6.4 Vehicle Information Message Types

In one example configuration, the vehicle information 700 of one or more of the implementations described herein may be broadcasted by a mobile base station relay via its serving cell. In the scenario of FIG. 22A or FIG. 22B, vehicle information 700-1 and vehicle information 700-2 may be broadcasted by mobile base station relay 112(19)-1 and mobile base station relay 112(19)-2, respectively. The vehicle information may be included in a master information block, MIB, system information block 1, SIB1, one or more other SIBs, or a combination thereof.

In another alternative or additional configuration, the vehicle information 700 of one or more of the implementations described herein may be transmitted by a mobile base station relay to a wireless terminal via dedicated signaling, such as an RRC message or a Non-Access Stratum, NAS, message. In this configuration, the vehicle information may be provided to the wireless terminal while in radio resource control_Connected state, i.e., the RRC_Connected state.

6.5 Vehicle Information: Multiple Sources

Figure 24:
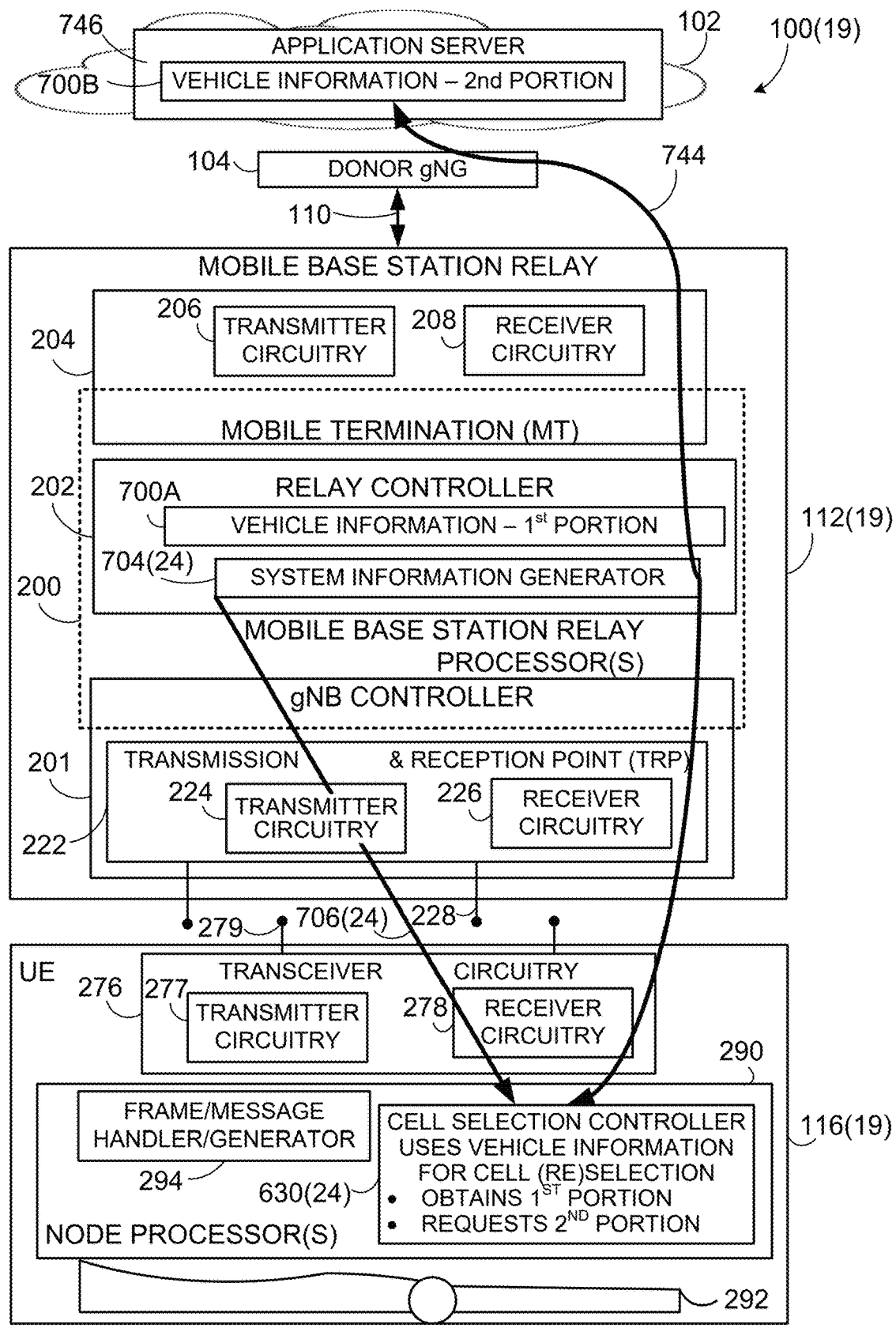
FIG. 24 is a schematic view of a communications system in which a wireless terminal obtains segmented vehicle information from one or a plural of sources.

In yet another alternative or additional configuration, the vehicle information may be segmented, fragmented, or decomposed into parts so that various ones of the segmented parts of the vehicle information may be provided by one or more multiple network entities. For example, some parts of the vehicle information may be provided by a first network entity while the remaining parts may be provided by a second network entity(ies). As illustrated in the example scenario of FIG. 24, a first portion or first set of the vehicle information 700A, may be stored in vehicle information memory 702. The first portion or first set of the vehicle information 700A, such as a Train Number, which may be a small portion of the vehicle information, may be broadcasted by a mobile base station relay via system information. FIG. 24 shows vehicle information message generator 704 (24) as being a system information generator which includes the first portion of the vehicle information 700A in system information. The wireless terminal 116(19) of FIG. 24 that receives the first portion or first set 700A in a system information block, depicted by 706(24) of FIG. 24, may use the first portion of the vehicle information 700A to initiate a query, e.g., an on-demand request, to the second network entity(ies). For example, FIG. 24 shows cell (re)selection controller 630(24) as receiving/obtaining the first portion or first set of the vehicle information 700A from a first source, e.g., mobile base station relay 112(19), and then generating a query to request a second portion 700B or second set of the vehicle information. For example, FIG. 24 shows cell (re) selection controller 630(24) as generating a query as depicted by arrow 744, e.g., query 744, to a second source of the vehicle information, such as an application server 746, to obtain the second portion or second set 700B of the vehicle information, e.g., the remaining parts, such as origin, destination, company, etc. The double headed arrow 744 represents both the query for the second portion 700B, and a response which supplies the second portion 700B to the wireless terminal 116(19). For this case, the first portion 700A may further include an address, e.g., URL, of the application server 746. Alternatively or additionally, the first portion may comprise a tag/token/reference number that represents the vehicle information, which may be used in the query.

Whereas FIG. 24 shows wireless terminal 116(19) as obtaining the segmented vehicle information from multiple sources, i.e., from mobile base station relay 112(19), it should be understood that the wireless terminal 116(19) may alternatively obtained the segmented vehicle information from one sources, i.e., from mobile base station relay 112(19) obtain the first segment via a first message, and afterward upon request receive from mobile base station relay 112(19) the second segment of the vehicle information in another message.

6.6 Vehicle Information: Wireless Terminal Operation

Figure 25:
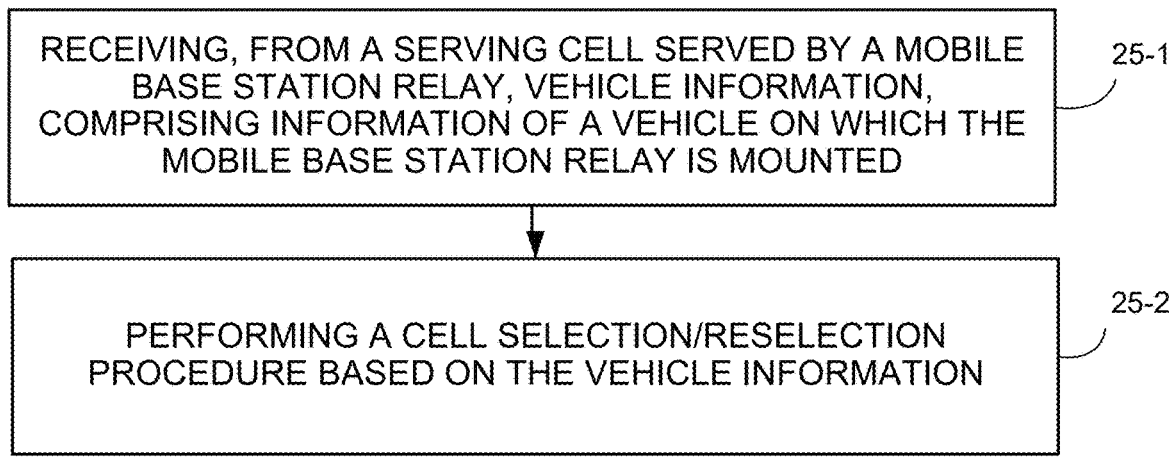
FIG. 25 is a flowchart view showing representative, example steps or acts performed by a wireless terminal of the communications system of the example embodiment and mode of FIG. 19.

FIG. 25 is a flow chart showing example representative steps or acts performed by a wireless terminal, e.g., the wireless terminal 116(19) of the example embodiment and mode of FIG. 19-FIG. 26.

Act 25-1 comprises receiving, from a serving cell served by a mobile base station relay, vehicle information, comprising information of a vehicle on which the mobile base station relay is mounted. The vehicle information may be included in system information transmitted by the mobile base station relay. Alternatively or additionally, the vehicle information may be included in one or more messages dedicated to the wireless terminal. The vehicle information may comprise one or more information elements. Some of the one or more information elements may be encoded using pre-determined values, whereas some of the one or more information elements may be encoded in human-readable text. A first portion of first set of the one or more information elements may be provided by the mobile base station relay and a second portion of second set of the one or more information elements may be provided by one or more network entities. The second set may be provided upon a request from the wireless terminal to the one or more network entities, based on the provisioning of the first set of the one or more information elements.

Act 25-2 comprises performing a cell selection/reselection procedure based on the vehicle information. During the cell selection/reselection procedure, a determination of whether the wireless terminal is likely to be associated with the vehicle may be made, and the cell selection/reselection procedure is performed based on the determination. Specifically, in a case that the determination determines that the wireless terminal is likely to be associated with the vehicle, a first set of parameters may be applied to the cell selection/reselection procedure, and in a case that the determination determines that the wireless terminal is unlikely to be associated with the vehicle, a second set of parameters different from the first set of parameters may be applied to the cell selection/reselection procedure. In one implementation, the wireless terminal may be equipped with a user interface device, which is used for presenting the vehicle information in a human-recognizable manner and receiving an acknowledgement/negative-acknowledgement for the presented vehicle information. In this implementation, if the user interface receives the acknowledgement, the determination may determine that the wireless terminal is likely to be associated with the vehicle. On the other hand, if the user interface receives the negative-acknowledgement, the determination may determine that the wireless terminal may be unlikely to be associated with the vehicle. In another implementation, the wireless terminal may feature a learning/prediction algorithm that may generate, based on the vehicle information and learning data, an inference of whether or not the wireless terminal is likely to be associated with the vehicle.

6.7 Vehicle Information: Node Operation

Figure 26:
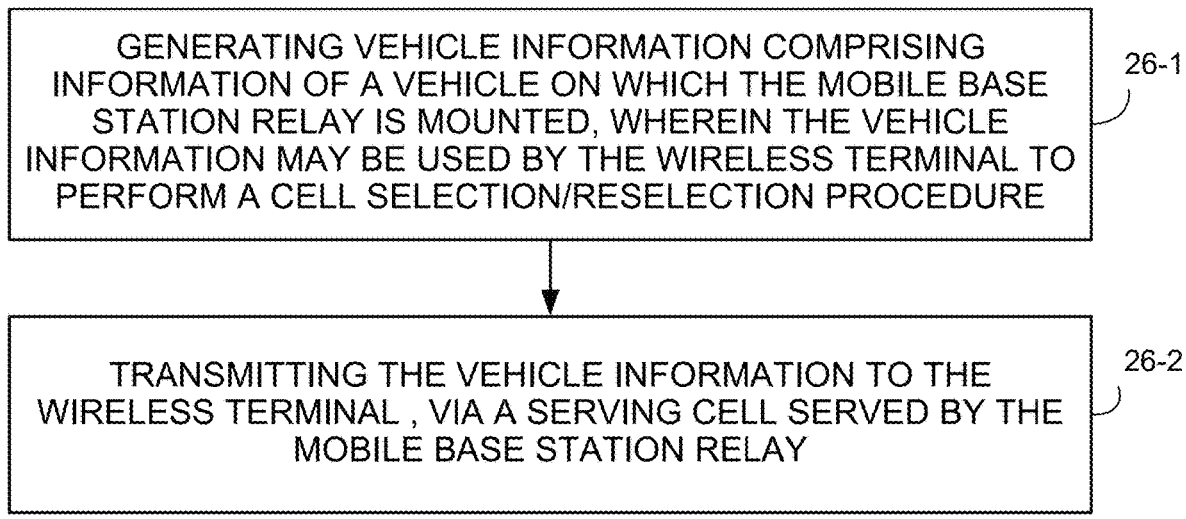
FIG. 26 is a flowchart view showing representative, example steps or acts performed by a mobile base station relay of the communications system of the example embodiment and mode of FIG. 19.

FIG. 26 is an example flow chart showing example representative steps or acts performed by a mobile base station relay, such as mobile base station relay 112(19) of the example embodiment and mode of FIG. 19-FIG. 26.

Act 26-1 comprises generating vehicle information comprising information of a vehicle on which the mobile base station relay is mounted, wherein the vehicle information may be used by the wireless terminal to perform a cell selection/reselection procedure. The cell selection/reselection procedure may be performed by the wireless terminal based on the determination of whether the wireless terminal is likely to be associated with the vehicle. The vehicle information may be included in system information transmitted by the mobile base station relay. Alternatively or additionally, the vehicle information may be included in one or more messages dedicated to the wireless terminal. The vehicle information may comprise one or more information elements. Some of the one or more information elements may be encoded using pre-determined values, whereas some of the one or more information elements may be encoded in human-readable text.

Act 26-2 comprises transmitting the vehicle information to the wireless terminal, via a serving cell served by the mobile base station relay.

7.0 Soft Cell Identity Change on Vehicle Mounted Relay

In a typical cellular communication system, such as the 5G NR system driven by 3GPP, a cell may be assigned with at least one cell identity. A first type cell identity may be either (1) uniquely assigned globally, or (2) uniquely assigned within a certain boundary, such as a country and a network operator, e.g., PLMN. One example of the first type cell identity is NR Cell Global Cell Identifier, NCGI.

A second type cell identity is a cell identity with a limited code space used without defined boundaries. The second type cell identity may be assigned in such a manner to ensure a same cell identity is not used by nearby cells. Physical Cell ID, PCI is an example of the second type cell identity.

Both the NR Cell Global Cell Identifier, NCGI, and the Physical Cell ID, PCI, are described, for example, in 3GPP TS 38.300 V16.8.0 (2021-12), 3rd Generation Partnership Project; Technical Specification Group Radio Access Network; NR; NR and NG-RAN Overall Description; Stage 2, (Release 16), incorporated herein by reference.

When deploying cells, a network operator may allocate PCIs to the cells operated on a same frequency in a manner to avoid potential collisions. For example, the PCIs may be allocated so that, at a given location and a given time, it is unlikely that a wireless terminal, e.g., User Equipment, UE, would detect two cells sharing the same PCI. The PCI of a cell may be encoded in a broadcast signal transmitted by a base station serving the cell, such as a primary synchronization signal, PSS, and/or a secondary synchronization signal, SSS.

Allocations of second type cell identities to mobile cells served by Vehicle Mounted Relays (VMRs), such as the mobile base station relays disclosed in the previous embodiments, may be problematic. A problem may arise, for example, since the allocations made at a certain time of instance cannot guarantee collision-avoidance for a later time. For example, a mobile cell served by a mobile base station mounted on a traveling bus may travel and possibly end up being in proximity to a fixed cell or another mobile cell with the same PCI.

To avoid PCI confusion for wireless terminals, the network should prevent two cells in proximity from sharing the same second type cell identity. Accordingly, in the example embodiment and mode of FIG. 27-FIG. 33, when two or more mobile cells with a same second type cell identity come in proximity, at least one of the two or more mobile cells may have to change its second type cell identity. Detecting a possible collision of such two or more mobile cells and triggering a second type cell identity change are discussed in conjunction with the example embodiment and mode of FIG. 27-FIG. 33.

7.1 Soft Cell Identity Change: Example Scenario

Figure 27:
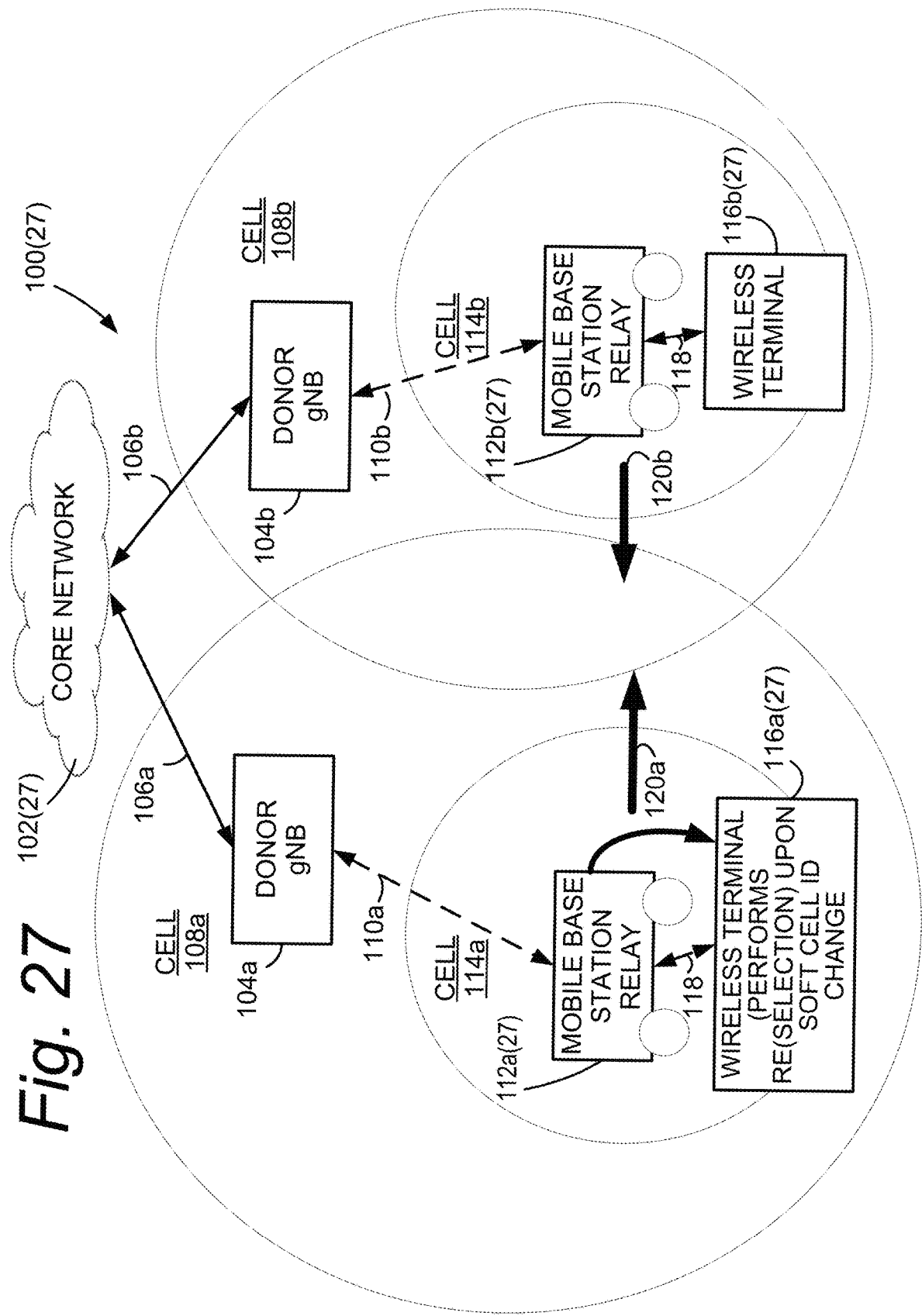
FIG. 27 is a diagrammatic view of a communications system showing both a core network and radio access network and illustrating an example, representative scenario in a communications network inviting a soft cell identity change for a cell served by a mobile relay base station.

FIG. 27 illustrates an example communication system 100(27) wherein two mobile cells, cell 114*a* and cell 114*b*, are served by mobile station relay 112*a*(27) and mobile station relay 112*b*(27), respectively. The two mobile base station relays, mobile station relay 112*a*(27) and mobile station relay 112*b*(27), are connected to Donor gNB 104*a* and Donor gNB 104*b*, respectively, through wireless backhaul link 110*a* and wireless backhaul link 110*b*, respectively. In the example of FIG. 27, initially cell 114*a* and cell 114*b* are assigned with a same PCI. But as the two mobile base station relays, mobile station relay 112*a*(27) and mobile station relay 112*b*(27), get closer each other, a decision may be made to change the PCI for one of the cells. In the example described herein, a decision is made to change the PCI for cell 114*a*.

There are several ways to change a cell identity, e.g., to change a second type cell identity. One of such ways is to shut down/deactivate a cell with a current or old cell identity and then to initiate/activate a new cell with a different cell identity. This way may be referred as "hard cell identity change". Another way is to initiate/activate a new cell with a different cell identity before shutting down/deactivating a cell with an old cell identity, which may be referred as "soft cell identity change". The example embodiment and mode of FIG. 27-FIG. 33 discloses methods and apparatus for soft cell identity change for a cell served by a mobile relay base station.

Figure 28:
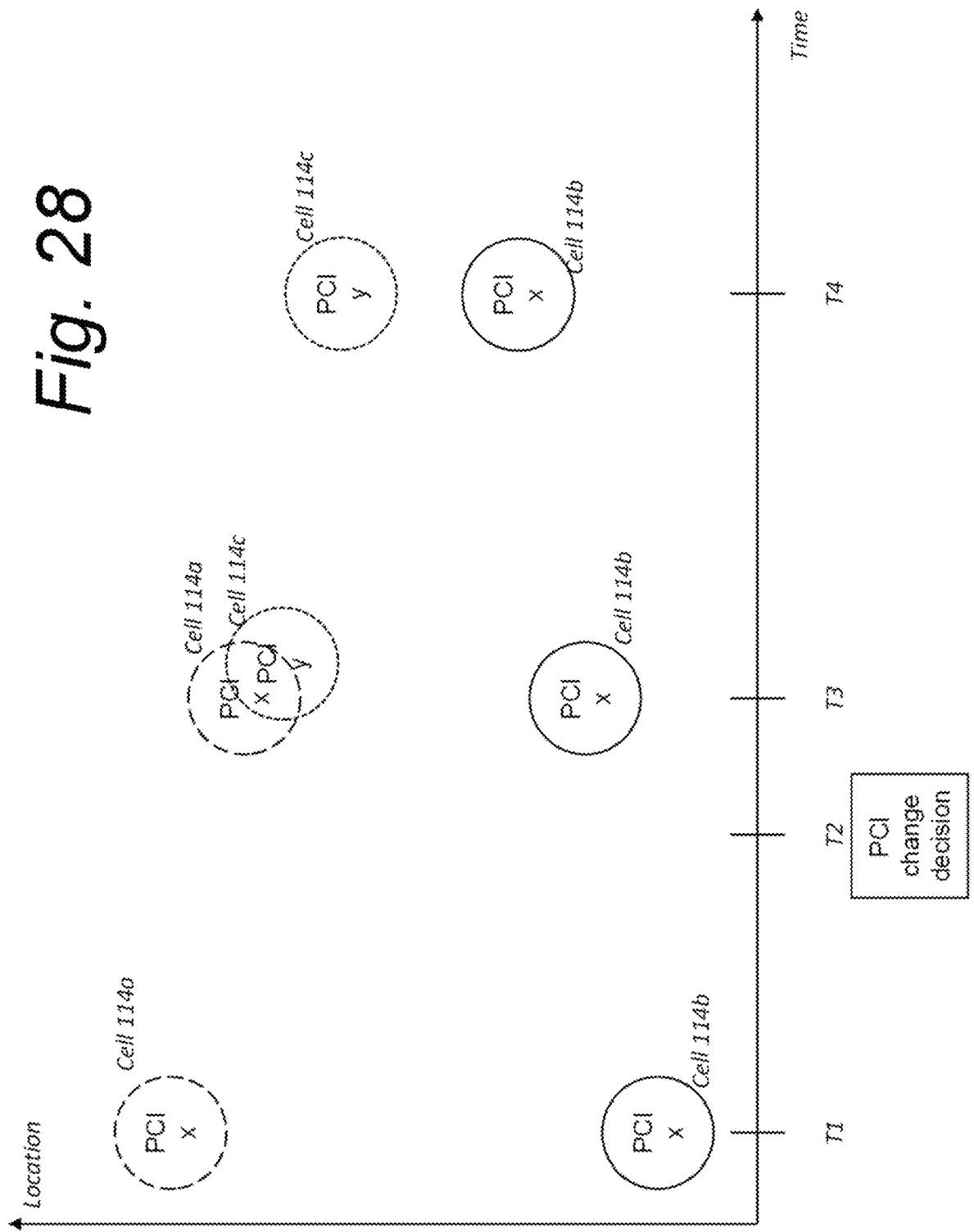
FIG. 28 is a two dimensional graph depicting a soft cell identity change for a cell served by a mobile relay base station as a function of time and distance.

FIG. 28 shows an example scenario of a soft cell identity change for the communication system depicted in FIG. 27. At time T1, cell 114*a* and cell 114*b*, both assigned with PCI x, are located in the distance still sufficient to avoid a PCI collision. As time advances, the two cells are approaching each other. At time T2 a possible PCI collision is anticipated. In response to the anticipated collision, a decision is made by a network entity to change the PCI of one of the two cells, as an example cell 114*a* for the scenario of FIG. 28. The decision may cause, at time T3, mobile base station relay 112*a*(27) of FIG. 27 to initiate/activate a new cell, cell 114(27)*c* of FIG. 28, with a different PCI, i.e., PCI y. Consequently, from time T3, mobile base station relay 112*a*(27) concurrently serves cell 114*a* and cell 114*c*. Then, at time T4, mobile base station relay shuts down/deactivates cell 114*a*.

The detection of a possible PCI collision may be performed by a network entity, such as Access and Mobility Management Function (AMF) of a core network which manages locations of mobile base station relays under its control. An example network entity is illustrated as a node in core network 102(27) of FIG. 27. An Access and Mobility Management Function (AMF) is just one example node of core network 102(27) that can make a determination that two mobile relay base stations which are serving two respective cells having a common cell identity are or will be in a predetermined proximity, and also initiate a soft change of cell identity for one of the two respective cells. Other than an Access and Mobility Management Function (AMF), a further example of other core network nodes that could function as the node of core network 102(27) includes a Mobility Management Entity (MME) of Evolved Packet Core (EPC) Examples of other nodes or entities that may not be in a core network that can make the same or similar determination and initiate a soft change of cell identity include one of donor gNBs involved in a possible PCI collision, such as Donor gNB 104*a* or Donor gNB 104*b* of FIG. 27. In this case, Donor gNB 104*a* and Donor gNB 104*b* may communicate via an inter-gNB protocol, such as XnAP protocol per 3GPP TS 38.423, to exchange information of their serving cells, and one of the donor gNBs may make a decision for the soft change of cell identity.

7.2 Soft Cell Identity Change: Network Architecture & Function

Figure 29:
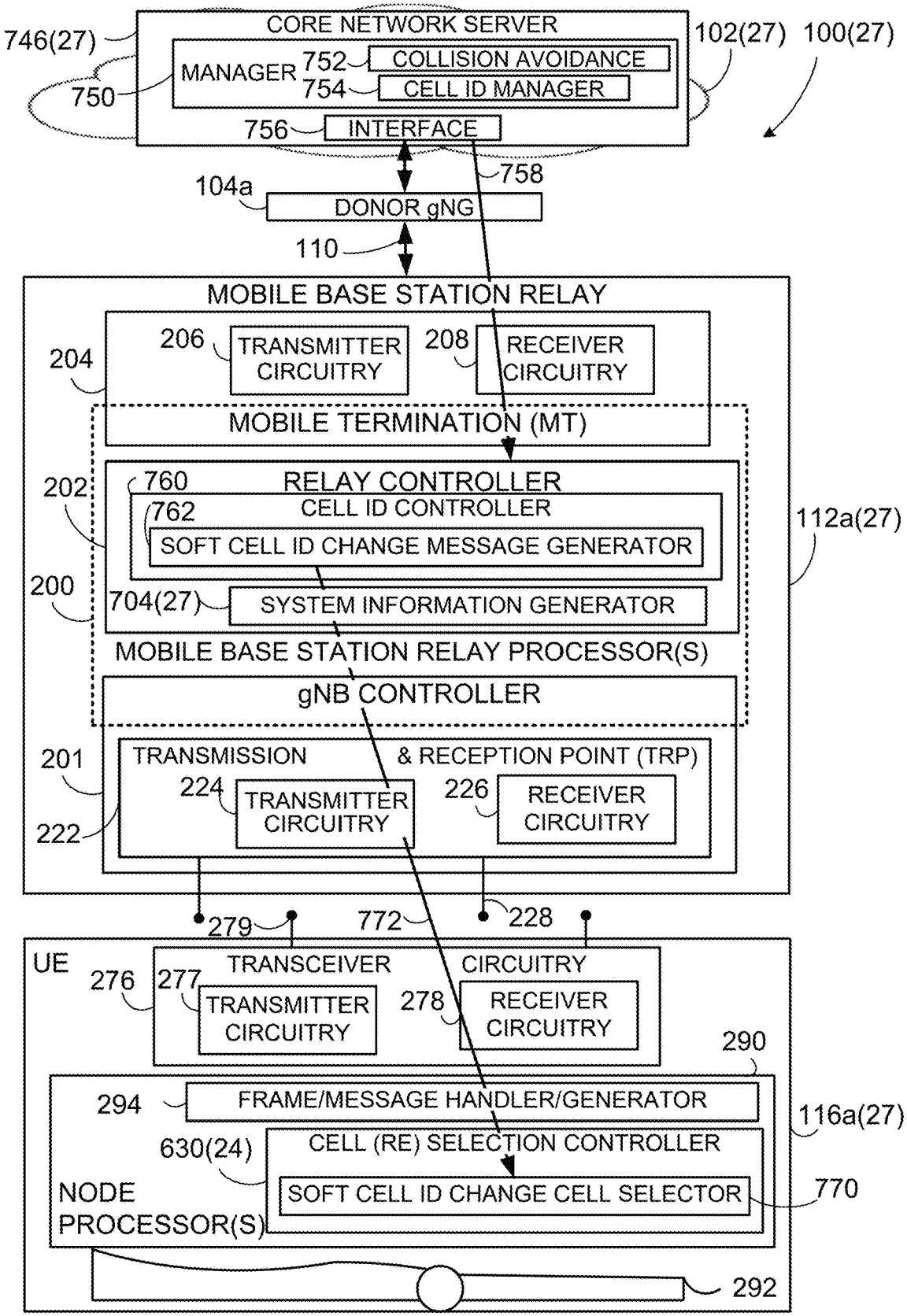
FIG. 29 is a schematic view of an example embodiment and mode communications system showing example structures and functionalities of a core network node, a donor gNB, a mobile base station relay, and a wireless terminal according to the example embodiment of FIG. 27.

FIG. 29 shows example structures and functionalities of portions of the example embodiment and mode communications system 100(27) of FIG. 27. FIG. 29 shows, e.g., core network 102(27) and a radio access network. The radio access network comprises a donor gNB node 104*a*, mobile base station relay such as mobile base station relay 112*a*(27) involved in the scenario of FIG. 28, and wireless terminal 116*a*(27). The structures and functionalities of the example embodiment and mode of FIG. 27 are essentially the same as those shown by corresponding reference numerals in the preceding figures, unless otherwise noted or evident from the context.

In the example embodiment and mode of FIG. 27, and as shown in more detail in FIG. 29, core network 102(27) comprises one or more core network servers 746(27), which may include one or more processors. The core network server 746(27) includes a mobile relay base station manager 750. The mobile relay base station manager 750 in turn comprises mobile relay base station collision avoidance detector 752, and cell identification manager, e.g., cell ID manager 754. The core network 102(27) and/or the core network servers 746(27) communicate through an interface 756 with other entities or networks. Furthermore, the network entity, e.g., a node of core network 102(27), and particular the mobile relay base station collision avoidance detector 752, may have access to information regarding the mobile station relays, for example access to a data base or memory(ies) that include information concerning location, travel direction and speed, and/or itineraries, scheduled mobility, of mobile base station relay 112*a*(27) and mobile base station relay 112*b*(27). The network entity may collect the information regarding the mobile station relays by each of the mobile station relays reporting, to the network entity, its locations, travel direction and speed, and/or itineraries in a periodic manner. The network entity may take such information into consideration for predicting possible PCI collisions in advance. As shown in FIG. 29, the core network 102(27) communicates through interface 756 with the radio access network.

A node of core network 102(27) is an example of a node of a communications network, e.g., a network entity, that can make a determination that two mobile relay base stations serving two respective cells having a common cell identity are or will be in a predetermined proximity, and also initiate a soft change of cell identity for one of the two respective cells. For example, in the example embodiment and mode of FIG. 29 the mobile relay base station collision avoidance detector 752 may make a determination that two mobile relay base stations serving two respective cells having a common cell identity are or will be in a predetermined proximity. Example ways of making such determination are described below, for example with reference to the scenario of FIG. 28. Upon the making of such a determination of possible collision, the cell ID manager 754 may initiate the soft change of cell identity for one of the two respective cells. Through interface 756 the node may transmit one or more messages 758 comprising information for a mobile relay base station serving the one of the two respective cells to implement the soft change of the cell identity.

As in the preceding embodiment and modes, the mobile base station relay mobile station relay 112*a*(27) includes gNB controller 201; relay controller 202; and mobile termination (MT) function 204. The gNB controller includes transmission and reception point (TRP) 222, which in turn comprises transmitter 224 and receiver 226.

In the example embodiment and mode of FIG. 27, and as shown in more detail in FIG. 29, mobile base station relay mobile station relay 112a(27) includes cell ID controller 760, soft cell ID change message generator 762, and system information generator 704(27). The cell ID controller 760, soft cell ID change message generator 762, and system information generator 704(27) may comprise or be realized by node processor(s) 200 of mobile base station relay mobile station relay 112a(27), or may comprise another processor(s) or memory device(s) as herein described with reference to FIG. 57, for example. The soft cell ID change notification 758 may be received from a network entity such as a node of core network 102(27) through receiver circuitry 208. The soft cell ID change notification 758 may cause cell ID controller 760 to activate and deactivate cells, as described below for example with reference to FIG. 30. Further, and as described herein, soft cell ID change message generator 762 may generate one or more messages to wireless terminal 116a(27) in conjunction with a determination by core network 102(27), e.g., by mobile relay base station manager 750 of core network 102(27), that a cell ID of a mobile relay base station should be changed to avoid a cell ID collision.

FIG. 29 shows wireless terminal wireless terminal 116a(27) as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 29 further shows wireless terminal 116(27) also comprising wireless terminal processor circuitry, e.g., one or more wireless terminal processor(s) 290. The wireless terminal 116(27), e.g., wireless terminal processor(s) 290, may comprise frame/message generator/handler 294 and cell (re)selection controller 630(27). The cell (re)selection controller 630(27) comprises a soft cell ID change cell selector 770 utilized by wireless terminal 116a(27) to perform a cell (re)selection based on a soft cell ID change.

The wireless terminal 116(27) may also comprise interfaces 292, including one or more user interfaces. Such user interfaces may serve for both user input and output operations, and may comprise (for example) a screen such as a touch screen that can both display information to the user and receive information entered by the user. The user interface 292 may also include other types of devices, such as a speaker, a microphone, or a haptic feedback device, for example.

In the embodiment and mode of FIG. 27-FIG. 33, the receiver circuitry 278 is configured to receive one or more messages 772 from mobile station relay 112a(27), as described herein, which provide the wireless terminal 116a(27) with information 772 suitable for performing a soft cell ID change reselection. The node processor(s) 290, e.g., soft cell ID change cell selector 770, is configured to perform a cell reselection procedure based on the soft cell ID change instructions/information provided in messages 772.

7.3 Soft Cell Identity Change: Messages to Relay

In the example scenario of FIG. 28, a network entity such as node of core network 102(27) may determine at time T2, based on the decreasing distance between mobile station relay 112a(27) and mobile base station 112b(27), changing the PCI of cell 114a from PCI x to PCI y. The network entity may send one or more messages 758 to mobile base station 112a(27) through donor gNB 110a, the message(s) including an instruction to initiate/activate cell 114c with PCI y.

In one configuration, the instruction may further configure when to initiate cell 114c and/or when to shut down/deactivate cell 114a. In other words, the instruction may configure a deactivation timer to specify timing of T4.

In another configuration, the network entity may send another message for an instruction of shutting down/deactivation of cell 114a, after time T3 and before time T4.

7.4 Soft Cell Identity Change: Messages to Terminal

When a soft cell identity change occurs on a mobile cell, i.e., an old cell, served by a mobile base station relay, a wireless terminal 116a(27) in an idle, e.g., RRC_IDLE, or in an inactive state, e.g., RRC_INACTIVE, camping on the mobile cell may need to reselect another cell, preferably a new cell to be initiated/activated by the same mobile base station relay. Such a cell reselection may be performed by soft cell ID change cell selector 770, and should take place after the new cell gets initiated/activated and before the old cell gets shut down/deactivated. To make this happen, the wireless terminal 116a(27) may need to be informed by the old cell of this soft cell identity change to take place. Furthermore, the wireless terminal 116a(27) may also need to receive additional information regarding the new cell, which the wireless terminal 116a(27) is expected to reselect. In this regard, and in an example embodiment and mode, a notification message broadcasted from the old cell may be used to trigger the wireless terminal's acquisition of system information also broadcasted from the old cell. FIG. 29 depicts as arrow 772 one or more messages transmitted from mobile station relay 112a(27) to wireless terminal 116a(27) in conjunction with a soft cell ID change, including the aforementioned notification message and system information. The system information may comprise an indication of a soft cell identity change, and/or the information of the new cell as a neighboring cell.

In a first example implementation, the notification message may be a Short Message per 3GPP TS 38.331 as shown in Table 6-1. The Short Message of Table 6-1 is that of 3GPP TS 38.331 V16.7.0 (2021 December); 3rd Generation Partnership Project; Technical Specification Group Radio Access Network; NR; Radio Resource Control (RRC) protocol specification (Release 16), which is incorporated herein by reference. In the Short Message of Table 6-1, Bit 1 may be set to 1 to indicate that some of system information blocks (SIBs), other than SIB6, SIB7 and SIB8, gets updated, which triggers the wireless terminal to acquire the SIBs after a next modification boundary. Upon receiving the Short Message with Bit 1 set to 1, the wireless terminal may acquire SIB1 and may further acquire other SIBs.

TABLE 6-1

| Bit | Short Message |
| --- | --- |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |

TABLE 6-1-continued

| Bit | Short Message |
|---|---|
| 3 | stopPagingMonitoring<br>If set to 1: stop monitoring PDCCH occasions(s) for paging in this Paging Occasion. |
| 4-8 | Not used in this release of the specification, and shall be ignored by UE if received. |

In a first example implementation, a first system information block, SIB, may comprise the indication of a soft cell identity change, and a second SIB may comprise the information regarding the new cell. For example, SIB1 of Listing 6 comprises "pciChange" information element indicating whether the old cell, the cell transmitting this SIB1, is in the process of a soft cell identity change. If affirmative, SIB3 of Listing 7 may indicate, by an optional field "newCellForPCIChange", which of the neighboring cells listed in SIB3 is the new cell, the cell that eventually replaces the old cell. As shown in Listing 7, newCellForPCIChange information element may be associated with physCellId information element, which provides the PCI of the new cell.

Listing 6

```
SIB1 ::=      SEQUENCE {
  cellSelectionInfo   SEQUENCE {
    q-RxLevMin                Q-RxLevMin,
    q-RxLevMinOffset          INTEGER (1..8)       OPTIONAL,   -- Need S
    q-RxLevMinSUL             Q-RxLevMin           OPTIONAL,   -- Need R
    q-QualMin                 Q-QualMin            OPTIONAL,   -- Need S
    q-QualMinOffset           INTEGER (1..8)       OPTIONAL    -- Need S
  }                                           OPTIONAL,   -- Cond Standalone
  cellAccessRelatedInfo       CellAccessRelatedInfo,
  connEstFailureControl       ConnEstFailureControl OPTIONAL,   -- Need R
  si-SchedulingInfo           SI-SchedulingInfo OPTIONAL,       -- Need R
  servingCellConfigCommon ServingCellConfigCommonSIB
    OPTIONAL,   -- Need R
  ims-EmergencySupport           ENUMERATED {true} OPTIONAL,   -- Need R
  eCallOverIMS-Support           ENUMERATED {true} OPTIONAL,   -- Need R
  ue-TimersAndConstants          UE-TimersAndConstants OPTIONAL,  -- Need R
  uac-BarringInfo                SEQUENCE {
    uac-BarringForCommon             UAC-BarringPerCatList
      OPTIONAL,   -- Need S
    uac-BarringPerPLMN-List          UAC-BarringPerPLMN-List
      OPTIONAL,   -- Need S
    uac-BarringInfoSetList           UAC-Barring InfoSetList,
    uac-AccessCategory1-SelectionAssistanceInfo CHOICE {
      plmnCommon   UAC-AccessCategory1-SelectionAssistanceInfo,
      individualPLMNList   SEQUENCE (SIZE (2..maxPLMN)) OF
        UAC-AccessCategory1-SelectionAssistanceInfo
    }                                         OPTIONAL      -- Need S
  }                                           OPTIONAL,     -- Need R
  useFullResumeID                ENUMERATED {true}     OPTIONAL,
    -- Need R
  lateNonCriticalExtension       OCTET STRING          OPTIONAL,
  nonCriticalExtension           SIB1-v1610-IEs        OPTIONAL
}
SIB1-v1610-IEs ::=               SEQUENCE {
  idleModeMeasurementsEUTRA-r16       ENUMERATED{true}
    OPTIONAL,   -- Need R
  idleModeMeasurementsNR-r16          ENUMERATED{true}
    OPTIONAL,   -- Need R
  posSI-SchedulingInfo-r16            PosSI-SchedulingInfo-r16
    OPTIONAL,   -- Need R
  nonCriticalExtension                SIB1-v1xxx-IEs       OPTIONAL}
SIB1-v1xxx-IEs ::=               SEQUENCE {
  pciChange                           ENUMERATED{true} OPTIONAL, -- Need R
  nonCriticalExtension                SIB1-v1xxx-IEs             OPTIONAL
}
```

Listing 7

```
SIB3 ::=                          SEQUENCE {
  intraFreqNeighCellList                IntraFreqNeighCellList
    OPTIONAL,   -- Need R
  intraFreqBlackCellList                IntraFreqBlackCellList
    OPTIONAL,   -- Need R
  lateNonCriticalExtension OCTET STRING        OPTIONAL,
  ...,
  [[
```

Listing 7

```
        intraFreqNeighCellList-v1610        IntraFreqNeighCellList-v1610
OPTIONAL,    -- Need R
        intraFreqWhiteCellList-r16        IntraFreqWhiteCellList-r16
OPTIONAL,    -- Cond SharedSpectrum2
        intraFreqCAG-CellList-r16         SEQUENCE (SIZE (1..maxPLMN))
OF IntraFreqCAG-CellPerPLMN-r16    OPTIONAL,    -- Need R
    ]]
}
IntraFreqNeighCellList ::=    SEQUENCE (SIZE (1..maxCellIntra))
OF IntraFreqNeighCellInfo
IntraFreqNeighCellList-v1610::=    SEQUENCE (SIZE
(1..maxCellIntra)) OF IntraFreqNeighCellInfo-v1610
IntraFreqNeighCellInfo ::=                 SEQUENCE {
    physCellId                             PhysCellId,
    q-OffsetCell                           Q-OffsetRange,
    q-RxLevMinOffsetCell                   INTEGER (1..8)    OPTIONAL,
-- Need R
    q-RxLevMinOffsetCellSUL                INTEGER (1..8)
OPTIONAL,    -- Need R
    q-QualMinOffsetCell                    INTEGER (1..8)
OPTIONAL,    -- Need R
    newCellForPCIChange                    ENUMERATED (true)
OPTIONAL,
    ...
}
IntraFreqNeighCellInfo-v1610 ::=    SEQUENCE {
    ssb-PositionQCL-r16                         SSB-PositionQCL-Relation-
r16    OPTIONAL -- Cond SharedSpectrum2
}
IntraFreqBlackCellList ::=                  SEQUENCE (SIZE
(1..maxCellBlack)) OF PCI-Range
IntraFreqWhiteCellList-r16 ::=              SEQUENCE (SIZE
(1..maxCellWhite)) OF PCI-Range
IntraFreqCAG-CellPerPLMN-r16 ::=            SEQUENCE {
    plmn-IdentityIndex-r16                      INTEGER (1..maxPLMN),
    cag-CellList-r16                       SEQUENCE (SIZE (1..maxCAG-
Cell-r16)) OF PCI-Range
}
```

In a second example implementation, the Short Message may comprise an additional information bit indicating whether the old cell, i.e., the cell transmitting this Short Message, is in the process of a soft cell identity change, as shown in Bit 4 of Table 6-2. This additional information may be logically equivalent to pciChange of the first implementation. However, Bit 4 of Table 6-2 being set to 1 may further indicate that a recipient of the Short Message may be required to acquire SIBs, at least SIB1 and preferably other SIBs, immediately, without awaiting a boundary of a next modification period boundary. Herein a modification period is a period configured by SIB1, during which contents of SIB1 and other SIBs are guaranteed to be unchanged. In the second implementation, pciChange information element may not be necessary in SIB1 but the information of the new cell, such as newCellForPCIChange of Listing 7 may be used.

TABLE 6-2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this Paging Occasion. |

TABLE 6-2-continued

| Bit | Short Message |
|---|---|
| 4 | pciChange<br>if set to 1: PCI change is in process |
| 5-8 | Not used in this release of the specification, and shall be ignored by UE if received. |

7.5 Soft Cell Identity Change: Node Operations

Figure 30:
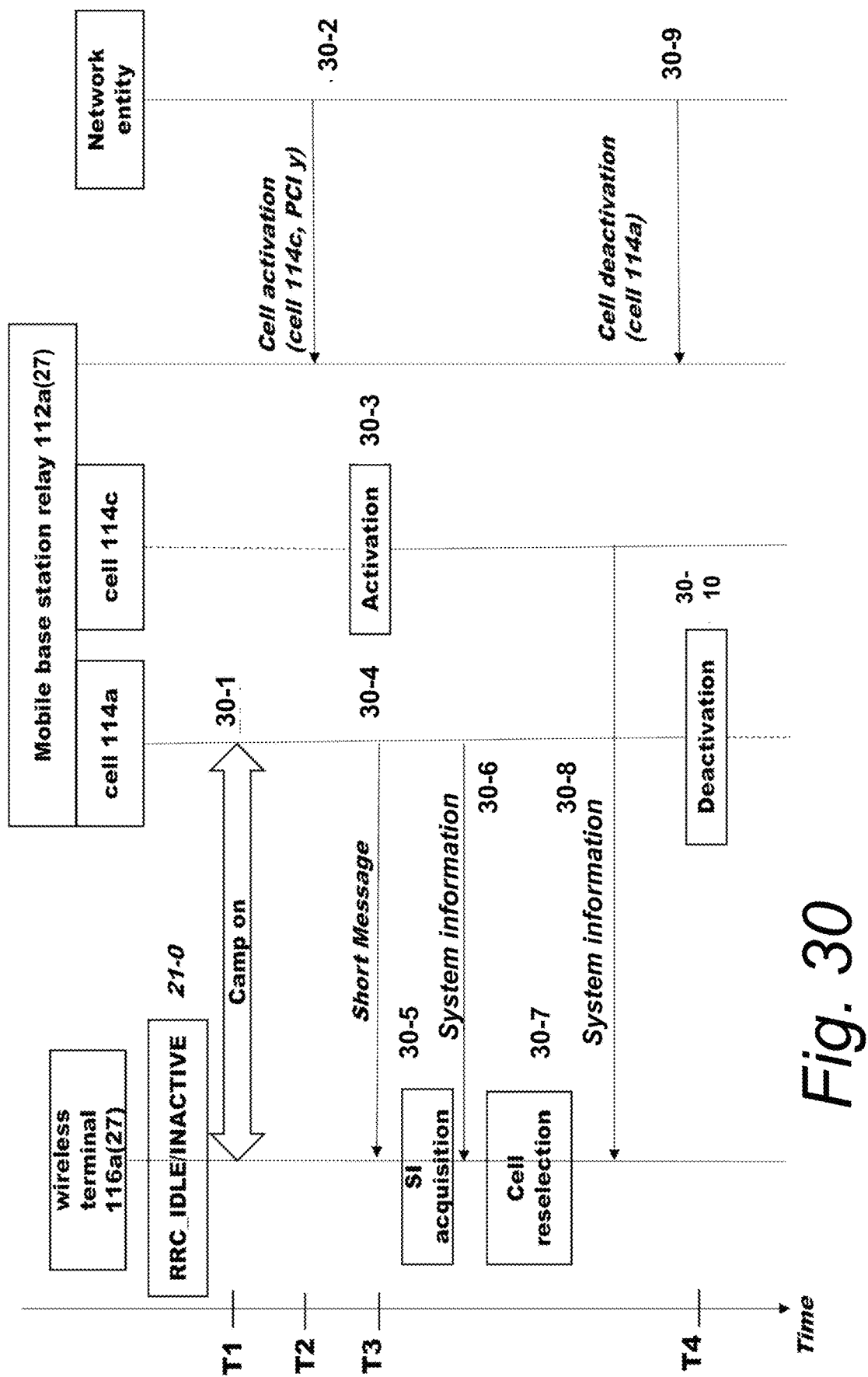
FIG. 30 is a diagrammatic view showing example message flow and associated events for the communication system of FIG. 27 and the scenario of FIG. 28.

FIG. 30 shows an example message flow and associated events for the communication system of FIG. 27 and the scenario of FIG. 28.

Act 30-0 comprises wireless terminal 116a(27) being in RRC_IDLE or RRC_INACTIVE state.

Act 30-1 comprises wireless terminal 116a(27) camping on cell 114a (PCI x) served by mobile base station relay 112a(27) at time T1 of FIG. 28.

Act 30-2 depicts, at time T2 of FIG. 28, the network entity deciding to activate cell 114c with to PCI y, and sending a cell activation message to mobile base station relay 112a (27). In other words, act 30-2 comprises the network entity, e.g., mobile relay base station collision avoidance detector 752, making a determination that two mobile relay base stations which are serving two respective cells having a common cell identity are or will be in a predetermined proximity, and sending a cell activation message that will initiate a soft change of cell identity for one of the two respective cells.

Act 30-3 comprises, at time T3 of FIG. 28, mobile base station relay activating cell 114c with PCI y, and Cell 114c starting transmission of broadcast signals, such as system information. The cell ID controller 760 of mobile station relay 112a(27) may activate cell 114c, and soft cell ID change message generator 762 may generate information to be included by system information generator 704(27) in the system information which may be broadcast by transmitter circuitry 224.

Act 30-4, performed in parallel with or after Act 30-3, comprises cell 114a broadcasting a Short Message such as the Short Message of one of Table 6-1 or Table 6-2. The Short Message is transmitted by transmitter circuitry 224.

Act 30-5 comprises the receipt of the Short Message triggering a system information acquisition procedure at wireless terminal 116a(27), to acquire latest system information from cell 114a. The Short Message is received by receiver circuitry 278 and processed by frame/message handler/generator 294. The wireless terminal processor 290 performs the system information acquisition procedure.

Act 30-6 comprises wireless terminal 116a(27) acquiring system information comprising SIB1 and other relevant SIBs, e.g., SIB3 of Listing 7.

Act 30-7 comprises wireless terminal 116a(27) performing a cell reselection procedure. From the received system information, wireless terminal 116a(27) identifies cell 114c as a cell to reselect. The cell reselection procedure may be performed by cell (re)selection controller 630(27).

Act 30-8 comprises wireless terminal 116a(27) acquiring system information from cell 114c and camping on cell 114c.

Act 30-9 comprises the network entity deciding to deactivate cell 114a and sending a cell deactivation message to mobile base station relay 112a(27).

Act 30-10, performed at time T4 of FIG. 28, comprises mobile base station relay 112a(27) deactivating cell 114a. The deactivation may be governed by cell ID controller 760.

Figure 31:
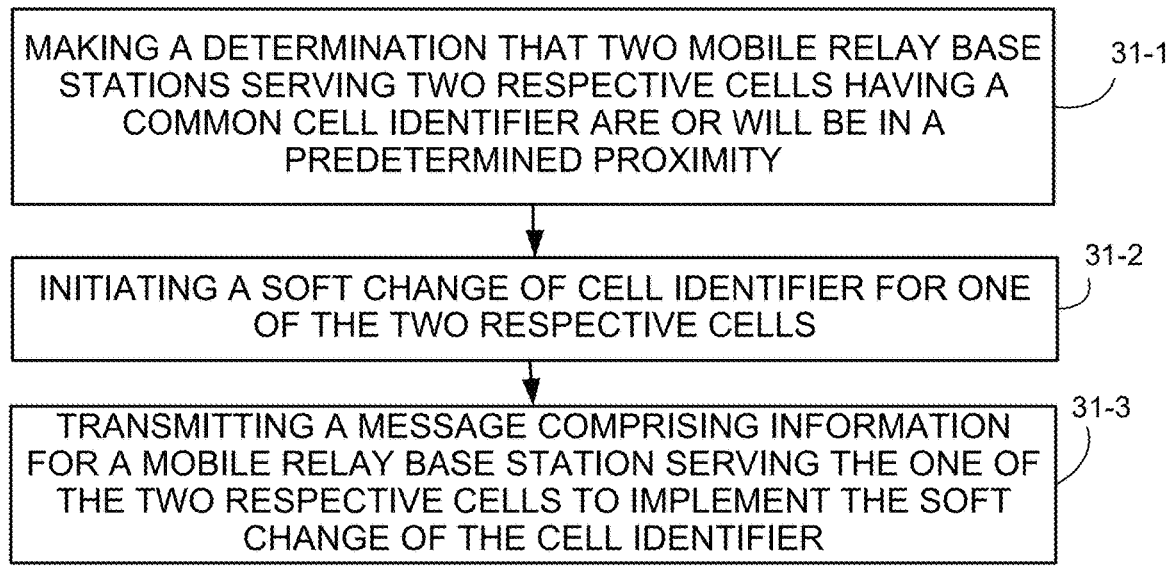
FIG. 31 is a flowchart view showing representative, example steps or acts performed by an example network entity of the communications system of the example embodiment and mode of FIG. 27.

FIG. 31 is a flow chart showing example, representative acts or steps performed by a network entity according to an example embodiment and mode. As indicated previously, the network entity can be an Access and Mobility Management Function (AMF) or another core network node for functionality, or even a non-core network node. The network entity may comprise a processor and a memory, the processor, working together with the memory, to perform the acts of FIG. 31 and otherwise as described herein.

Act 31-1 comprise the entity making a determination that two mobile relay base stations serving two respective cells having a common cell identity are or will be in a predetermined proximity. Act 31-2 comprise the entity initiating a soft change of cell identity for one of the two respective cells. Act 31-3 comprise transmitting a message comprising information for a mobile relay base station serving the one of the two respective cells to implement the soft change of the cell identity.

Figure 32:
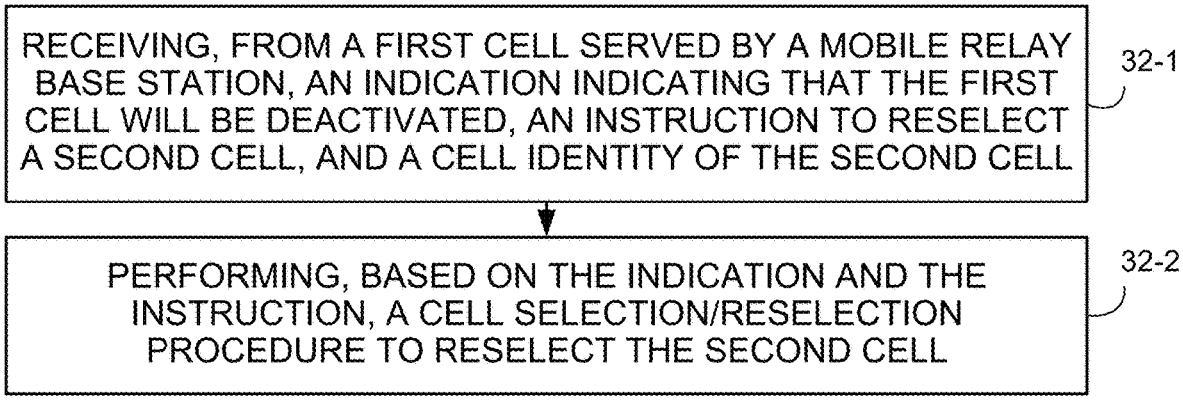
FIG. 32 is a flowchart view showing representative, example steps or acts performed by an example wireless terminal of the communications system of the example embodiment and mode of FIG. 27.

FIG. 32 is a flow chart showing example representative steps or acts performed by a wireless terminal of an example embodiment and mode, such as wireless terminal 116a(27) of FIG. 27 and FIG. 28). The wireless terminal may comprise a processor and a memory, the processor, working together with the memory, to perform the acts of FIG. 32 and otherwise as described herein.

Act 32-1 comprises receiving, from a first cell served by a mobile relay base station, an indication indicating that the first cell will be deactivated, an instruction to reselect a second cell, and a cell identity of the second cell. The cell identity of the second cell may be different from a cell identity of the first cell. The second cell may be served by the mobile base station relay. In addition, the second cell may be activated upon or before receiving the indication and replaces the first cell after the first cell is deactivated. In one implementation, the indication is included in a first system information block (SIB). In this implementation, the wireless terminal may receive a first notification message that triggers acquisition of the first SIB, the first SIB further triggering acquisition of a second SIB, wherein the second SIB may comprise the instruction and the cell identity of the second cell. In another implementation, the indication may be included in a second notification message that triggers acquisition of a second SIB, wherein the second SIB may comprise the instruction and the cell identity of the second cell.

Act 32-2 comprising performing, based on the indication and the instruction, a cell selection/reselection procedure to reselect the second cell.

Figure 33:
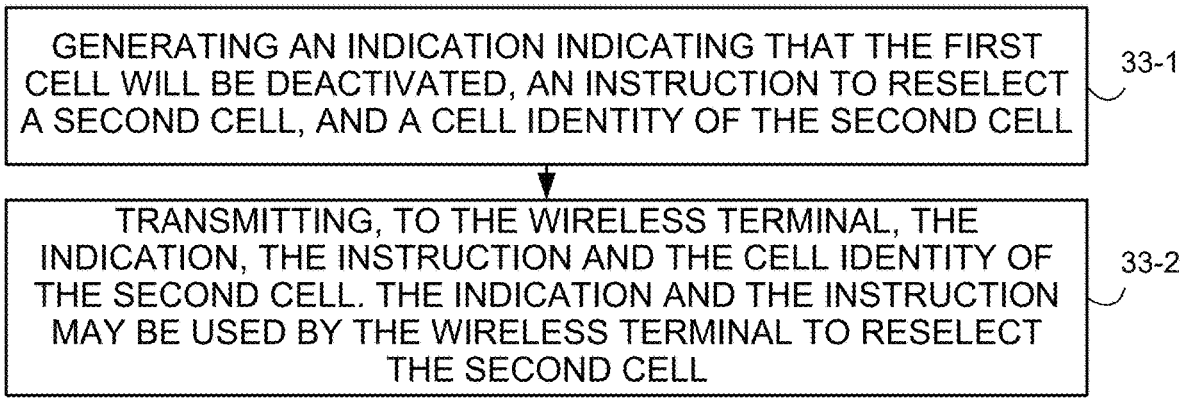
FIG. 33 is a flowchart view showing representative, example steps or acts performed by an example mobile station relay of the communications system of the example embodiment and mode of FIG. 27.

FIG. 33 is a flow chart showing example representative steps or acts performed by a mobile base station relay according to an example embodiment and mode, such as mobile base station relay 112a(27) of FIG. 27 and FIG. 28. The mobile station relay may comprise a processor and a memory, the processor, working together with the memory, to perform the acts of FIG. 33 and otherwise as described herein.

Act 33-1 comprises generating an indication indicating that the first cell will be deactivated, an instruction to reselect a second cell, and a cell identity of the second cell. The cell identity of the second cell may be different from a cell identity of the first cell. The second cell may be served by the mobile base station relay. In addition, the second cell may be activated upon or before receiving the indication and replaces the first cell after the first cell is deactivated. In one implementation, the indication is included in a first system information block (SIB). In this implementation, the mobile base station relay may transmit a first notification message that triggers the wireless terminal's acquisition of the first SIB, the first SIB further triggering acquisition of a second SIB, wherein the second SIB may comprise the instruction and the cell identity of the second cell. In another implementation, the indication may be included in a second notification message that triggers the wireless terminal's acquisition of a second SIB, wherein the second SIB may comprise the instruction and the cell identity of the second cell.

Act 33-3 comprises transmitting, to the wireless terminal, the indication, the instruction and the cell identity of the second cell. The indication and the instruction may be used by the wireless terminal to reselect the second cell.

8.0 Enhanced Cell Reselection Procedure for Soft Cell Identity Change on Vehicle Mounted Relay In legacy cell reselection procedures, such as the cell reselection procedure specified in 3GPP TS 38.304, a wireless terminal may determine (1) whether or not to trigger measurements for discovering intra-frequency neighboring cells, and when such measurements are triggered, (2) whether or not to reselect a discovered cell. Intra-frequency neighboring cells are neighboring cells operated on the frequency of the currently serving cell.

TS 38.304 specifies, as shown in Listing 8, that the triggering conditions for the measurements for discovering intra-frequency neighboring cells. TS 38.304 states that intra-frequency measurements will not be triggered in a case that the serving cell is stronger than the thresholds configured by the serving cell.

---

Listing 8

- If the serving cell fulfils Srxlev > $S_{IntraSearchP}$ and Squal > $S_{IntraSearchQ}$, the UE may choose
not to perform intra-frequency measurements.
- Otherwise, the UE shall perform intra-frequency measurements.
- The UE shall apply the following rules for NR inter-frequencies and inter-RAT
frequencies which are indicated in system information and for which the UE has priority
provided as defined in 5.2.4.1:
   - for a NR inter-frequency or inter-RAT frequency with a reselection priority higher than
    the reselection priority of the current NR frequency, the UE shall perform measurements
    of higher priority NR inter-frequency or inter-RAT frequencies according to TS 38.133
    [8].
   - For a NR inter-frequency with an equal or lower reselection priority than the
    reselection priority of the current NR frequency and for inter-RAT frequency with lower
    reselection priority than the reselection priority of the current NR frequency:
      - If the serving cell fulfils Srxlev > $S_{nonIntraSearchP}$ and Squal > $S_{nonIntraSearchQ}$, the
      UE may choose not to perform measurements of NR inter-frequencies or inter-RAT
      frequency cells of equal or lower priority;
      - Otherwise, the UE shall perform measurements of NR inter-frequencies or
      inter-RAT frequency cells of equal or lower priority according to TS 38.133 [8].
- If the UE supports relaxed measurement and relaxedMeasurement is present in SIB2,
the UE may further relax the needed measurements, as specified in clause 5.2.4.9.

---

Likewise, TS 38.304 also specifies criteria for reselecting a discovered new cell for the determination of whether or not to reselect a discovered cell. See, for example, Listing 3 of Section 4.3 herein, where the wireless terminal reselects a new intra-frequency cell, only if the new cell is better than a serving cell according to the cell reselection criteria during a time interval $T_{reselectionRAT}$. This implies that, even if the intra-frequency measurements get triggered and a neighboring cell is discovered, the cell reselection will not happen if the serving cell is strong enough, compared to the neighboring cell.

In the scenario shown in FIG. 27 and FIG. 28, cell 114a, the old cell, keeps serving until it gets deactivated. During the period from time T3 to time T4, the intra-frequency measurements may not be triggered since cell 114a is still active and likely to be strong enough for wireless terminals in proximity to cell 114a, including wireless terminal 116a of FIG. 27 and FIG. 28. Consequently, intra-frequency measurements during the cell reselection procedure shown as Act 30-7 of FIG. 30 may not take place during the period T3-T4. Instead, the intra-frequency measurements may possibly take place after cell 114a gets shut down at time T4. This may defeat a purpose of the notification shown as Act 30-4 of FIG. 30. A purpose of the notification of act 30-4, a Short Message, is to serve to trigger a system information acquisition procedure at the wireless terminal in order to acquire latest system information from cell 114a.

The embodiment of Section 8.0 hereof discloses an enhanced cell reselection procedure for a wireless terminal camping on a serving cell served by a vehicle mounted relay (VMR), such as wireless terminal 116a(27) of FIG. 27, where the serving cell performs a soft cell identity change as disclosed in the Embodiment of Section 7.0 hereof.

In the embodiment of Section 7.0, the wireless terminal may receive a notification of a soft cell identity change, such as reception of SIB1 of Listing 6 with the pciChange field populated, reception of the Short Message of Table 6-2 with Bit 4 set to 1, and/or reception of SIB3 with newCellForPCIChange in IntraFreqNeighCellInfo. However, in a case of reception of a notification of soft cell identity change, the wireless terminal of the embodiment and mode of Section 8.0 is enhanced in that the wireless terminal may alter the cell reselection procedure. Specifically, for example, in the case of receiving the notification of soft cell identity change, the wireless terminal may attempt to acquire information regarding a new cell, e.g., cell 114c, the neighboring cell associated with newCellForPCIChange, that will replace the old cell, e.g., cell 114a, and may acquire the new cell's cell identity, e.g., PCI. Such acquired or obtained information may be, for example, from system information as disclosed in Section 7.0, such as SIB1 and SIB3 of Listing 6 and Listing 7 respectively. The wireless terminal may then initiate intra-frequency measurements regardless of the strength of the currently serving cell. During the measurements, in a case that the wireless terminal finds the new cell which is specified as a cell which is to replace the old cell, the wireless terminal may reselect the new cell, regardless of the cell reselection criteria of Listing 3. In contrast, if the wireless terminal finds another neighboring cell which does not replace the old cell, such as a cell not associated with newCellForPCIChange, the cell reselection criteria of Listing 3 may apply.

The embodiment of Section 8.0 thus includes a wireless terminal which performs a cell reselection procedure which is dependent upon whether a newly discovered neighboring cell is a replacement cell, e.g., whether intra-frequency measurements and reselection of a new cell are performed based on whether a soft cell identity change is notified. As used herein, "replacement" of the serving cell means that the cell which is reselected is a cell which has undergone a soft cell identify change, rather than another neighboring cell. Thus, the cell reselection procedure of the wireless terminal of Section 8.0 may be dependent upon neighboring cell replacement information received by the wireless terminal. The embodiment of Section 8.0 is illustrated with reference to FIG. 34-FIG. 37.

8.1 General Architecture and Operation

Figure 34:
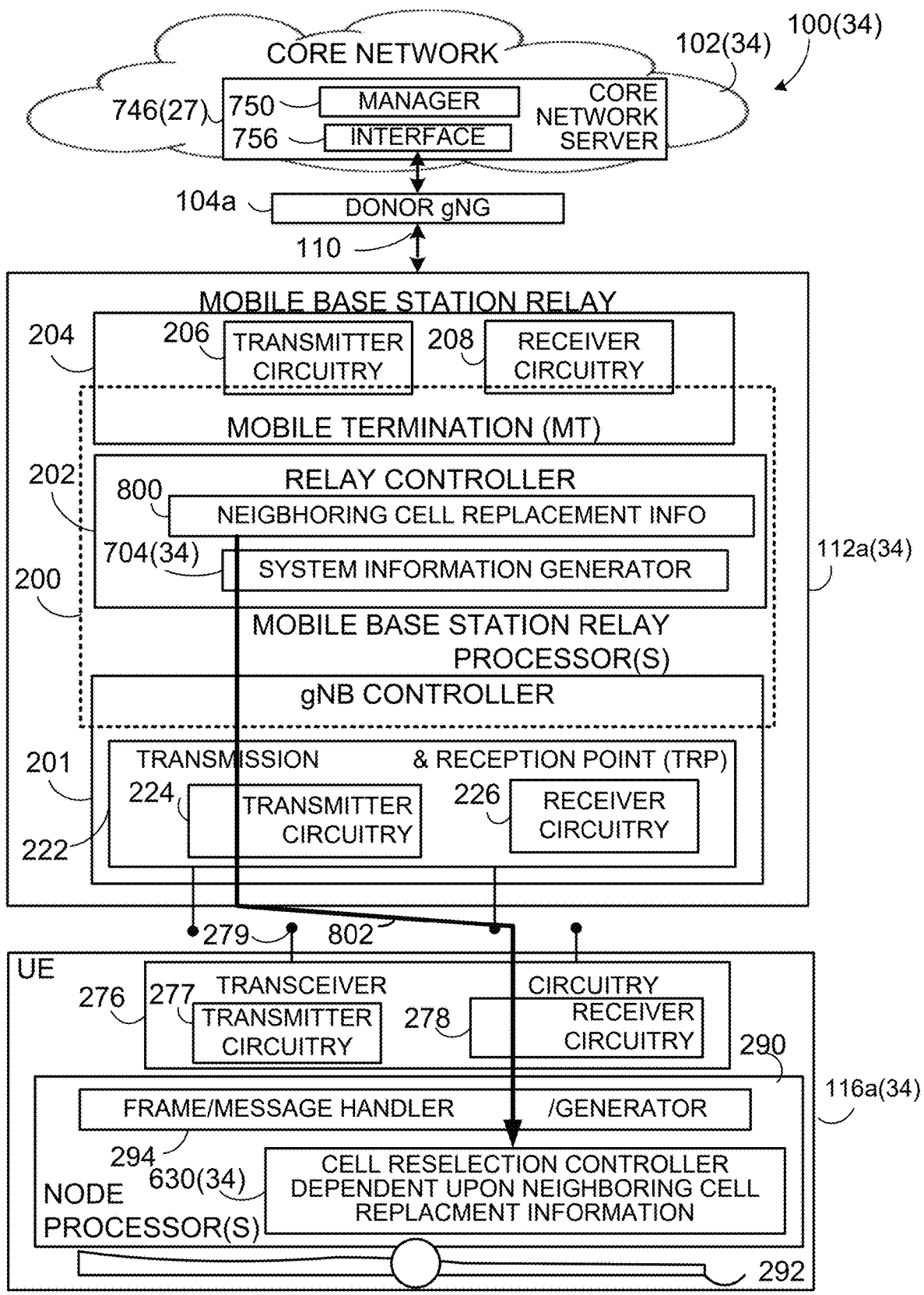
FIG. 34 is a schematic view of an example embodiment and mode communications system showing example structures and functionalities of a core network node, a mobile base station relay, and a wireless terminal which performs a cell reselection procedure which is dependent upon whether a newly discovered neighboring cell is a replacement cell.

FIG. 34 shows example structures and functionalities of portions of an example embodiment and mode communications system 100(34). FIG. 34 shows, e.g., core network 102(34) and a radio access network. The radio access network comprises a donor gNB node 104a, mobile base station relay such as mobile base station relay 112a(34), and wireless terminal 116a(34). The wireless terminal 116a(34) may be situated in a network in like manner as wireless terminal 116a(27) of FIG. 27, and may also be simply referred to as wireless terminal 116(34). The structures, functionalities, and operations of the example embodiment and mode of FIG. 34 are essentially the same as those shown by corresponding reference numerals in the preceding figures, unless otherwise noted or evident from the context.

In the example embodiment and mode of FIG. 34, core network 102(34) comprises one or more core network servers 746(34), which may include one or more processors. The core network server 746(34) includes a mobile relay base station manager 750. The core network 102(34) and/or the core network servers 746(34) communicate through an interface 756 with other entities or networks. As shown in FIG. 34, the core network 102(34) communicates through interface 756 with the radio access network.

A node of core network 102(34) is an example of a node of a communications network, e.g., a network entity, that can make a determination that two mobile relay base stations serving two respective cells having a common cell identity are or will be in a predetermined proximity, and also initiate a soft change of cell identity for one of the two respective cells.

As in the preceding embodiment and modes, the mobile base station relay mobile station relay 112(34) includes gNB controller 201; relay controller 202; and mobile termination (MT) function 204. The gNB controller includes transmission and reception point (TRP) 222, which in turn comprises transmitter 224 and receiver 226.

In the example embodiment and mode of FIG. 34, mobile base station relay mobile station relay 112(34) includes system information generator 704(34) and a memory or generator for neighboring cell information 800. The neighboring cell information 800 comprises a cell identity of a neighboring cell and an indication associated with the cell identity of the neighboring cell. The indication associated with the cell identity of the neighboring cell indicates whether or not the serving cell will be replaced by the neighboring cell. The system information generator 704(34) may include the neighboring cell information 800 in system information.

FIG. 34 shows wireless terminal wireless terminal 116a(34) as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 34 further shows wireless terminal 116a(34) as also comprising wireless terminal processor circuitry, e.g., one or more wireless terminal processor(s) 290. The wireless terminal 116a(34), e.g., wireless terminal processor(s) 290(34), may comprise frame/message generator/handler 294 and cell (re)selection controller 630(34). The (re)selection controller 630(34) may also be called neighboring cell replacement information-dependent cell reselection controller 290 (34) since, as indicated above, the wireless terminal 116a (34) performs a cell reselection procedure which is dependent upon whether a newly discovered neighboring cell is a replacement cell.

The wireless terminal 116a(34) may also comprise interfaces 292, including one or more user interfaces. Such user interfaces may serve for both user input and output operation(s). The user interfaces may comprise, for example, a screen such as a touch screen that can both display information to the user and receive information entered by the user. The user interface 292 may also include other types of devices, such as a speaker, a microphone, or a haptic feedback device, for example.

In the embodiment and mode of FIG. 34-FIG. 37, the receiver circuitry 278 is configured to receive one or more messages 802 from mobile station relay 112(34), as described herein, which provide the wireless terminal 116 (34) with the neighboring cell information 800. As indicated above, the neighboring cell information 800 comprises a cell identity of a neighboring cell and an indication associated with the cell identity of the neighboring cell. The indication associated with the cell identity of the neighboring cell indicates whether or not the serving cell will be replaced by the neighboring cell, e.g., whether or not a soft cell identity change is notified.

Figure 35:
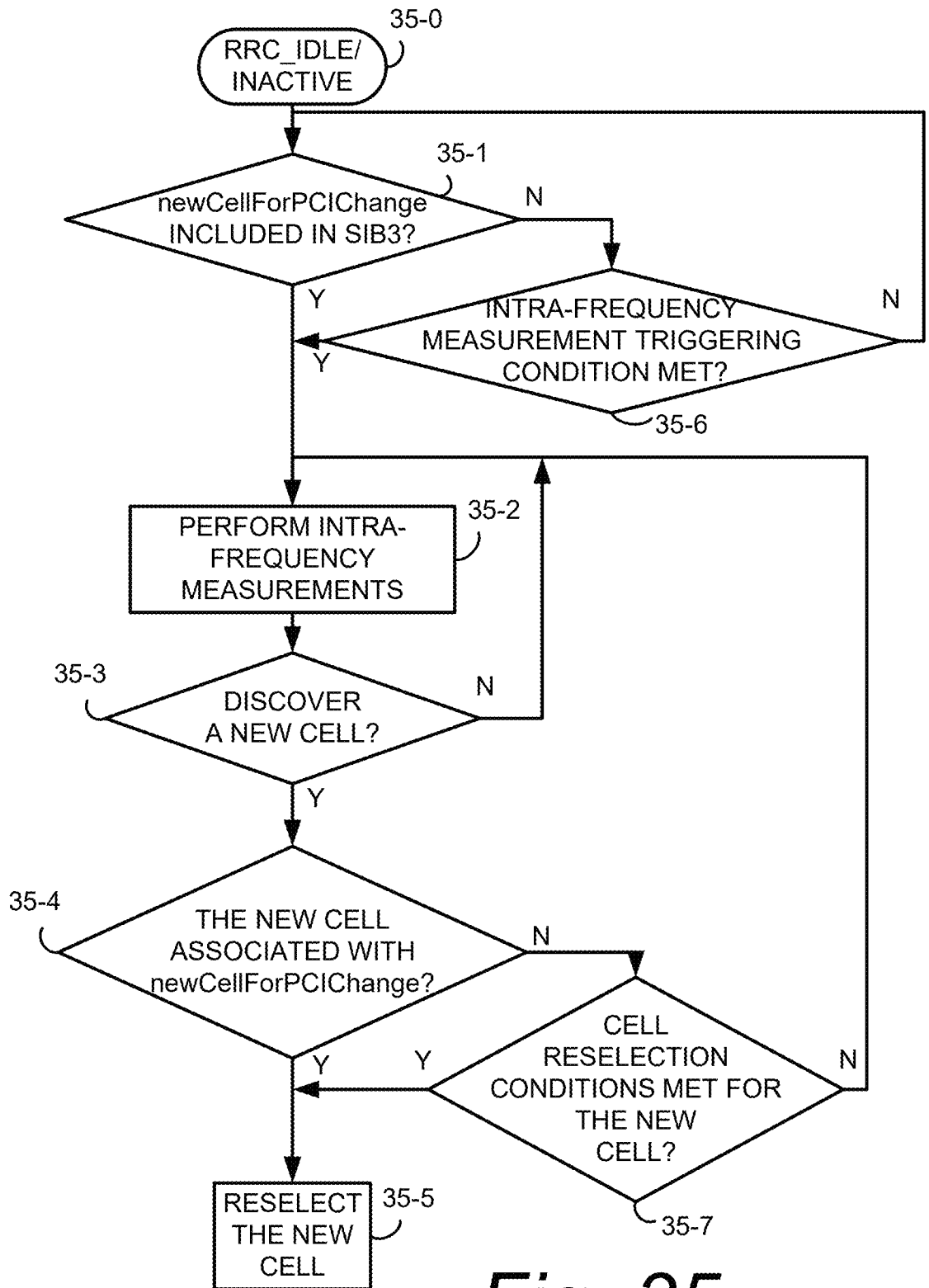
FIG. 35 is a flowchart view showing representative, example steps or acts performed according to cell reselection procedure of the example embodiment and mode of FIG. 34.

FIG. 35 is an example flow chart of the cell reselection procedure for the wireless terminal of the example embodiment and mode of Section 8.0 as illustrated in FIG. 34-FIG. 37. As indicated above, the cell reselection procedure of Section 8.0 is dependent upon whether the serving cell is to be replaced by a replacement cell and a newly discovered neighboring cell is the replacement cell. FIG. 35 shows example acts or steps of the cell (re)selection procedure for the wireless terminal 116A(34) of Section 8.0.

Act 35-0 comprises the wireless terminal being in RRC_IDLE or RRC_INACIVE state. Act 35-1: comprises the wireless terminal determining if there is newCellForPCIChange associated with at least one entry of IntraFreqNeighCellInfo in the received SIB3, i.e., if a cell in the neighboring cell list is indicated as having undergone a soft identity change. It should be understood that the neighboring cell list and the indication of soft identity change may be otherwise indicated, e.g., by information elements of other names or in other manners. If the determination of act 35-1 is affirmative, the cell reselection procedure continues with act 35-2. Otherwise the cell reselection procedure continues with act 35-6. The reception of the SIB3 may have been triggered by the method disclosed in Section 7, such as by reception of a Short Message, for example.

Act 35-2 comprises the wireless terminal performing intra-frequency measurements. Then, as act 35-3, the wireless terminal checks if a new cell is discovered as a result of the intra-frequency measurements. If the check of act 35-3 is affirmative, the wireless terminal proceeds to execute act 35-4. Otherwise, if the check of act 35-3 is negative, the wireless terminal again executes act 35-2, e.g., performs intra-frequency measurements.

Act 35-4 comprises the wireless terminal further checking if the new cell is the cell indicated by the at least one entry of IntraFreqNeighCellInfo with newCellForPCIChange associated. If the check of act 35-4 is affirmative, the wireless terminal proceeds to execute act 35-5. Act 35-5 comprises the wireless terminal reselecting the new cell. Otherwise, if the check of act 35-4 is negative, the wireless terminal proceeds to execute act 35-7.

Act 35-6 is executed when there is not a newCellForPCIChange associated with at least one entry of IntraFreqNeighCellInfo in the received SIB3. Act 35-6 comprises the wireless terminal checking if the condition for triggering intra-frequency measurements is met. If the check of act 35-6 is affirmative, the wireless terminal executes act 35-2 to perform the intra-frequency measurements which are triggered as determined at act 35-6. Otherwise, if the check of act 35-6 is negative, the wireless terminal loops back to execute act 35-1.

Act 35-7 is executed when the wireless terminal has determined, at act 35-4, that the new cell is not the cell associated with newCellForPCIChange, e.g., that the new cell is not a replacement cell resulting from a soft identity change. Act 35-7 comprises the wireless terminal checking whether the cell reselection conditions are met for the new cell. If the check of act 35-7 is affirmative, e.g., if the cell reselection conditions are met, the wireless terminal proceeds to execute act 35-5, e.g., to reselect the new cell. Otherwise, if the check of act 35-7 is negative, the wireless terminal continues the intra-frequency measurements depicted by act 35-2.

Act 35-4, act 35-5, and act 35-7 of FIG. 35 show that if the new cell is the cell associated with newCellForPCIChange, e.g., if the new cell is replacing the serving cell due to a soft PCI change, the new cell may be reselected unconditionally. As an alternative to reselecting the new cell unconditionally, another set of cell reselection conditions may apply, even if the new cell is associated with newCellForPCIChange, i.e., even if the new cell is replacing the serving cell. The another set of cell reselection conditions, which may be different from the cell reselection conditions used in act 35-7, may be configured by the serving cell via system information to ensure that the cell replacing the serving cell has a minimum level of strength and/or quality.

Thus, the example embodiment and mode of Section 8.0 as illustrated by way of example in FIG. 35-FIG. 37 comprises a wireless terminal of a cellular telecommunication system which communicates with a serving cell served by a mobile base station relay. In the example embodiment and mode, the wireless terminal comprises receiver circuitry and processor circuitry. The receiver circuitry is configured to receive, from the serving cell, neighboring cell information comprising a cell identity of a neighboring cell and an indication associated with the cell identity of the neighboring cell. The indication associated with the cell identity of the neighboring cell indicates whether or not the serving cell will be replaced by the neighboring cell. The processor circuitry is configured to perform, based on the neighboring cell information, a cell reselection procedure. During the cell reselection procedure (1) one or more measurements to find the neighboring cell are performed based on the indication; and (2) a decision whether or not to reselect the neighboring cell is made based on the indication.

The example embodiment and mode of Section 8.0 as illustrated by way of example in FIG. 35-FIG. 37 also comprises a mobile base station relay of a cellular telecommunication system. The mobile base station relay serves a wireless terminal via a serving cell. The mobile base station relay comprises processor circuitry and transmitter circuitry. The processor circuitry is configured to generate neighboring cell information comprising a cell identity of a neighboring cell and an indication associated with the cell identity of the neighboring cell. The indication associated with the cell identity of the neighboring cell indicates whether or not the serving cell will be replaced by the neighboring cell. The neighboring cell information being used by the wireless terminal to perform a cell reselection procedure. The transmitter circuitry is configured to transmit the neighboring cell information, to the wireless terminal. The indication associated with the cell identity of the neighboring cell is configured to be used during a cell reselection procedure by the wireless terminal to: (1) determine whether or not to perform one or more measurements to find the neighboring cell; and (2) make a decision whether or not to reselect the neighboring cell.

FIG. 36 is a flow chart showing general, basic, example, representative steps or acts performed by a wireless terminal 116(34) of FIG. 34.

Act 36-1 comprises receiving, from a serving cell, neighboring cell information. The neighboring cell information comprises a cell identity of a neighboring cell and an indication associated with the cell identity of the neighboring cell. The indication associated with the cell identity of the neighboring cell indicates whether or not the serving cell will be replaced by the neighboring cell. In some example implementations, the neighboring information is included in a system information block (SIB). Typically, the serving cell will be replaced by the neighboring cell to avoid a collision of a cell identity of the serving cell with another cell that is assigned with the same cell identity. The neighboring cell may be operated in a frequency in which the serving cell is operated.

Act 36-2 comprises the wireless terminal performing, based on the neighboring cell information, a cell reselection procedure. During the cell reselection procedure, (1) one or more measurements to find the neighboring cell are performed based on the indication, and (2) a decision to reselect the neighboring cell is performed based on the indication.

In a case that the indication indicates that the serving cell will be replaced by the neighboring cell, the one or more measurements are performed. Moreover, when finding the neighboring cell during the one or more measurements, the neighboring cell which has been indicated to replace the serving cell is reselected.

On the other hand, in a case that the indication does not indicate that the serving cell will be replaced by the neighboring cell, the one or more measurements are performed based on a measurement condition(s) configured by the serving cell. For example, as discussed above relative to act 35-6, the measurements of act 35-2 may or may not be performed based on whether the measurements are triggered by the measurement triggering condition(s). The measurement triggering condition(s) may comprise a threshold(s). The one or more measurements of act 35-2 may not be performed in a case that signal strength/quality of the serving cell is greater than the threshold(s). Otherwise, the one or more measurements may be triggered and in a case that the one or more measurements of act 35-2 result in finding the neighboring cell, the neighboring cell is reselected based on a reselection condition(s) configured by the serving cell as reflected by act 35-7. That is, the neighboring cell may not be reselected in a case that the neighboring cell is not better than the serving cell according to the cell reselection condition(s).

FIG. 37 is a flow chart showing basic, example, representative steps or acts performed by a mobile base station relay, e.g., mobile base station relay 112(34) of FIG. 34.

Act 37-1 comprises generating or obtaining neighboring cell information. The neighboring cell information comprises a cell identity of a neighboring cell and an indication associated with the cell identity of the neighboring cell. The indication associated with the cell identity of the neighboring cell indicates whether or not a serving cell, served by the mobile base station relay, will be replaced by the neighboring cell. In some implementations, the neighboring information is included in a system information block (SIB). Typically, the serving cell will be replaced by the neighbor ing cell to avoid a collision of a cell identity of the serving cell with another cell that is assigned with the same cell identity. The neighboring cell may be operated in a frequency in which the serving cell is operated. The neighboring cell information may be configured to be used by a wireless terminal to perform a cell reselection procedure, wherein (1) one or more measurements to find the neighboring cell and (2) a decision to reselect the neighboring cell may be performed based on the indication. In a case that the indication indicates that the serving cell will be replaced by the neighboring cell, the one or more measurements are performed, and when finding the neighboring cell during the one or more measurements, the neighboring cell is reselected. On the other hand, in a case that the indication does not indicate that the serving cell will be replaced by the neighboring cell, the one or more measurements are performed based on a measurement condition(s) configured by the serving cell. The measurement condition(s) may comprise a threshold(s). The one or more measurements may not be performed in a case that signal strength/quality of the serving cell is greater than the threshold(s). Otherwise, the one or more measurements may be triggered and in a case that the one or more measurements result in finding the neighboring cell, the neighboring cell is reselected based on a reselection condition(s) configured by the serving cell. That is, the neighboring cell may not be reselected in a case that the neighboring cell is not better than the serving cell according to the cell reselection condition(s).

Act 37-2 comprises transmitting, to the wireless terminal, the neighboring cell information.

The technology of the example embodiment and mode of Section 8.0 hereof as illustrated by way of example in FIG. 34-FIG. 37 also encompasses a non-transitory computer readable medium encoded with a computer program that, when executed by a computer or processor of the wireless terminal described herein, causes the computer to implement the acts described herein, e.g., the acts of FIG. 35 and FIG. 36, and/or a non-transitory computer readable medium encoded with a computer program that, when executed by a computer or processor of the mobile base station relay described herein, causes the computer to implement the acts of FIG. 37.

8.2 Example Measurement Rules and Cell Selection Criteria

Listing 9 and Listing 10 show an example procedure of measurement rules and cell reselection criteria, respectively, for the example embodiment and mode of Section 8.0 as illustrated by way of example in FIG. 34-FIG. 37. In Listing 9 and Listing 10 SIB3 may refer to the SIB3 of Listing 7.

Listing 9

- If newCellForPCIChange is included in IntraFreqNeighCellInfo of the received SIB3, the UE shall perform intra-frequency measurements.
- Else if the serving cell fulfils Srxlev > $S_{IntraSearchP}$ and Squal > $S_{IntraSearchQ}$, the UE may choose not to perform intra-frequency measurements.
- Otherwise, the UE shall perform intra-frequency measurements.
- The UE shall apply the following rules for NR inter-frequencies and inter-RAT frequencies which are indicated in system information and for which the UE has priority provided as defined in 5.2.4.1:
    - for a NR inter-frequency or inter-RAT frequency with a reselection priority higher than the reselection priority of the current NR frequency, the UE shall perform measurements of higher priority NR inter-frequency or inter-RAT frequencies according to TS 38.133 [8].
    - For a NR inter-frequency with an equal or lower reselection priority than the reselection priority of the current NR frequency and for inter-RAT frequency with lower reselection priority than the reselection priority of the current NR frequency:
        - If the serving cell fulfils Srxlev > $S_{nonIntraSearchP}$ and Squal > $S_{nonIntraSearchQ}$, the UE may choose not to perform measurements of NR inter-frequencies or inter-RAT frequency cells of equal or lower priority;
        - Otherwise, the UE shall perform measurements of NR inter-frequencies or inter-RAT frequency cells of equal or lower priority according to TS 38.133 [8].
- If the UE supports relaxed measurement and relaxedMeasurement is present in SIB2, the UE may further relax the needed measurements, as specified in clause 5.2.4.9.

Listing 10
The cell-ranking criterion $R_s$ for serving cell and $R_n$ for neighbouring cells is defined by:
$R_s = Q_{meas,\,s} + Q_{hyst} - Qoffset_{temp}$
$R_n = Q_{meas,\,n} - Qoffset - Qoffset_{temp}$
where:

| | |
|---|---|
| $Q_{meas}$ | RSRP measurement quantity used in cell reselections. |
| Qoffset | For intra-frequency: Equals to $Qoffset_{s,\,n}$, if $Qoffset_{s,\,n}$ is valid, otherwise this equals to zero.<br>For inter-frequency: Equals to $Qoffset_{s,\,n}$ plus $Qoffset_{frequency}$, if $Qoffset_{s,\,n}$ is valid, otherwise this equals to $Qoffset_{frequency}$. |
| $Qoffset_{temp}$ | Offset temporarily applied to a cell as specified in TS 38.331 [3]. |

The UE shall perform ranking of all cells that fulfil the cell selection criterion S, which is defined in 5.2.3.2.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave according to clause 5.2.4.4.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to clause 5.2.4.4.

If the new cell is associated with newCellForPCIChange included in IntraFreqNeighCellInfo of the received SIB3, the UE may reselect the new cell.

Otherwise, the UE shall reselect the new cell, only if the following conditions are met:
the new cell is better than the serving cell according to the cell reselection criteria specified above during a time interval $T_{reselection_{RAT}}$;
more than 1 second has elapsed since the UE camped on the current serving cell.

NOTE: If rangeToBestCell is configured but absThreshSS-BlocksConsolidation is not configured on an NR frequency, the UE considers that there is one beam above the threshold for each cell on that frequency.

. . .

$Treselection_{RAT}$

This specifies the cell reselection timer value. For each target NR frequency and for each RAT other than NR, a specific value for the cell reselection timer is defined, which is applicable when evaluating reselection within NR or towards other RAT (i.e. $T_{reselection_{RAT}}$ for NR is $T_{reselection_{NR}}$, for E-UTRAN $T_{reselection_{EUTRA}}$).

NOTE: $T_{reselection_{RAT}}$ is not broadcast in system information but used in reselection rules by the UE for each RAT.

$Treselection_{NR}$

This specifies the cell reselection timer value $Treselection_{RAT}$ for NR. The parameter can be set per NR frequency as specified in TS 38.331 [3].

9.0 Inter-Frequency Cell Reselection Procedure for Soft Cell Identity Change on Vehicle Mounted Relay The example embodiment and mode of Section 9.0 discloses an inter-frequency cell reselection procedure for a wireless terminal camping on a serving cell served by a vehicle mounted relay, VMR, where the serving cell may perform a soft cell identity change as disclosed in Section 7.0, with the new neighboring cell being operated in a frequency which is different from the frequency of the old cell, i.e., a case of an inter-frequency neighboring cell.

In a legacy cell reselection procedure, such as the cell reselection procedure specified in 3GPP TS 38.304, a wireless terminal may determine (1) whether or not to trigger measurements for discovering inter-frequency neighboring cells and, when such measurements are triggered, (2) whether or not to reselect a discovered cell. Listing 11 shows an example procedure described in TS 38.304 for inter-frequency cell reselection.

Listing 11

Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency). If any fields with cellReselectionPriority are provided in dedicated signalling, the UE shall ignore any fields with cellReselectionPriority and any slice reselection information provided in system information. If slice reselection information is provided in dedicated signaling, the UE shall ignore slice reselection information provided in system information.

The UE shall apply the following rules for NR inter-frequencies and inter-RAT frequencies which are indicated in system information and for which the UE has priority provided as defined in 5.2.4.1:
For a NR inter-frequency or inter-RAT frequency with a reselection priority higher than the reselection priority of the current NR frequency, the UE shall perform measurements of higher priority NR inter-frequency or inter-RAT frequencies according to TS 38.133 [8].
For a NR inter-frequency with an equal or lower reselection priority than the reselection priority of the current NR frequency and for inter-RAT frequency with lower reselection priority than the reselection priority of the current NR frequency:
If the serving cell fulfils $Srxlev > S_{nonIntraSearchP}$ and $Squal > S_{nonintrasearchQ}$:
If distanceThresh is broadcasted in SIBxx, and if UE supports location-based measurement initiation and has valid UE location information:
If the distance between UE and the serving cell reference location is shorter than distanceThresh, the UE may choose not to perform measurements of NR inter-frequency cells of equal or lower priority, or inter-RAT frequency cells of lower priority;
Otherwise, the UE shall perform measurements of NR inter-frequency cells of equal or lower priority, or inter-RAT frequency cells of lower priority according to TS 38.133 [8];
Otherwise, the UE may choose not to perform measurements of NR inter-frequency cells of equal or lower priority, or inter-RAT frequency cells of lower priority;
Otherwise, the UE shall perform measurements of NR inter-frequency cells of equal or lower priority, or inter-RAT frequency cells of lower priority according to TS 38.133 [8].

As indicated in Listing 11, the operation of the inter-frequency cell reselection procedure may be based on frequency priorities configured to the wireless terminal. That is, inter-frequency measurements on a frequency may be unconditionally triggered if the frequency is assigned with a priority higher than the priority of the serving cell frequency, otherwise inter-frequency measurements on the frequency may be triggered depending on the signal strength/quality of the serving cell. Listing 11 also teaches that (i) a priority(ies) of a frequency(ies) may be given by system information, referred as common cell reselection priority information, and/or by a dedicated signaling, such as RRCRelease message, referred as dedicated cell reselection priority information, and (ii) if a priority(ies) of a frequency(ies) is provided by the dedicated signaling, any priorities provided by the system information may be ignored.

Listing 12 shows an example format of RRCRelease message including an information element cellReselection-Priorities, which may comprise a list of frequencies and associated priority information for each of the frequencies. In Listing 12, the timer T320 may indicate a time duration, starting from a receipt of the RRCRelease message, where the priority(ies) given by the system information may be ignored. Once the timer expires, the priority(ies) provided by the RRCRelease message may be discarded.

Listing 12

```
-- ASN1START
-- TAG-RRCRELEASE-START
RRCRelease ::=                  SEQUENCE {
    rrc-TransactionIdentifier       RRC-TransactionIdentifier,
    criticalExtensions              CHOICE {
        rrcRelease                      RRCRelease-IEs,
        criticalExtensionsFuture        SEQUENCE { }
    }
}
RRCRelease-IEs ::=              SEQUENCE {
    redirectedCarrierInfo           RedirectedCarrierInfo OPTIONAL,
-- Need N
cellReselectionPriorities CellReselectionPriorities
OPTIONAL,   -- Need R
    suspendConfig               SuspendConfig       OPTIONAL,  --
Need R
    deprioritisationReq             SEQUENCE {
        deprioritisationType            ENUMERATED {frequency, nr},
        deprioritisationTimer           ENUMERATED {min5, min10,
min15, min30}
    }
OPTIONAL,  -- Need N
    lateNonCriticalExtension                OCTECT STRING
OPTIONAL,
    nonCriticalExtension                    RRCRelease-v1540-
IEs                                         OPTIONAL
}
...
CellReselectionPriorties ::=    SEQUENCE {
    freqPriorityListEUTRA               FreqPriorityListEUTRA
OPTIONAL     -- Need M
    freqPriorityListNR                  FreqPriorityListNR
OPTIONAL     -- Need M
    t320                                ENUMERATED {min5, min10, min20,
min30, min60, min120, min180, spare1} OPTIONAL     -- Need R
    ...,
    [[
    freqPriorityListNRSlicing-r17   FreqPriorityListNRSlicing-r17
OPTIONAL     -- Need M
    ]]
}
FreqPriorityListEUTRA ::=       SEQUENCE (SIZE (1..maxFreq)) OF
FreqPriorityEUTRA
FreqPriorityListNR ::=          SEQUENCE (SIZE (1..maxFreq)) OF
FreqPriorityNR
FreqPriorityEUTRA ::=           SEQUENCE {
    carrierFreq                     ARFCN-ValueEUTRA
    cellReselectionPriority         CellReselectionPriority,
    cellReselectionSubPriority      CellReselectionSubPriority
OPTIONAL     -- Need R
}
FreqPriorityNR ::=              SEQUENCE {
    carrierFreq                     ARFCN-ValueNR,
    cellReselectionPriority         CellReselectionPriority,
    cellReselectionSubPriority      CellReselectionSubPriority
OPTIONAL     -- Need R
}
CellReselectionPriority ::=         INTEGER (0..7)
CellReselectionSubPriority ::=      ENUMERATED {oDot2, oDot4,
oDot6, oDot8}
```

Figure 38:
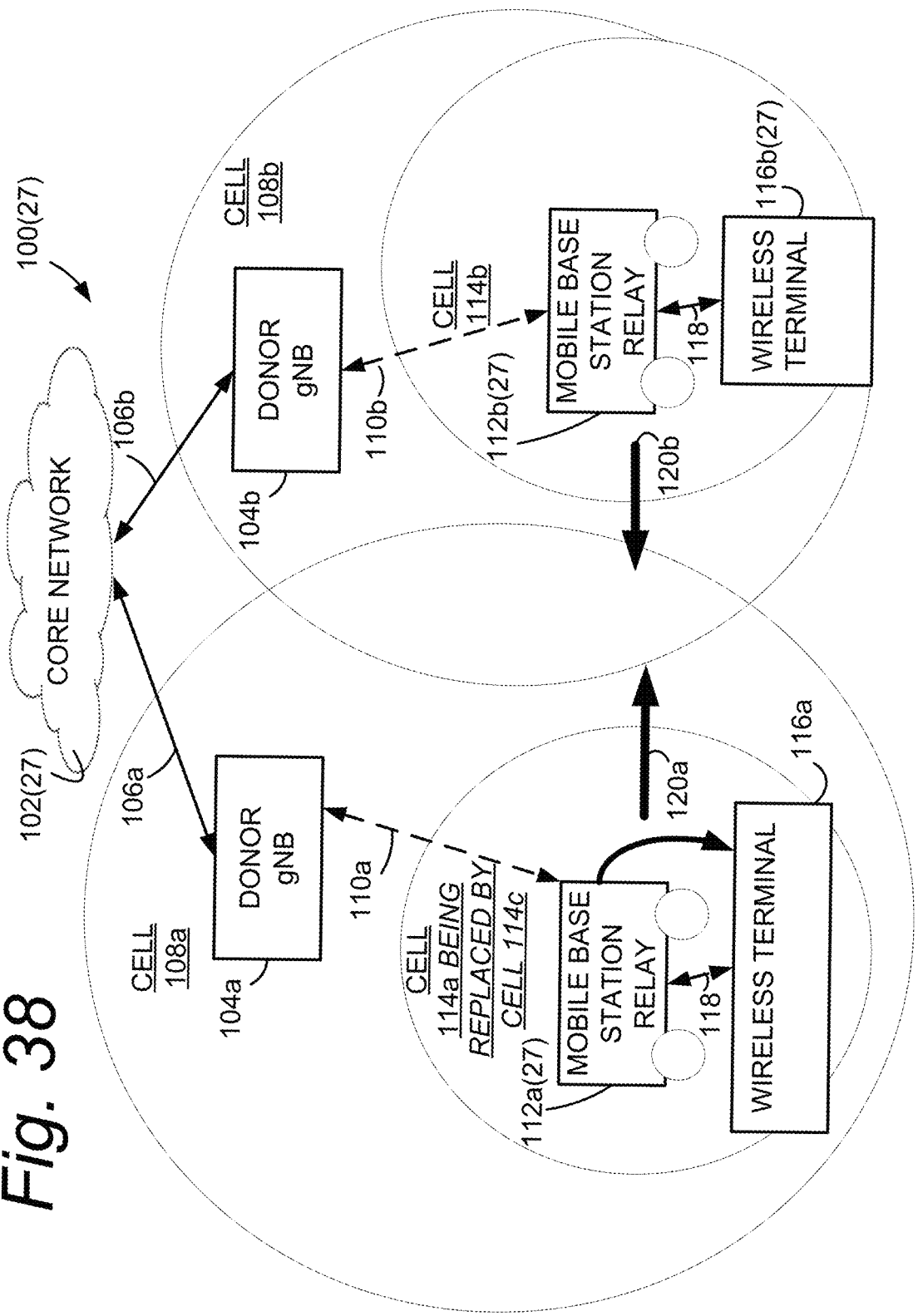

FIG. 38 shows a scenario which is similar to the scenario of FIG. 27. However, in the scenario of FIG. 38 cell 114c is operated on a frequency, Freq_c, which is different from the frequency, Freq_a of cell 114a. When the procedure of FIG. 30 is applied to the scenario of FIG. 38, as act 30-6 of FIG. 30, wireless terminal 116a may receive an indication that a cell, i.e., cell 114c is replacing the serving cell, i.e., cell 114a. In the FIG. 38 scenario, since Freq_a and Freq_c are different, an indication such as newCellForPCIChange may be included in InterFreqNeighCellInfo of SIB4 shown in Listing 13. As shown in Listing 13, the inter-frequency cell identified by physCellId with newCellForPCIChange populated may be considered as the new cell replacing the serving or old cell, and dl-CarrierFreq and/or frequencyBandList associated with the physCellId may provide the frequency of the new cell.

Listing 13

```
-- ASN1START
-- TAG-SIB4-START
```

-continued

| Listing 13 |
| --- |

```
SIB4 ::=                             SEQUENCE {
  interFreqCarrierFreqList           InterFreqCarrierFreqList,
  lateNonCriticalExtension           OCTET STRING
OPTIONAL,
  ...,
  [[
  interFreqCarrierFreqList-v1610     InterFreqCarrierFreqList-
v1610    OPTIONAL  -- Need R
  ]],
  [[
  interFreqCarrierFreqList-v1700     InterFreqCarrierFreqList-
v1700    OPTIONAL  -- Need R
  ]]
}
InterFreqCarrierFreqList ::=         SEQUENCE (SIZE
(1..maxFreq)) OF InterFreqCarrierFreqInfo
InterFreqCarrierFreqList-v1610 ::=   SEQUENCE (SIZE
(1..maxFreq)) OF InterFreqCarrierFreqInfo-v1610
InterFreqCarrierFreqList-v1700 ::=   SEQUENCE (SIZE
(1..maxFreq)) OF InterFreqCarrierFreqInfo-v1700
InterFreqCarrierFreqInfo ::=         SEQUENCE {
  dl-CarrierFreq                     ARFCN-ValueNR,
  frequencyBandList                  MultiFrequencyBandListNR-SIB
OPTIONAL,  -- Cond Mandatory
  frequencyBandListSUL               MultiFrequencyBandListNR-SIB
OPTIONAL,  -- Need R
  nrofSS-BlocksToAverage             INTEGER (2..maxNrofSS-
BlocksToAverage) OPTIONAL,          -- Need S
  absThreshSS-BlocksConsolidation    ThresholdNR
OPTIONAL,  -- Need S
  smtc                               SSB-MTC
OPTIONAL,  -- Need S
  ssbSubcarrierSpacing               SubcarrierSpacing,
  ssb-ToMeasure                      SSB-ToMeasure
OPTIONAL,  -- Need S
  deriveSSB-IndexFromCell            BOOLEAN,
  ss-RSSI-Measurement                SS-RSSI-Measurement
OPTIONAL,  -- Need R
  q-RxLevMin                         Q-RxLevMin,
  q-RxLevMinSUL                      Q-RxLevMin
OPTIONAL,  -- Need R
  q-QualMin                          Q-QualMin
OPTIONAL,  -- Need S
  p-Max                              P-Max
OPTIONAL,  -- Need S
  t-ReselectionNR                    T-Reselection,
  t-ReselectionNR-SF                 SpeedStateScaleFactors
OPTIONAL,  -- Need S
  threshX-HighP                      ReselectionThreshold,
  threshX-LowP                       ReselectionThreshold,
  threshX-Q                          SEQUENCE {
    threshX-HighQ                      ReselectionThresholdQ,
    threshX-LowQ                       ReselectionThresholdQ
  }
OPTIONAL,  -- Cond RSRQ
  cellReselectionPriority            CellReselectionPriority
OPTIONAL,  -- Need R
  cellReselectionSubPriority         CellReselectionSubPriority
OPTIONAL,  -- Need R
  q-OffsetFreq                       Q-OffsetRange
DEFAULT dB0,
  interFreqNeighCellList             InterFreqNeighCellList
OPTIONAL,  -- Need R
  interFreqExcludedCellList
InterFreqExcludedCellList            OPTIONAL,  -- Need R
  ...
}
InterFreqNeighCellList ::=           SEQUENCE (SIZE (1..maxCellInter))
OF InterFreqNeighCellInfo
InterFreqNeighCellInfo ::=           SEQUENCE {
  physCellId                         PhysCellId,
  q-OffsetCell                       Q-OffsetRange,
  q-RxLevMinOffsetCell               INTEGER (1..8)   OPTIONAL,  --
Need R
  q-RxLevMinOffsetCellSUL            INTEGER (1..8) OPTIONAL,  -- Need
R
  q-QualMinOffsetCell                INTEGER (1..8) OPTIONAL,-- Need
```

-continued

Listing 13

```
R
    newCellForPCIChange           ENUMERATED (true)  OPTIONAL,
    ...
}
```

As disclosed in the example embodiment and mode of Section 8.0, in the case of a soft PCI change it is desired to ensure that the wireless terminal promptly triggers neighboring cell measurements on the frequency where the new cell is operated. In other words, measurements of the frequency of the new cell should be prioritized over measurements of other frequencies. This may be achieved by, for example, assigning a priority higher than the serving cell, or the highest priority among other cells including the serving cell, to the frequency of the new cell, i.e., phyCellId in InterFreqNeighCellInfo with newCellForPCIChange populated. In one implementation, the priority of the new cell may be explicitly given by cellRelelectionPriority and/or cellReselectionSubPriority. In another implementation, a higher/highest priority may be implicitly indicated for the new cell.

If the wireless terminal received and stored a dedicated signaling for cell reselection priorities, such as RRCRelease message of Listing 12, before entering act 30-0 of FIG. 30, and if the stored cell reselection priorities is still effective/valid, e.g., timer T320 is not expired yet, at the time of the system information acquisition, e.g., at the time of act 30-6, an undesirable situation or operation may occur in the legacy cell reselection procedure. The undesired operation that may occur in the legacy cell reselection procedure is that, the cell reselection priorities given by the dedicated signaling override the cell reselection priorities configured by system information. For example, the priority value assigned to the frequency of the new cell in SIB4 received at act 30-6 may be nullified or ignored by the dedicated signaling overriding, and consequently the new cell may not be reselected.

Therefore, in example embodiment and mode of Section 9.0, a wireless terminal may invalidate/discard stored cell reselection priorities configured by a dedicated signaling, upon a receipt of system information indicating a soft cell identity change to transition to a new cell operated on a frequency different from the frequency of a serving cell, e.g., the serving cell. In doing so, the wireless terminal may be able to reselect the new cell in a timely manner, eliminating the effect of the stored dedicated cell reselection priorities. The embodiment of Section 8.0 is illustrated with reference to FIG. 39-FIG. 43.

Figure 39:
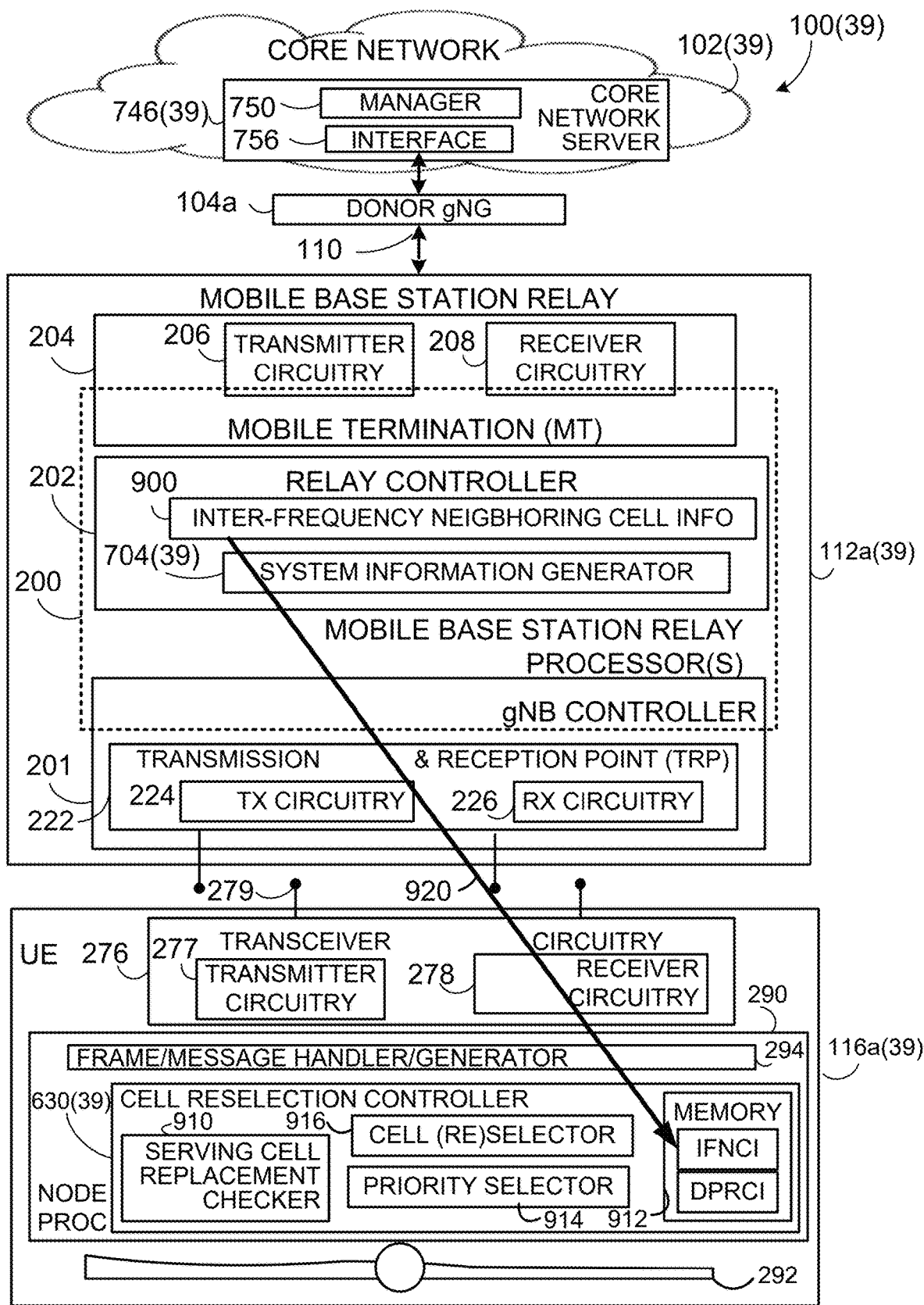
FIG. 39 is a diagrammatic view of a communications system showing both a core network and radio access network and illustrating an example, representative scenario in which a wireless terminal may invalidate/discard stored cell reselection priorities configured by a dedicated signaling, upon a receipt of system information indicating a soft cell identity change to transition to a new cell operated on a frequency different from the frequency of a serving cell.

FIG. 39 shows example structures and functionalities of portions of an example embodiment and mode communications system 100(39). FIG. 39 shows, e.g., core network 102(39) and a radio access network. The radio access network comprises a donor gNB node 104a, mobile base station relay such as mobile base station relay 112a(39), and wireless terminal 116a(39). The wireless terminal 116a(39) may be situated in a network in like manner as wireless terminal 116a(27) of FIG. 27 or wireless terminal 116a(34) of FIG. 34, and may also be simply referred to as wireless terminal 116(39). The structures, functionalities, and operations of the example embodiment and mode of FIG. 39 are essentially the same as those shown by corresponding reference numerals in the preceding figures, unless otherwise noted or evident from the context.

In the example embodiment and mode of FIG. 39, core network 102(39) comprises one or more core network servers 746(39), which may include one or more processors. The core network server 746(39) includes a mobile relay base station manager 750. The core network 102(39) and/or the core network servers 746(39) communicate through an interface 756 with other entities or networks. As shown in FIG. 39, the core network 102(39) communicates through interface 756 with the radio access network.

A node of core network 102(39) is an example of a node of a communications network, e.g., a network entity, that can make a determination that two mobile relay base stations serving two respective cells having a common cell identity are or will be in a predetermined proximity and/or initiate a soft change of cell identity for one of the two respective cells.

As in the preceding embodiment and modes, the mobile base station relay mobile station relay 112(39) includes gNB controller 201; relay controller 202; and mobile termination (MT) function 204. The gNB controller includes transmission and reception point (TRP) 222, which in turn comprises transmitter 224 and receiver 226.

Figure 40:
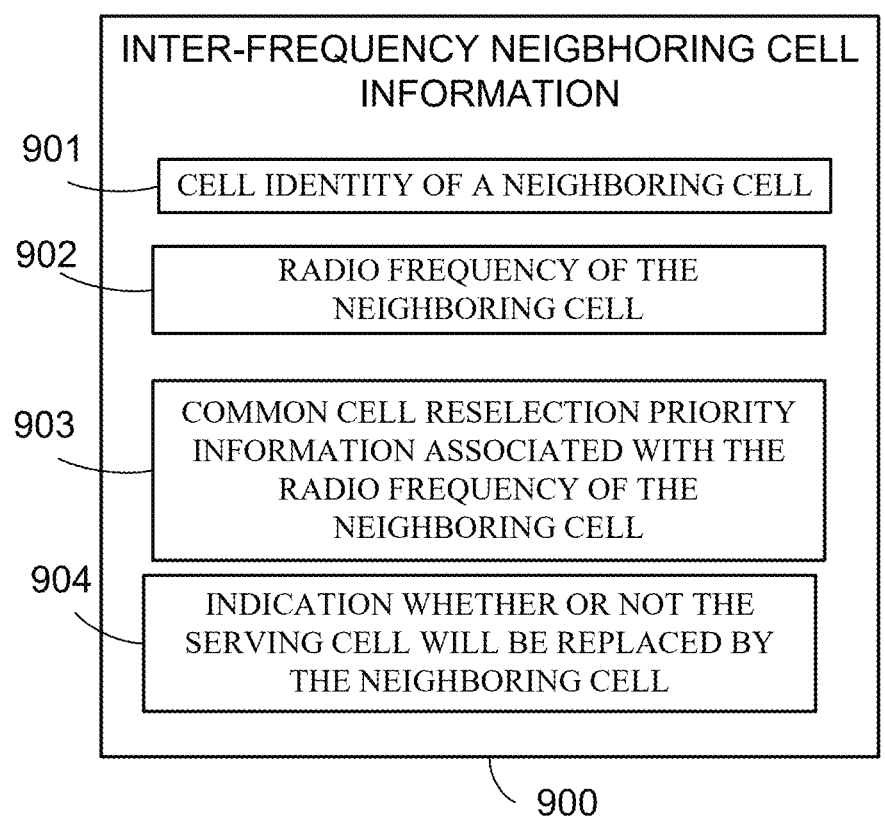
FIG. 40 is a diagrammatic view showing example, representative information elements including in inter-frequency neighboring cell information 900.

In the example embodiment and mode of FIG. 39, mobile base station relay mobile station relay 112(39) includes system information generator 704(39) and a memory or generator for inter-frequency neighboring cell information 900. As shown in FIG. 40, the inter-frequency neighboring cell information 900 may comprise (1) a cell identity 901 of a neighboring cell, (2) a radio frequency 902 of the neighboring cell, (3) common cell reselection priority information 903 associated with the radio frequency of the neighboring cell, and (4) an indication 904 associated with the cell identity of the neighboring cell. The indication 904 serves to indicate whether or not the serving cell will be replaced by the neighboring cell.

FIG. 39 shows wireless terminal wireless terminal 116a (39) as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 39 further shows wireless terminal 116a(39) as also comprising wireless terminal processor circuitry, e.g., one or more wireless terminal processor(s) 290(39). The wireless terminal 116a(39), e.g., wireless terminal processor(s) 290 (39), may comprise frame/message generator/handler 294 and cell (re)selection controller 630(39). The (re)selection controller 630(39) may also be called a dedicated signaled priority override selection controller since, as indicated above, the cell (re)selection controller 630(39) may invalidate/discard stored cell reselection priorities configured by a dedicated signaling, upon a receipt of system information indicating a soft cell identity change to transition to a new cell operated on a frequency different from the frequency of a serving cell, e.g., the serving cell. In doing so, the wireless terminal may be able to reselect the new cell in a timely manner, eliminating the effect of the stored cell reselection priorities. In an example, illustrative, non-limiting example embodiment and mode the cell (re)selection controller 630 (39) may further comprise serving cell replacement checker 910; priority information memory 912; priority information selector 914, and cell (re)selector 916. The 912 may store both dedicated cell reselection priority information, DCRPI, which may be received by dedicated signaling, and the inter-frequency neighboring cell information 900, IFNCI, received from the serving cell.

The wireless terminal 116a(39) may also comprise interfaces 292, including one or more user interfaces. Such user interfaces may serve for both user input and output operation(s). The user interfaces may comprise, for example, a screen such as a touch screen that can both display information to the user and receive information entered by the user. The user interface 292 may also include other types of devices, such as a speaker, a microphone, or a haptic feedback device, for example.

In the embodiment and mode of FIG. 39-FIG. 43, the receiver circuitry 278 is configured to receive both the dedicated cell reselection priority information, DCRPI, through dedicated signaling, and the inter-frequency neighboring cell information 900, IFNCI. The inter-frequency neighboring cell information 900 may be included in a system information block. FIG. 39 shows as arrow 920 the inter-frequency neighboring cell information 900 being transmitted in a system information block, SIB, and stored in the priority information memory 912. The dedicated cell reselection priority information, DCRPI, received through dedicated signaling, is also stored in priority information memory 912.

As described herein, the processor circuitry 290, which may comprise or be realized by cell (re)selection controller 630(39), stores the dedicated cell reselection priority information, e.g., in 912. Further, the processor circuitry 290 performs, based on the inter-frequency neighboring cell information, a cell reselection procedure. In the cell reselection procedure, the cell (re)selection controller 630(39) does not use the dedicated cell reselection priority information in the cell reselection procedure in a case that the indication 904 indicates that the serving cell will be replaced by the neighboring cell. In this regard, the serving cell replacement checker 910 determines whether the case is such that the indication 904 indicates that the serving cell will be replaced by the neighboring cell. Depending on the check performed by serving cell replacement checker 910, the priority information selector 914 selects from the priority information stored in priority information memory 912, either the dedicated cell reselection priority information, DCRPI or the inter-frequency neighboring cell information 900, IFNCI. The cell selection performed by cell (re)selector 916 utilizes the priority information selected by priority information selector 914.

Figure 41:
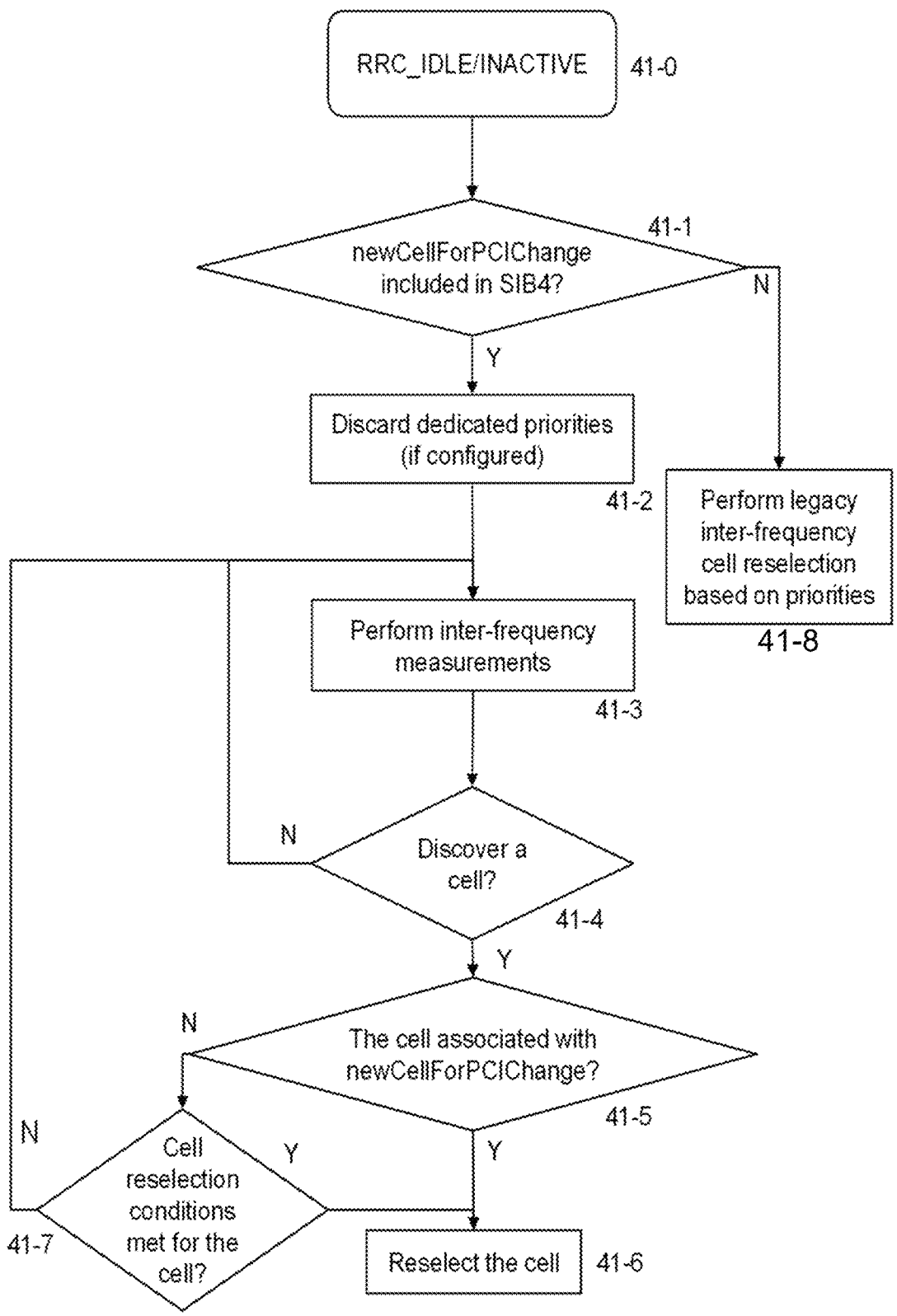
FIG. 41 is an example flow chart of a cell reselection procedure for the wireless terminal of the example embodiment and mode of FIG. 39.

FIG. 41 is an example flow chart of the cell reselection procedure for the wireless terminal of the example embodiment and mode of Section 9.0 and FIG. 39-FIG. 43. FIG. 41 shows example, representative, and unrestrictive examples of activities performed by the wireless terminal. It should be understood that FIG. 41 relates to a specific, non-limiting illustration, and that general acts of the wireless terminal are as described elsewhere herein. Act 41-0 comprises the wireless terminal being in RRC_IDLE or RRC_INACIVE state.

Act 41-1 comprises the wireless terminal receiving SIB4 and determining if there is newCellForPCIChange associated with at least one entry of InterFreqNeighCellInfo in the received SIB4. The determination of act 41-1 may be performed by serving cell replacement checker 910. If affirmative, the wireless terminal proceeds to execute Act 41-2, otherwise the wireless terminal proceeds to execute Act 41-8. The reception of the SIB4 may have been triggered by the method disclosed in Section 7.0, such as reception of a Short Message.

Act 41-2 comprises the wireless terminal discarding stored cell reselection priorities configured by a dedicated signaling, e.g., discarding the SIB4 of Listing 13, if any.

Act 41-3 comprises the wireless terminal performing inter-frequency measurements, based on the cell frequency priorities provided by SIB4.

Act 41-4 comprises the wireless terminal checking if a cell is discovered as a result of the inter-frequency measurements. If affirmative, the execution of the procedure continues at Act 41-5, otherwise, the procedure of FIG. 41 repeats Act 41-3.

Act 41-5 comprises the wireless terminal further checking if the cell is the cell indicated by the at least one entry of InterFreqNeighCellInfo with newCellForPCIChange associated. If the check of act 41-5 is affirmative, the wireless terminal proceeds to execute Act 41-6. Otherwise the wireless terminal proceeds to execute Act 41-7.

Act 41-6 comprises the wireless terminal reselecting the cell.

Act 41-7 is executed when the cell is not the cell associated with newCellForPCIChange. Act 41-7 comprises the wireless terminal checking if the cell reselection conditions are met for the cell. If the check of act 41-7 is affirmative, the wireless terminal proceeds to execute Act 41-6. Otherwise the wireless terminal continues inter-frequency measurements shown in Act 41-3.

Act 41-8 comprises the wireless terminal performs a legacy inter-frequency cell reselection procedure as shown in Listing 11.

Figure 42:
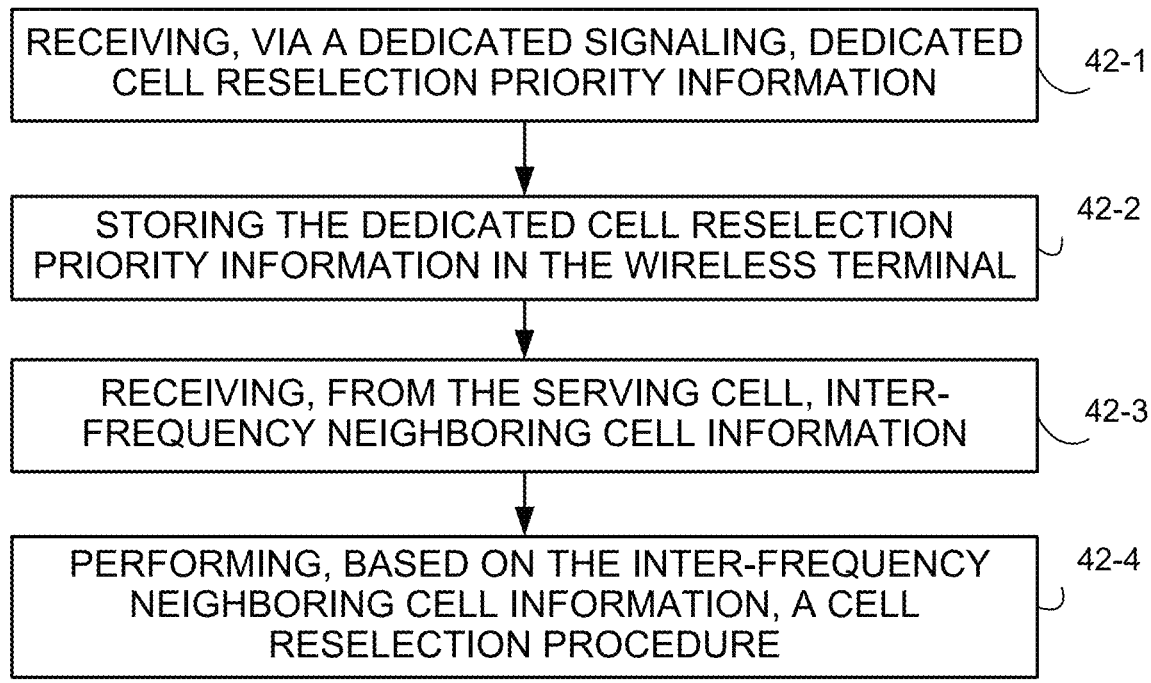
FIG. 42 is a flowchart view showing representative, example steps or acts performed by an example wireless terminal of the communications system of the example embodiment and mode of FIG. 39.

FIG. 42 is a flow chart showing example representative steps or acts performed by a wireless terminal, e.g., e.g., wireless terminal 116a(39).

Act 42-1 comprises receiving, via a dedicated signaling, dedicated cell reselection priority information. The dedicated cell reselection priority may comprise a priority of at least one radio frequency for the cell reselection procedure. The dedicated cell reselection priority information may be included in a Radio Resource Control (RRC) Release message.

Act 42-2 comprises storing the dedicated cell reselection priority information in the wireless terminal. The dedicated cell reselection priority information may be stored in priority information memory 912, for example.

Act 42-3 comprises receiving, from the serving cell, inter-frequency neighboring cell information 900. As mentioned above, the inter-frequency neighboring cell information 900 comprises a cell identity 901 of a neighboring cell, a radio frequency 902 of the neighboring cell, common cell reselection priority information 903 associated with the radio frequency of the neighboring cell, and an indication 904 associated with the cell identity of the neighboring cell, the indication indicating whether or not the serving cell will be replaced by the neighboring cell. The common cell reselection priority information 903 may comprise a priority of the radio frequency of the neighboring cell for the cell reselection procedure. The inter-cell neighboring information may be included in a system information block (SIB)

Act 42-4 comprises performing, based on the inter-frequency neighboring cell information, a cell reselection procedure. During the cell reselection procedure, in a case that the indication 104 indicates that the serving cell will be replaced by the neighboring cell, as determined by serving cell replacement checker 910, the dedicated cell reselection priority information may be invalidated and/or discarded. In other words, the processor circuitry of the wireless terminal does not use the dedicated cell reselection priority information in a case that the indication 104 indicates that the serving cell will be replaced by the neighboring cell. In a case that the indication does not indicate that the serving cell will be replaced by the neighboring cell, the dedicated cell reselection priority information, e.g., as stored in priority information memory 912, may be used for the cell reselection procedure and the common cell reselection priority information may be ignored.

Figure 43:
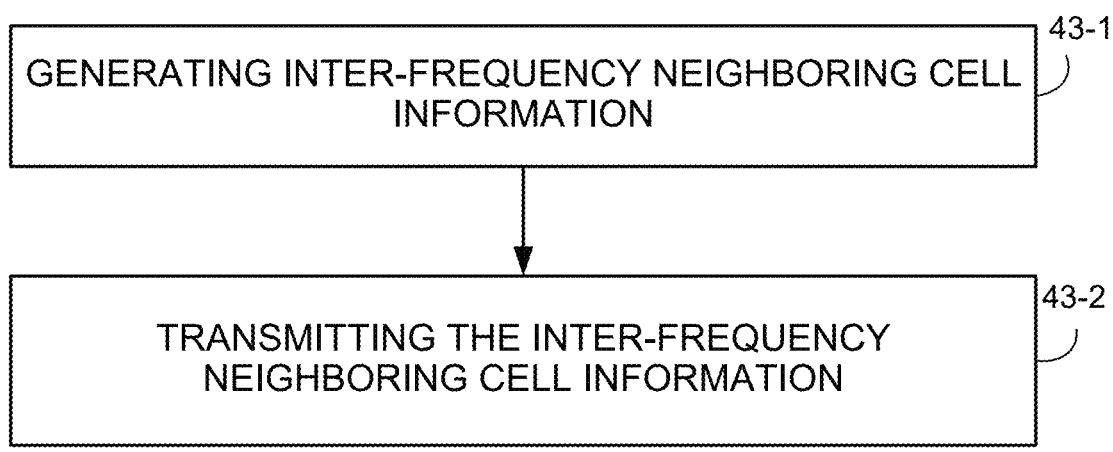
FIG. 43 is a flowchart view showing representative, example steps or acts performed by an example mobile station relay of the communications system of the example embodiment and mode of FIG. 39.

FIG. 43 is a flow chart showing example representative steps or acts performed by a mobile base station relay, e.g., mobile base station relay 112*a*(39) of FIG. 39.

Act 43-1 comprises generating inter-frequency neighboring cell information 900. As indicated above, the inter-frequency neighboring cell information 900 may comprise a cell identity 901 of a neighboring cell, a radio frequency 902 of the neighboring cell, common cell reselection priority information 903 associated with the radio frequency of the neighboring cell, and an indication 904 associated with the cell identity of the neighboring cell. The indication 904 indicates whether or not the serving cell will be replaced by the neighboring cell. The common cell reselection priority information 903 may comprise a priority of the radio frequency of the neighboring cell for the cell reselection procedure. The inter-cell neighboring information 900 may be included in a system information block (SIB). The inter-frequency neighboring cell information may be used by the wireless terminal to perform a cell reselection procedure perform.

Act 43-2 comprises transmitting the inter-frequency neighboring cell information. The transmission is illustrated by way of example as arrow 920 in FIG. 39. In a case that the indication 904 indicates that the serving cell will be replaced by the neighboring cell, and if the wireless terminal stores dedicated cell reselection priority information, the dedicated cell reselection priority information may be invalidated and discarded. The dedicated cell reselection priority information may comprise a priority of at least one radio frequency for the cell reselection procedure. In a case that the indication does not indicate that the serving cell will be replaced by the neighboring cell, the dedicated cell reselection priority information may be used for the cell reselection procedure and the common cell reselection priority information may be ignored. The dedicated cell reselection priority information may be included in a Radio Resource Control (RRC) Release message.

10.0 Cell Reselection Procedure for Hard Cell Identity Change

Section 7.0 hereof defines "hard cell identity change" as an operation of a mobile base station relay serving a cell, i.e., serving an old cell, to change the cell identity of the cell by shutting down/deactivating the old cell and then initiating/activating a new cell with a different cell identity. In a legacy cellular communication system, such as the 5G New Radio (NR) system standardized by 3GPP, when the old cell gets shut down, wireless terminals that camp on the old cell will eventually detect that the coverage of the old cell is lost, and may then initiate a cell reselection procedure to attempt to discover a suitable neighboring cell. Detection of the lost cell and discovery of a suitable neighboring cell may take some time period, which may potentially cause a paging loss and/or delay in initiating network services. Moreover, the cell reselection procedure may discover a cell other than the new cell, i.e., other than the cell which is replacing the old cell. Such discovery of another cell may not be an ideal situation for the wireless terminals boarded or located on a vehicle which also hosts the mobile base station relay.

Figure 44:
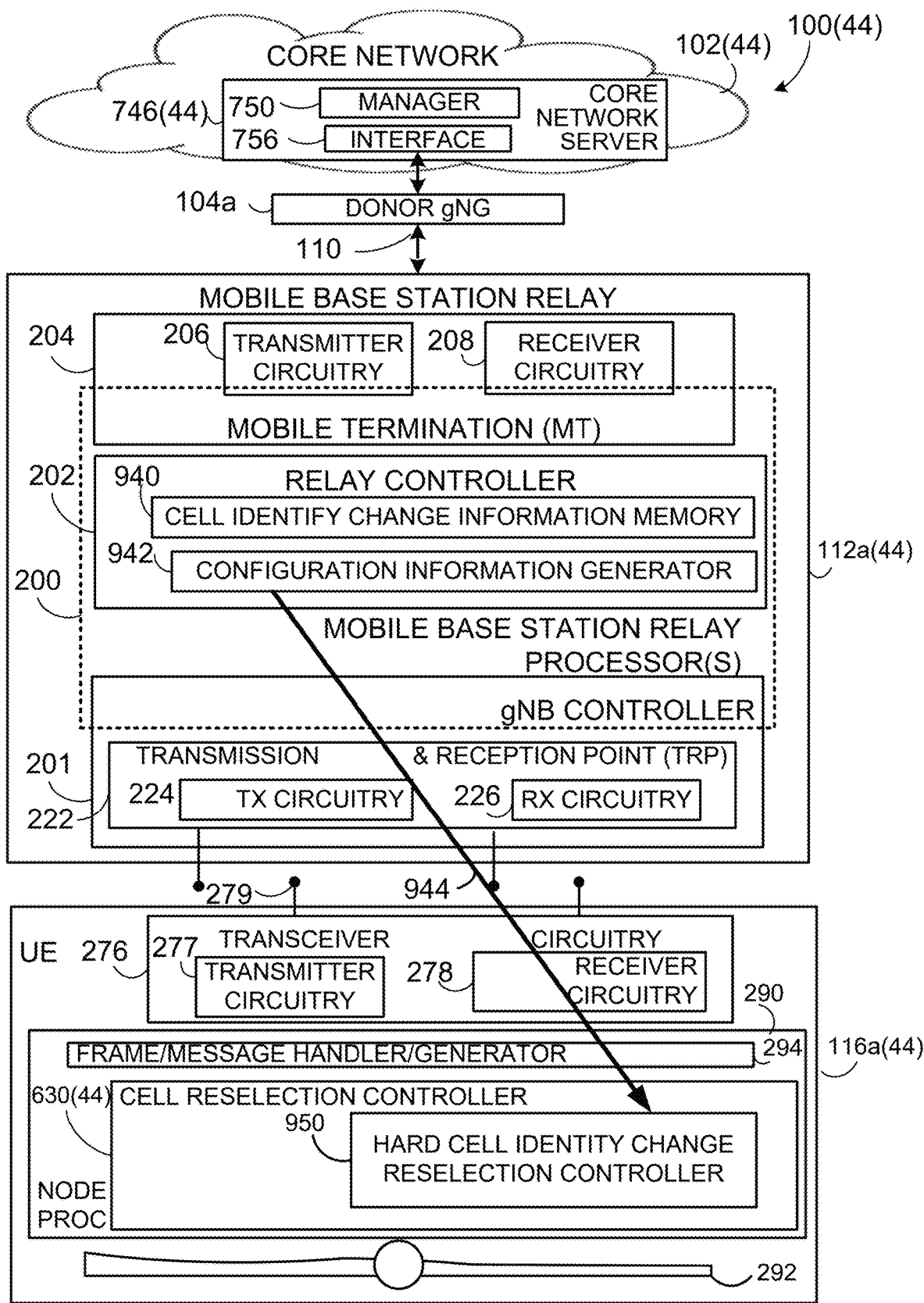
FIG. 44 is a schematic view of a communications system showing both a core network and radio access network which provides an enhanced approach to optimize the cell reselection procedure for a hard cell identity change.
Figure 45:
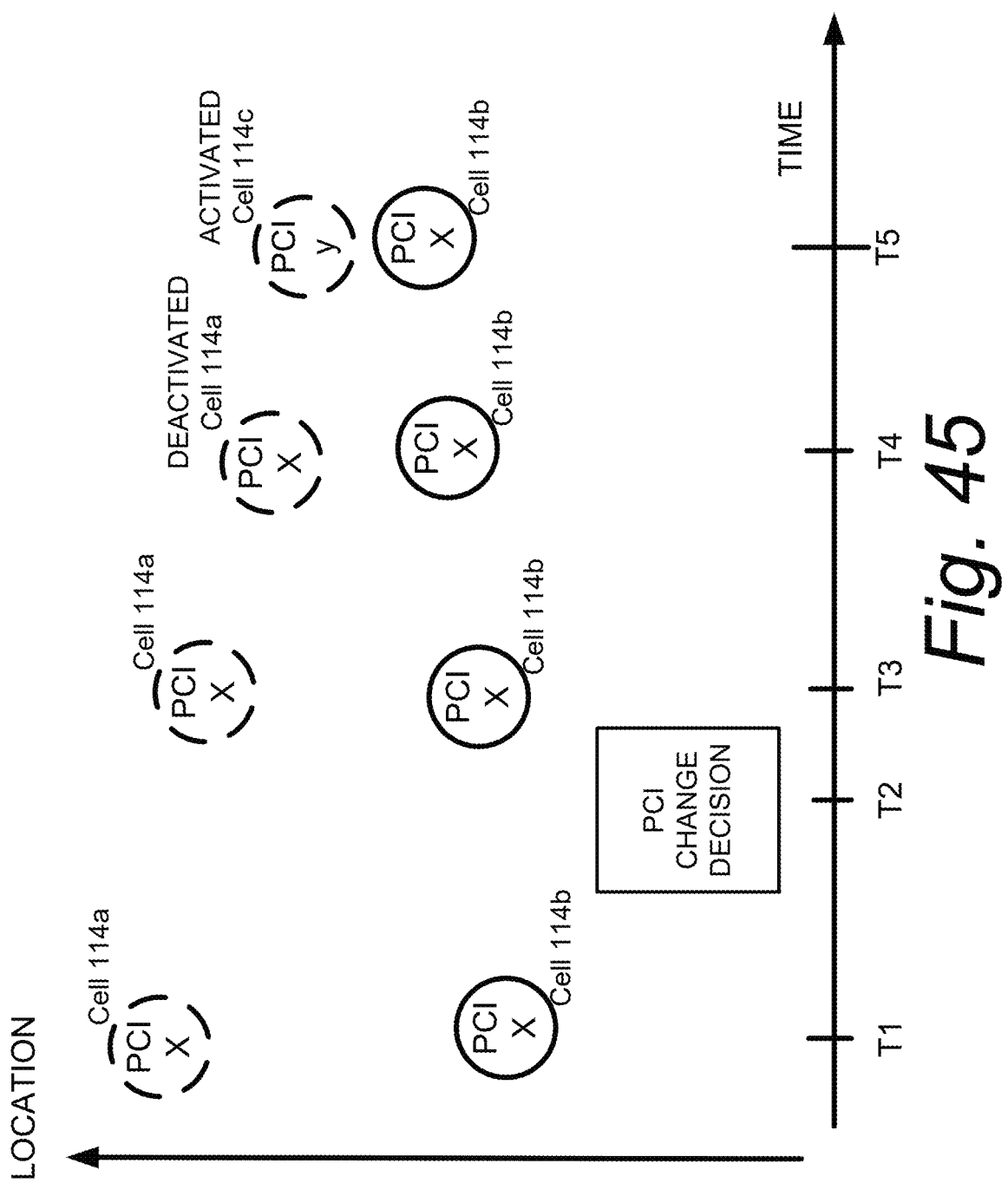
FIG. 45 is a diagrammatic view of a first example scenario of a hard cell identity change for the communication system of FIG. 44.

The example embodiment and mode of FIG. 44-FIG. 49 and Section 10.0 hereof discloses an enhanced approach to optimize the cell reselection procedure for such a hard cell identity change. FIG. 44 shows an example embodiment and mode of a communications system 20(44) in which the enhanced approach to optimize the cell reselection procedure for such a hard cell identity change may be performed. FIG. 45 shows an example scenario of a hard cell identity change for the communication system depicted in FIG. 44. The scenario depicted in FIG. 45 is similar to the scenario shown in FIG. 28, but in FIG. 45 cell 114*c* with PCI y will not be activated until time T5, after cell 11*a* with PCI x gets deactivated at time T4. Time T5 may be also considered as a time from which a wireless terminal may trigger measurements to discover cell 114*c*.

Figure 46:
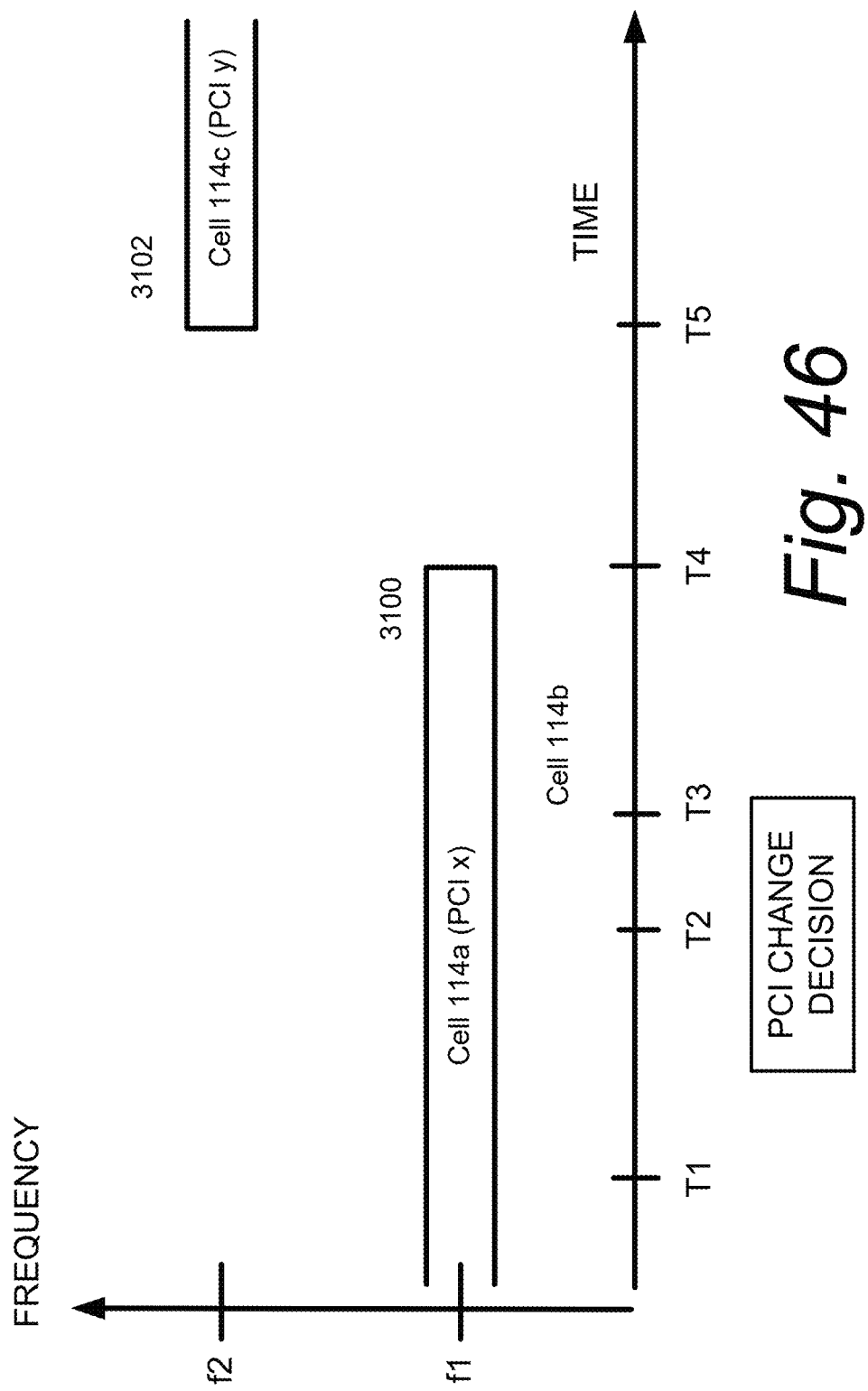
FIG. 46 is a diagrammatic view of a second example scenario of a hard cell identity change for the communication system of FIG. 44.

FIG. 46 is another view of the scenario shown in FIG. 45, wherein the coverage of cell 114*a*, 3100, continues on frequency F1 until time T4, and the coverage of cell 114*c*, 3102, starts on frequency F2 at time T5. The period between T4 and T5 may be considered as a coverage gap caused by the hard cell identity (PCI) change of mobile base station relay 112*a*. Frequency F2 may be the same as or different from frequency F1. If F1 and F2 are the same, PCI x and PCI y must be different to avoid collisions, otherwise, PCI x and PCI y can be the same or different.

In the example embodiment and mode of Section 10.0 as illustrated in FIG. 44-49, after the network makes a decision to change the cell identity of a cell served by a mobile base station relay, and before the cell gets deactivated, the wireless terminal may be configured with information related to the hard cell identity change.

10.1 Example General Architecture

FIG. 44 shows example structures and functionalities of portions of an example embodiment and mode communications system 100(34). FIG. 44 shows, e.g., core network 102(44) and a radio access network. The radio access network comprises a donor gNB node 104*a*, mobile base station relay such as mobile base station relay 112*a*(44), and wireless terminal 116*a*(44). The wireless terminal 116*a*(44) may be situated in a network in like manner as wireless terminal 116*a*(27) of FIG. 27, and may also be simply referred to as wireless terminal 116(44). The structures, functionalities, and operations of the example embodiment and mode of FIG. 44 are essentially the same as those shown by corresponding reference numerals in the preceding figures, unless otherwise noted or evident from the context.

In the example embodiment and mode of FIG. 44, core network 102(44) comprises one or more core network servers 746(44), which may include one or more processors. The core network server 746(44) includes a mobile relay base station manager 750. The core network 102(44) and/or the core network servers 746(44) communicate through an interface 756 with other entities or networks. As shown in FIG. 44, the core network 102(44) communicates through interface 756 with the radio access network.

A node of core network 102(44) is an example of a node of a communications network, e.g., a network entity, that can make a determination to change the cell identity of a cell served by a mobile base station relay.

As in the preceding embodiment and modes, the mobile base station relay 112(44) includes gNB controller 201; relay controller 202; and mobile termination (MT) function 204. The mobile base station relay 112a(44) may comprise one or more mobile station relay processors or mobile station processor circuitry, shown generically as mobile station relay processor 200, which in turn may comprise or host at least portions one or more of of gNB controller 201; relay controller 202; and mobile termination (MT) function 204.

The mobile termination (MT) function 204 comprises transmitter circuitry 206 and receiver circuitry 208. The gNB controller includes transmission and reception point (TRP) 222, which in turn comprises transmitter 224 and receiver 226. As shown in FIG. 2, mobile base station relay 112

In the example embodiment and mode of FIG. 44, mobile base station relay 112(44) includes cell identity change information generator/memory 940. The cell identity change information generator/memory 940 may comprise or be hosted by mobile station relay processor 200 or any other memory device. The cell identity change information comprises (1) second cell information including a cell identity and an operating frequency of a second cell, and; (2) an activation time after which the second cell can be measured. The cell identity change information is configured for use by the wireless terminal to perform a cell reselection procedure to reselect the second cell upon or after the activation time. The mobile station relay processor 200 may further comprise configuration information message generator 942 and or other functionalities shown in one or more other embodiments described herein. The configuration information message generator 942 is configured to and serves to generate one or more configuration message(s) 944 which includes, e.g., the cell identity change information.

FIG. 44 shows wireless terminal wireless terminal 116a (44) as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 44 further shows wireless terminal 116a(44) as also comprising wireless terminal processor circuitry, e.g., one or more wireless terminal processor(s) 290. The wireless terminal 116a(44), e.g., wireless terminal processor(s) 290(44), may comprise frame/message generator/handler 294 and cell (re)selection controller 630(44). The (re)selection controller 630(44) of FIG. 44 also comprises hard cell identity change reselection controller 950. The hard cell identity change reselection controller 950, which may be realized or hosted by the wireless terminal processor(s) 290, is configured to and serves to perform a cell reselection procedure to reselect the second cell upon or after the activation time. The cell reselection procedure is performed based on the cell identity change information provided in the message generated by configuration information message generator 942.

The wireless terminal 116a(44) may also comprise interfaces 292, including one or more user interfaces. Such user interfaces may serve for both user input and output operation (s). The user interfaces may comprise, for example, a screen such as a touch screen that can both display information to the user and receive information entered by the user. The user interface 292 may also include other types of devices, such as a speaker, a microphone, or a haptic feedback device, for example.

10.2 Example Operation

As mentioned above, in the example embodiment and mode of Section 10.0 as illustrated in FIG. 44-49, after the network makes a decision to change the cell identity of a cell served by a mobile base station relay, and before the cell gets deactivated, the wireless terminal may be configured with information related to the hard cell identity change. For example, in FIG. 45 or FIG. 46, at time T3 the mobile base station relay 112a(44) of FIG. 46 may signal the configuration message(s) 944, which may include an indication indicating, e.g., (1) a hard PCI change, (2) time T4, (3) time T5, and (4) information about cell 114c. The configuration message(s) 944 may be carried by system information, MAC control elements, or physical layer signaling, such as PDCCH. The information about cell 114c may at least comprise sufficient information perform measurements and discover cell 114c, such as the frequency and cell identity, e.g., PCI.

The wireless terminal 116(44) that receives the configuration message(s) 944 may perform the following actions:

During Time T3-T4: the wireless terminal may attempt to stay camping on cell 114a. In a typical situation where the wireless terminal is in the vehicle covered by cell 114a, the wireless terminal may not reselect another cell since the coverage of the old cell is likely to be stable. However, if the passenger who possess the wireless terminal gets off the vehicle during T3-T4, the coverage of cell 114a may be degraded, which may trigger measurements for cell reselection, and it is possible during the cell reselection that the new cell 114c may not be available yet. The wireless terminal of the example embodiment and mode of Section 10 may therefore perform a regular cell reselection procedure, such as the procedure shown in Section 4, with an exception that, during this time period, measurements based on the information about a new cell, e.g., cell 114c, may not be performed. In other words, during T3-T4 the wireless terminal will not attempt to discover cell 114c.

During Time T4-T5: the wireless terminal may wait for time T5 if the wireless terminal stayed camping on cell 114a until time T4. In this time period, the wireless terminal may not perform measurements for the old cell, i.e., cell 114a, or the new cell, e.g., cell 114c. If the wireless terminal leaves cell 114a before time T4, it may perform the regular cell reselection procedure, but similar to the case for T3-T4, measurements for the new cell, e.g., cell 114c, may not be performed.

At Time T5 and after: the wireless terminal may perform measurements for cell 114c. In this time period, the measurements for cell 114c may be triggered unconditionally; without measuring the old cell 114a. At Time 5 the old cell 114a has been already deactivated.

In one example implementation, the aforementioned configuration message 944 may be one or more system information blocks (SIBs) broadcasted from a mobile base station relay through its serving cell, such as cell 114a served by mobile base station relay 112a(44). For example, if cell 114c of FIG. 45 is operated on the same frequency as cell 114a, SIB3 of Listing 7 with IntraFreqNeighCellInfo replaced with IntraFreqNeighCellInfo of Listing 14 may be used; otherwise SIB4 of Listing 13 with InterFreqNeighCellInfo replaced with InterFreqNeighCellInfo of Listing 14 may be used. Similar to Listing 7 or Listing 13, Listing 14 shows that presence of the optional field newCellForPCIChange indicate that a cell identity, e.g., PCI, change will occur. In addition, presence of the optional field HardPCIChangeConfig indicate that the cell identity change may be a hard cell identity change. If HardPCIChangeConfig is not present, the cell identity change may be a soft cell identity change as disclosed in Section 7.0. HardPCIChangeConfig may comprise deactivation Time, the absolute time for deactivating the old cell 114a, time T4 of FIG. 45 and FIG. 46, and gapDuration, the gap between deactivationTime and the time that the wireless terminal may start measuring the new cell 114c, e.g., period T4-T5.

47-3 may occur simultaneously. In this case the cell deactivation message and the cell activation message may be sent in a same container, e.g., a packet. Furthermore, the network may or may not specify time T4 and T5 in the deactivation/activation messages; if not, it may be a wireless terminal 116a(44)'s decision to determine time T4 and T5. Mobile base station relay activates cell 114c with PCI y. Cell 114c starts transmission of broadcast signals, such as system information.

Act 47-4: cell 114a broadcast Short Message, such as that of Table 6-1 or Table 6-2.

Act 47-5: the Short Message of act 47-4 triggers a system information acquisition procedure at wireless terminal 116a(44), to acquire latest system information from cell 114a.

| Listing 14 | |
|---|---|
| IntraFreqNeighCellInfo ::= | SEQUENCE { |
| physCellId | PhysCellId, |
| q-OffsetCell | Q-OffsetRange, |
| q-RxLevMinOffsetCell | INTEGER (1..8) OPTIONAL, -- Need R |
| q-RxLevMinOffsetCellSUL | INTEGER (1..8) OPTIONAL, -- Need R |
| q-QualMinOffsetCell | INTEGER (1..8) OPTIONAL, -- Need R |
| newCellForPCIChange | ENUMERATED (true), OPTIONAL, |
| hardPCIChangeConfig | HardPCIChangeConfig, OPTIONAL, - |
| - Cond HardPCIChange | |
| ... | |
| } | |
| InterFreqNeighCellInfo ::= | SEQUENCE { |
| physCellId | PhysCellId, |
| q-OffsetCell | Q-OffsetRange, |
| q-RxLevMinOffsetCell | INTEGER (1..8) OPTIONAL, -- Need R |
| q-RxLevMinOffsetCellSUL | INTEGER (1..8) OPTIONAL, -- Need R |
| q-QualMinOffsetCell | INTEGER (1..8) OPTIONAL, -- Need R |
| newCellForPCIChange | ENUMERATED (true), OPTIONAL, |
| hardPCIChangeConfig | HardPCIChangeConfig, OPTIONAL, - |
| - Cond HardPCIChange | |
| ... | |
| } | |
| HardPCIChangeConfig | SEQUENCE { |
| deactivationTime | INTEGER (0..549755813887), |
| gapDuration | INTEGER (1..6000), |
| ... | |
| } | |

It should be noted that configuring time T4 and T5 may be achieved by a manner different from the manner shown in Listing 14. For example, the absolute time (deactivationTime of Listing 14) may be replaced by a time value relative to the time of SIB3/SIB4 transmission. The example embodiment and mode of Section 10.0 is intended to cover any other alternative manner to specify time T4 and T5.

Figure 47:
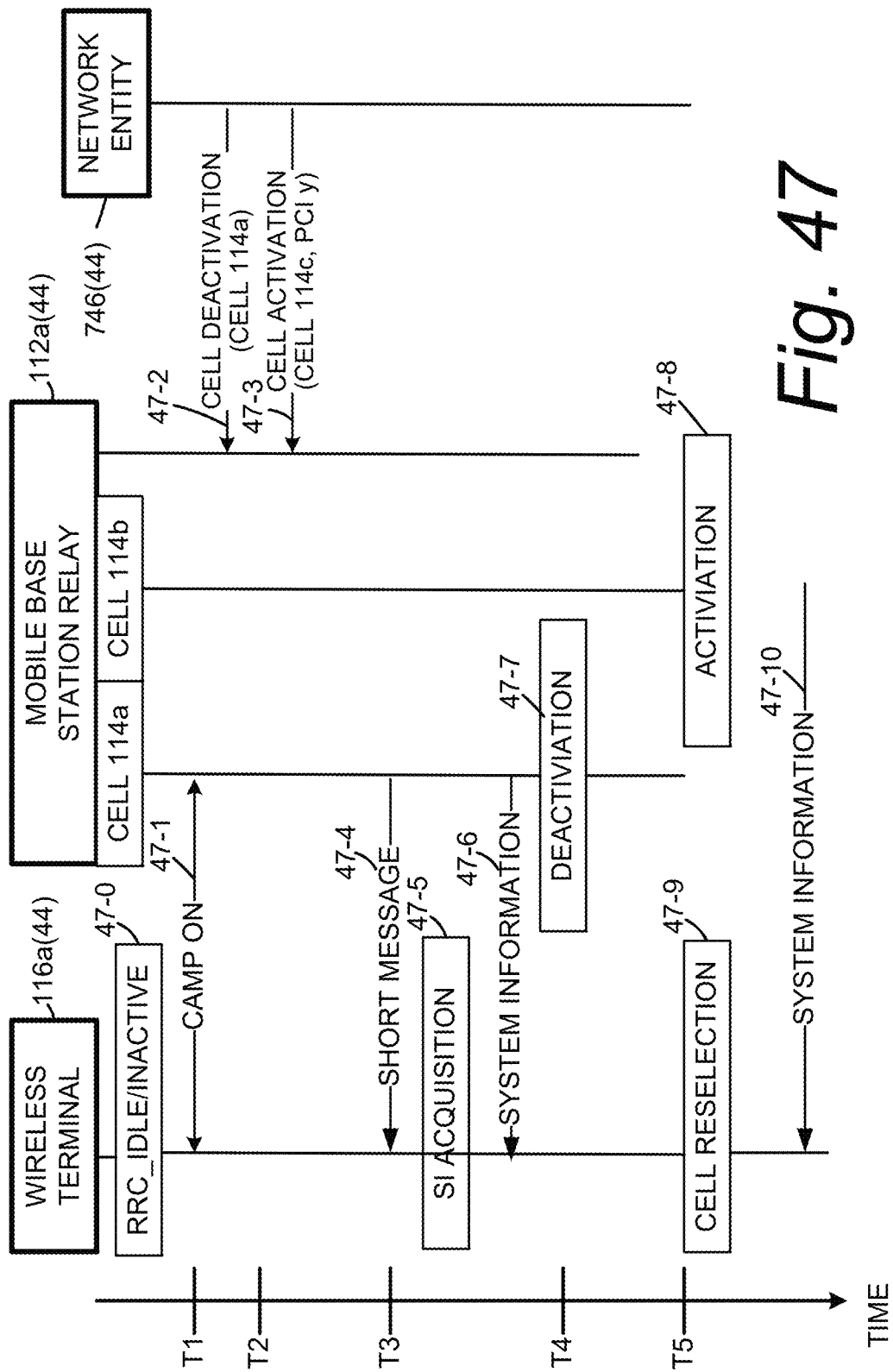
FIG. 47 is a diagrammatic view of an example message flow and associated events for the communication system of FIG. 44.

FIG. 47 shows an example message flow and associated events for the communication system of FIG. 44 and, e.g., the scenario of FIG. 45. Acts of FIG. 47 are described below:

Act 47-0: wireless terminal 116a(44) is in RRC_IDLE or RRC_INACTIVE state.

Act 47-1: wireless terminal 116a(44) is camping on cell 114a (PCI x) served by mobile base station relay 112a(44) at time T1 of FIG. 45.

Act 47-2: at time T2 of FIG. 45, network entity 746(44) decides to deactivate cell 114a, and send a cell deactivation message to mobile base station relay 112a(44).

Act 47-3: at time T3 of FIG. 45, or time between T3 and T5, the network entity decides to activate cell 114c, PCI y, and sends a cell activation message to mobile base station relay 112a(144). Note that Act 47-2 and Act Act 47-6: wireless terminal 116a(44) acquires system information comprising SIB1 and other relevant SIBs, e.g., SIB3 of Listing 7 and/or SIB4 of Listing 13 with the modifications shown in Listing 14.

Act 47-7: at time T4, mobile base station relay 112a(44) deactivates cell 114a. Wireless terminal 116a(44) may stop measuring/evaluating cell 114a and wait for time T5.

Act 47-8: upon or before time T5, mobile base station relay activates cell 114c with PCI y. Cell 114c starts transmission of broadcast signals, such as system information.

Act 47-9: at time T5 specified in the system information received in Act 47-6, wireless terminal 116a(44) performs a cell reselection procedure. From the system information, wireless terminal 116a(44) starts measurements for cell 114c and eventually reselects cell 114c.

Act 47-10: wireless terminal 116a(44) acquires system information from cell 114c and camps on cell 114c.

Figure 48:
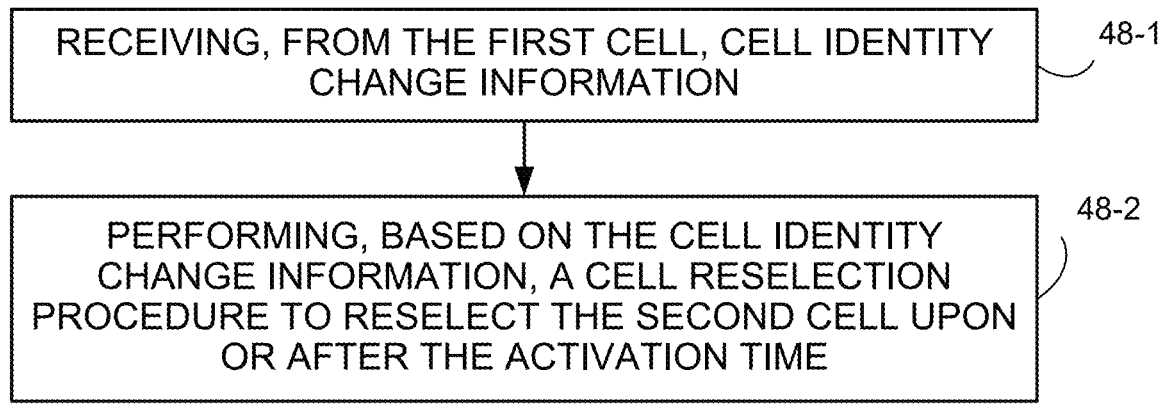
FIG. 48 is a flowchart view showing representative, example steps or acts performed by an example wireless terminal of the communications system of the example embodiment and mode of FIG. 44.

FIG. 48 is a flow chart showing example representative steps or acts performed by a wireless terminal of the example embodiment and mode of Section 10.0, e.g., wireless terminal 116a(44) of FIG. 44, communicating with a first cell served by a mobile base station relay.

Act 48-1 comprises receiving, from the first cell, cell identity change information. The cell identity change information may comprise: second cell information including a cell identity of a second cell, and an activation time after which the second cell can be measured. The cell identity change information may further comprise a deactivation time upon which the first cell will be deactivated. The deactivation time may be equal to or earlier than the activation time. In an example implementation the second cell information may also optionally include the operating frequency of the second cell. The cell identity of the second cell may be different from a cell identity of the first cell. The second cell may be also served by the mobile base station relay. The cell identity change information may be included in one or more system information blocks (SIBs).

Act 49-2 comprises performing, based on the cell identity change information, a cell reselection procedure to reselect the second cell upon or after the activation time. After the deactivation time the wireless terminal may stop evaluating the first cell. In addition, before the activation time the wireless terminal may refrain from performing measurements using the second cell information.

Figure 49:
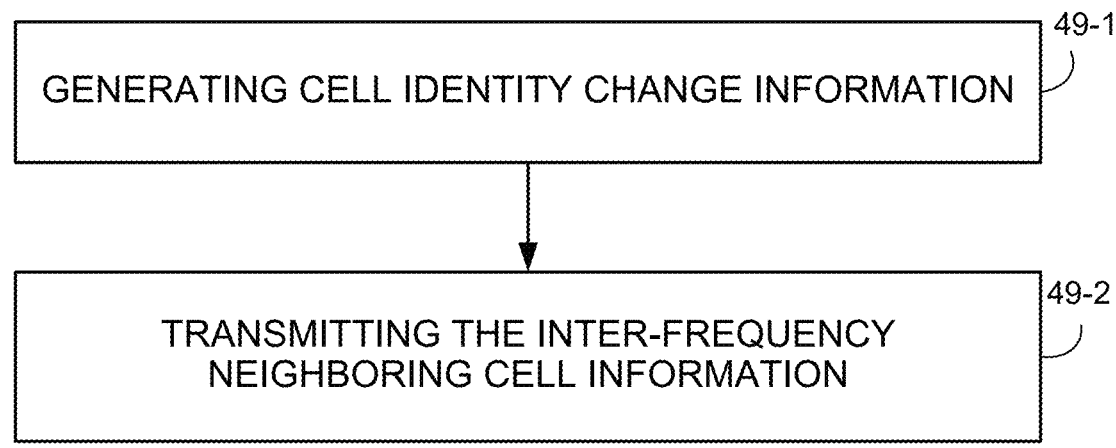
FIG. 49 is a flowchart view showing representative, example steps or acts performed by an example mobile station relay of the communications system of the example embodiment and mode of FIG. 44.

FIG. 49 is a flow chart showing example representative steps or acts performed by a mobile base station relay of the example embodiment and mode of Section 10.0, e.g., mobile base station relay 112a(44) of FIG. 45, serving a wireless terminal via a first cell.

Act 49-1 comprises generating cell identity change information. The cell identity change information may comprise: second cell information including a cell identity of a second cell, and an activation time after which the second cell can be measured. The cell identity change information may further comprise a deactivation time upon which the first cell will be deactivated. The deactivation time may be equal to or earlier than the activation time. In an example implementation the second cell information may also optionally include the operating frequency of the second cell. The cell identity of the second cell may be different from a cell identity of the first cell. The second cell may be also served by the mobile base station relay. The cell identity change information may be included in one or more system information blocks (SIBs).

Act 49-2 comprises transmitting, to the wireless terminal, the cell identity change information. The cell identity change information may be used by the wireless terminal to perform a cell reselection procedure to reselect the second cell upon or after the activation time.

11.0 Handover Procedure for Soft Cell Identity Change

FIG. 28 of an Embodiment of Section 7.0 shows an example scenario of a soft cell identity change for the communication system depicted in FIG. 27. An embodiment of section 8.0 discloses the enhanced cell reselection procedure while a wireless terminal is in either RRC_IDLE or RRC_INACTIVE. The embodiments of FIG. 50-FIG. 56 of Section 11.0 disclose apparatus and method for a handover procedure for a wireless terminal in RRC_CONNECTED state upon a soft cell identity change.

Figure 50:
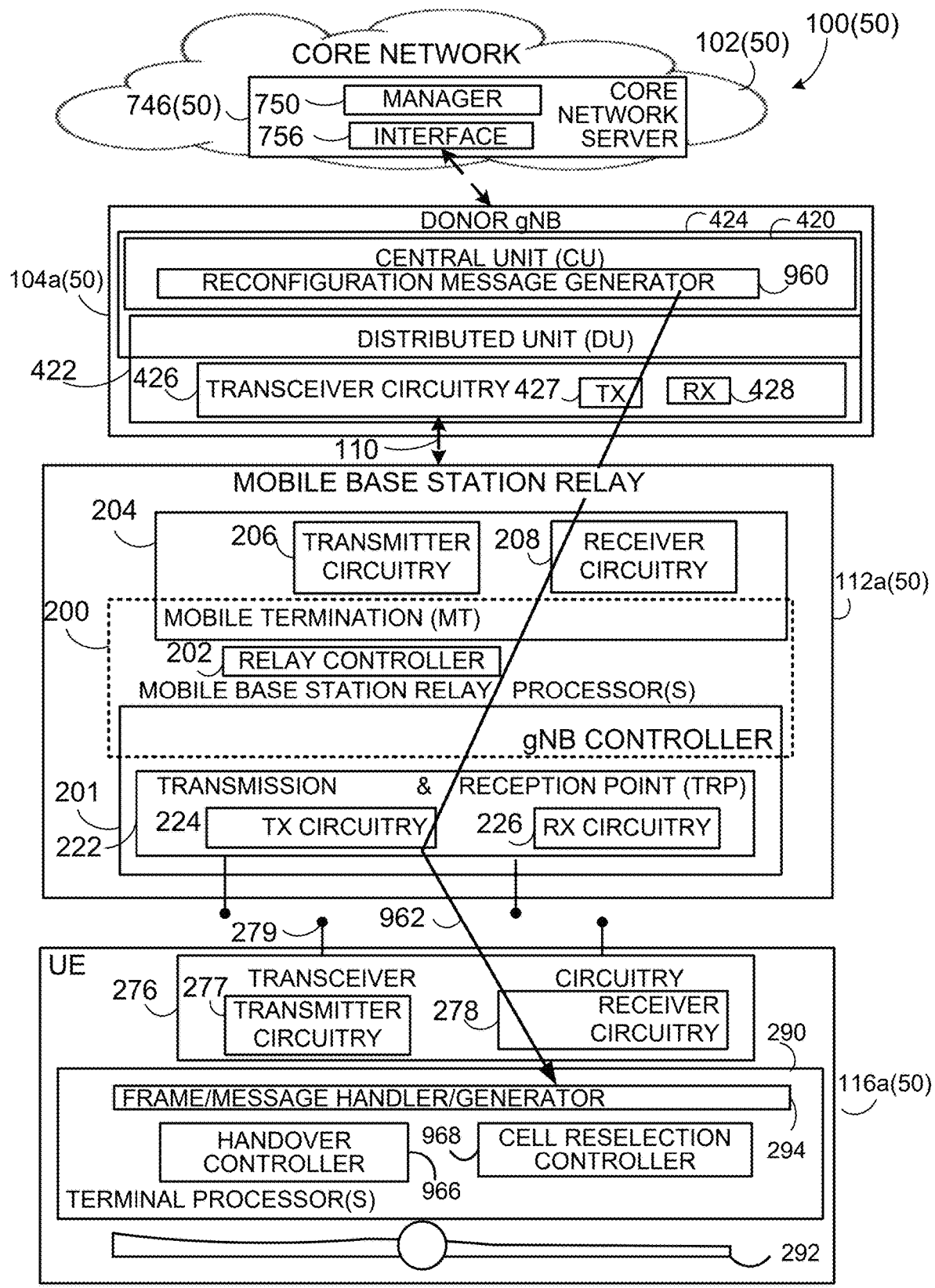
FIG. 50 is a schematic view of a communications system showing both a core network and radio access network which provides handover for a hard cell identify change.

FIG. 50 generally depicts a communications system 100 (50) showing both a core network and radio access network which provides handover for a soft cell identify change.

Figure 51:
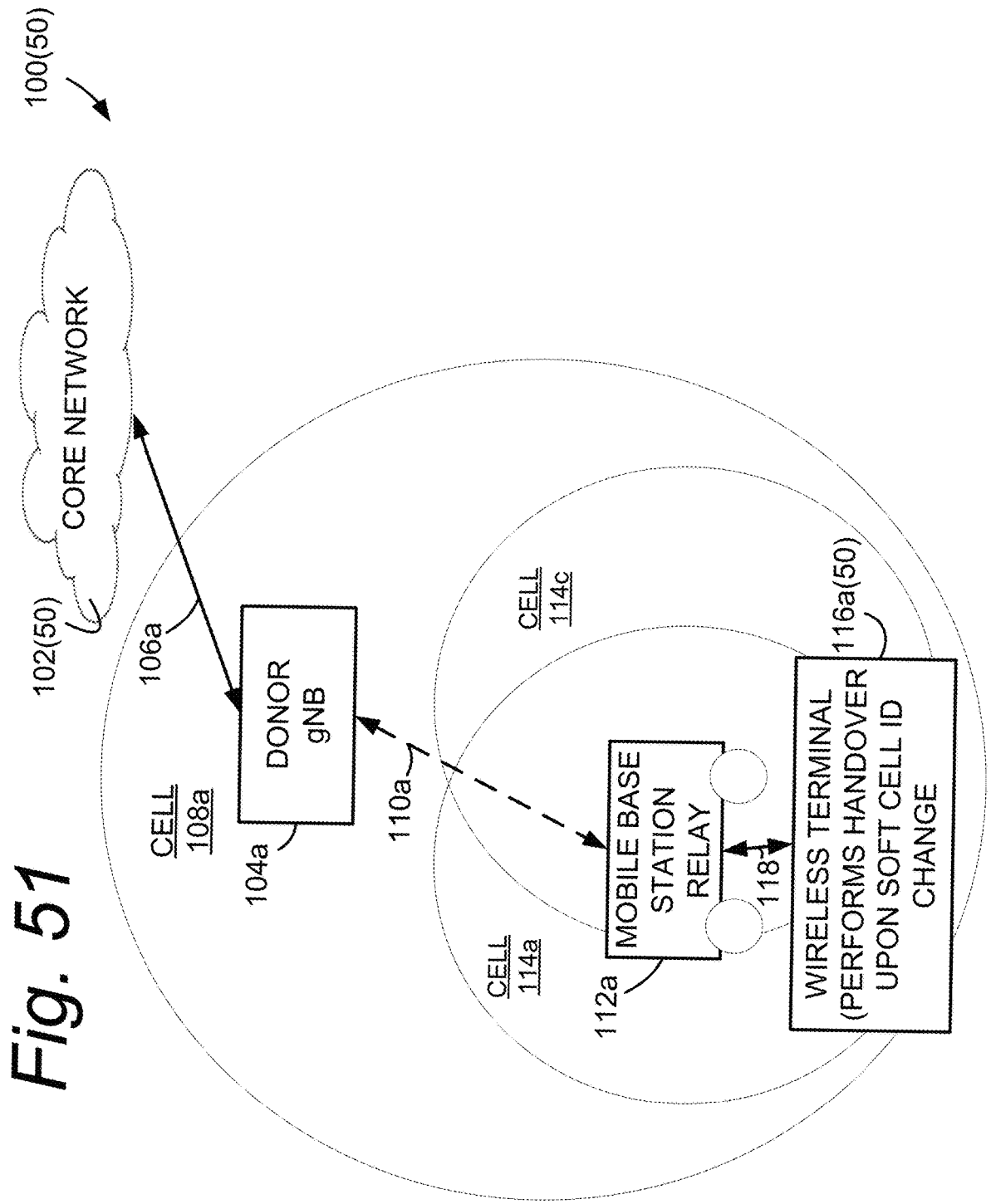
FIG. 51 is a diagrammatic view of an example scenario of a handover for a hard cell identify change for the communication system of FIG. 50.
Figure 52:
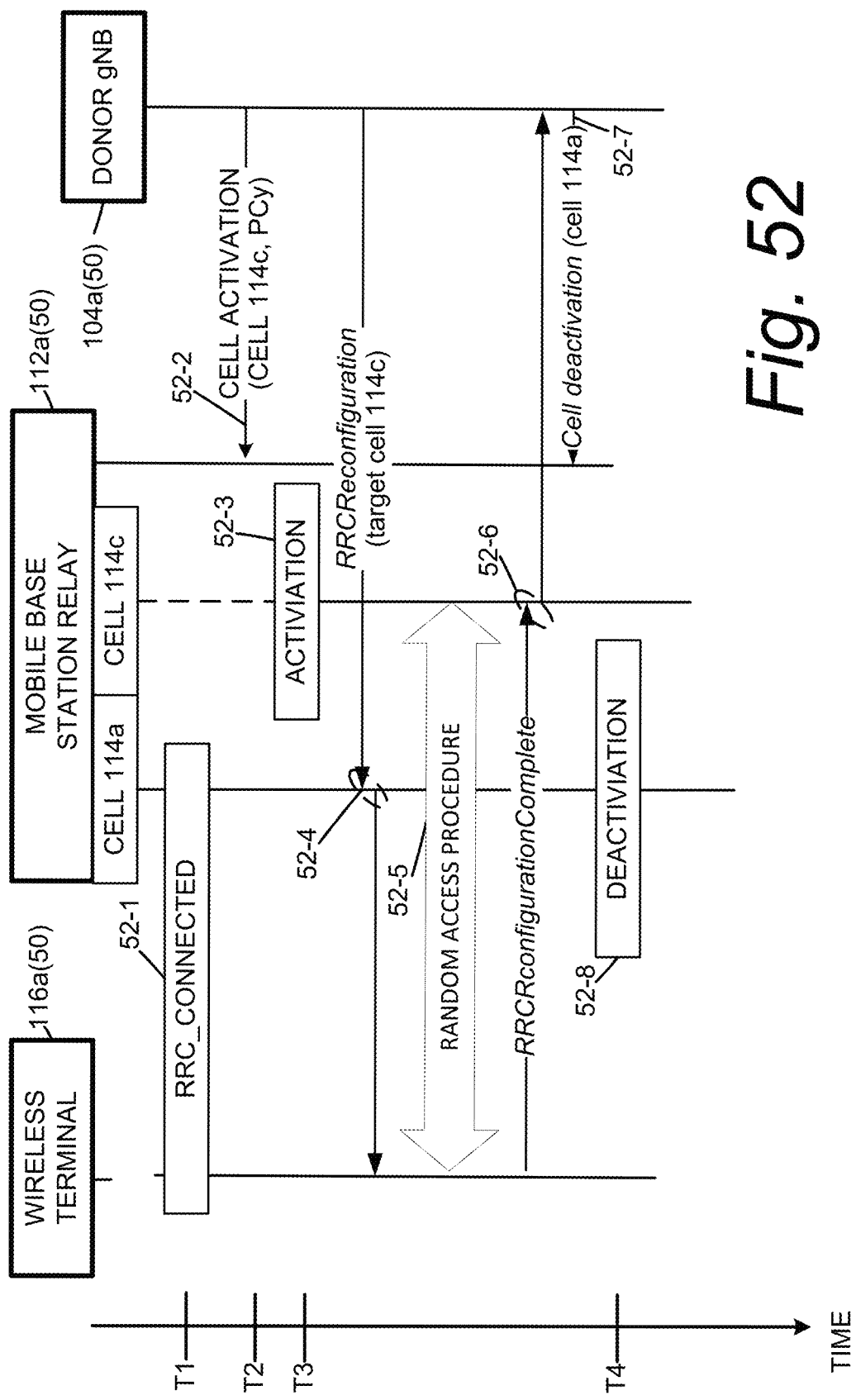
FIG. 52 is a diagrammatic view of a first example message flow and associated events for the communication system of FIG. 50.

FIG. 50 shows example structures and functionalities of portions of the example embodiment and mode communications system 100(50). FIG. 51 shows an example scenario of a handover for a soft cell identify change for the communication system of FIG. 50. FIG. 52 shows an example message flow and associated events for the communication system of FIG. 50, and particularly for a wireless terminal, such as wireless terminal 116a of FIG. 50 and FIG. 51, when performing a handover, e.g., reconfiguration with sync procedure per 3GPP TS 38.331, from an old cell, such as cell 114a of FIG. 51, to a new cell, such as cell 114c of FIG. 51. Although cell 114c is shown in FIG. 51 as being slightly locationally offset from cell 114a, it should be understood that the location of cell 114c in FIG. 51 may be overlapping, co-extensive, or not coextensive in geographical extent and/or coverage.

FIG. 50 shows, e.g., core network 102(50) and a radio access network. The radio access network comprises a donor gNB node 104a(50), mobile base station relay such as mobile base station relay 112a(50), and wireless terminal 116a(50). The donor gNB node 104a(50), the mobile base station relay 112a(50), and the wireless terminal 116a(50) may be situated in a network in the same manner as corresponding structures of FIG. 27 and may also be simply referred to as donor gNB node 104a, mobile base station relay 112a, and wireless terminal 116a and/or wireless terminal 116(50), respectively. The structures, functionalities, and operations of the nodes and entities of example embodiment and mode of FIG. 50 are essentially the same as those shown by corresponding reference numerals in the preceding figures, unless otherwise noted or evident from the context. Further descriptions of the donor gNB node 104a(50), mobile base station relay 112a(50), and wireless terminal 116a(50) are provided below.

11.1 Example Scenarios

With reference to the example message flows of FIG. 52, suppose that at time T1 wireless terminal 116a is in RRC_CONNECTED state with cell 114a with PCI=x, as depicted by act 52-1. At time T2, the network entity, e.g., donor gNB 104a, decides to perform the soft cell identity change as described in the previous embodiments. As act 52-2 the network entity may send a cell activation command, which may instruct mobile base station relay 112a to activate cell 114c with PCI=y at time T3. Activation of cell 114c with PCI=y at time T3 is shown as act 52-3. As act 52-4 donor gNB 104a may then send, via cell 114a, RRCReconfiguration message which may instruct wireless terminal 116a to perform a handover to cell 114c as a target cell. Based on the reception of the RRCReconfiguration message, wireless terminal 116a may perform a random access procedure to get synchronized to cell 114c. The random access procedure is shown as act 52-5 in FIG. 52. After successful completion of the random access procedure, as act 52-6 the wireless terminal 116a may then send, via cell 116c, a RRCReconfigurationComplete message to Donor gNB 104a. Then, upon confirming that wireless terminal 116a, and possibly other unillustrated wireless terminals connected to cell 114a are migrated to cell 114c, as act 52-7 the donor gNB 104a may send a cell deactivation command to mobile base station relay 112a, which may instruct the mobile base station relay 112a to shut down cell 114a at time T4. Deactivation of cell 114a is shown as act 52-8 in FIG. 52.

In the configuration of the example scenario of FIG. 51, the donor gNB that controls cell 114c is Donor gNB 104a, i.e., the donor gNB that also controls cell 114a. In another unillustrated configuration, the donor gNB that controls cell 114c can be a donor gNB different from Donor gNB 104a, e.g., Donor gNB 104c. In such case of the donor gNB being different from Donor gNB 104a, e.g., a different Donor gNB 104c, there may be a negotiation process between Donor gNB 104a and Donor gNB 104c to coordinate the handover. In addition, RRCReconfigurationComplete message of act 52-6 may be sent to Donor gNB 104c.

In the example embodiment and mode of FIG. 50-FIG. 56, the RRCReconfiguration message such as that of act 52-4 of FIG. 52 may comprise an indication to indicate that the handover, e.g., handover reconfiguration with sync, instructed by the message may be caused by a soft cell identity change. Listing 15 shows an example format of the RRCReconfiguration message, wherein an information element softPCIChange indicates whether the reconfiguration with sync may be caused by the soft PCI change illustrated in FIG. 28.

Listing 15

```
RRCReconfiguration-IEs ::=          SEQUENCE {
    radioBearerConfig               RadioBearerConfig
OPTIONAL, -- Need M
    secondaryCellGroup              OCTET STRING (CONTAINING
CellGroupConfig)
OPTIONAL, -- Cond SCG
    measConfig                      MeasConfig
OPTIONAL, -- Need M
    lateNonCriticalExtension        OCTET STRING
OPTIONAL,
    nonCriticalExtension            RRCReconfiguration-v1530-IEs
OPTIONAL
}
RRCReconfiguration-v1530-IEs   ::=  SEQUENCE {
    masterCellGroup                 OCTET STRING (CONTAINING
CellGroupConfig)
OPTIONAL, -- Need M
    fullConfig                      ENUMERATED {true}
OPTIONAL, -- Cond FullConfig
    dedicatedNAS-MessageList        SEQUENCE (SIZE(1..maxDRB))
OF DedicatedNAS-Message
OPTIONAL, -- Cond nonHO
    masterKeyUpdate                 MasterKeyUpdate
OPTIONAL, -- Cond MasterKeyChange
    dedicatedSIB1-Delivery          OCTET STRING (CONTAINING
SIB1)
OPTIONAL, -- Need N
    dedicatedSystemInformationDelivery   OCTET STRING
(CONTAINING SystemInformation)
OPTIONAL, -- Need N
    otherConfig                     OtherConfig
OPTIONAL, -- Need M
    nonCriticalExtension            RRCReconfiguration-v1540-
IEs
OPTIONAL
}
...
CellGroupConfig ::=                 SEQUENCE {
    cellGroupId                                 CellGroupId,
    rlc-BearerToAddModList          SEQUENCE (SIZE(1..maxLC-ID))
OF RLC-BearerConfig
OPTIONAL,  -- Need N
    rlc-BearerToReleaseList         SEQUENCE (SIZE(1..maxLC-ID))
OF LogicalChannelIdentity
OPTIONAL,  -- Need N
    mac-CellGroupConfig             MAC-CellGroupConfig
OPTIONAL,  -- Need M
    physicalCellGroupConfig         PhysicalCellGroupConfig
OPTIONAL,  -- Need M
    spCellConfig                    SpCellConfig
OPTIONAL,  -- Need M
    sCellToAddModList               SEQUENCE (SIZE
(1..maxNrofSCells)) OF SCellConfig
OPTIONAL,  -- Need N
    sCellToReleaseList              SEQUENCE (SIZE
(1..maxNrofSCells)) OF SCellIndex
OPTIONAL,  -- Need N
    ...,
}
-- Serving cell specific MAC and PHY parameters for a SpCell:
SpCellConfig ::=                    SEQUENCE {
    servCellIndex                   ServCellIndex
OPTIONAL,  -- Cond SCG
    reconfigurationWithSync         ReconfigurationWithSync
OPTIONAL,  -- Cond ReconfWithSync
```

Listing 15

```
rlf-TimersAndConstants             SetupRelease { RLF-
 TimersAndConstants }
OPTIONAL,  -- Need M
  rlmInSyncOutOfSyncThreshold              ENUMERATED {n1}
OPTIONAL,  -- Need S
  spCellConfigDedicated            ServingCellConfig
OPTIONAL,  -- Need M
  ...,
}
ReconfigurationWithSync ::=        SEQUENCE {
spCellConfigCommon                    ServingCellConfigCommon
OPTIONAL,  -- Need M
  newUE-Identity                   RNTI-Value,
  t304                             ENUMERATED {ms50,
ms100, ms150, ms200, ms500, ms1000, ms2000, ms10000},
  rach-ConfigDedicated             CHOICE {
    uplink                             RACH-ConfigDedicated,
    supplementaryUplink                RACH-ConfigDedicated
  }
OPTIONAL,  -- Need N
  softPCIChange                    ENUMERATED {true} OPTIONAL
  ...,
}
ServingCellConfigCommon ::=        SEQUENCE {
  physCellId                         PhysCellId
OPTIONAL,  -- Cond HOAndServCellAdd,
  downlinkConfigCommon               DownlinkConfigCommon
OPTIONAL,  -- Cond HOAndServCellAdd
  uplinkConfigCommon                 UplinkConfigCommon
OPTIONAL,  -- Need M
  ...
}
```

Figure 53:
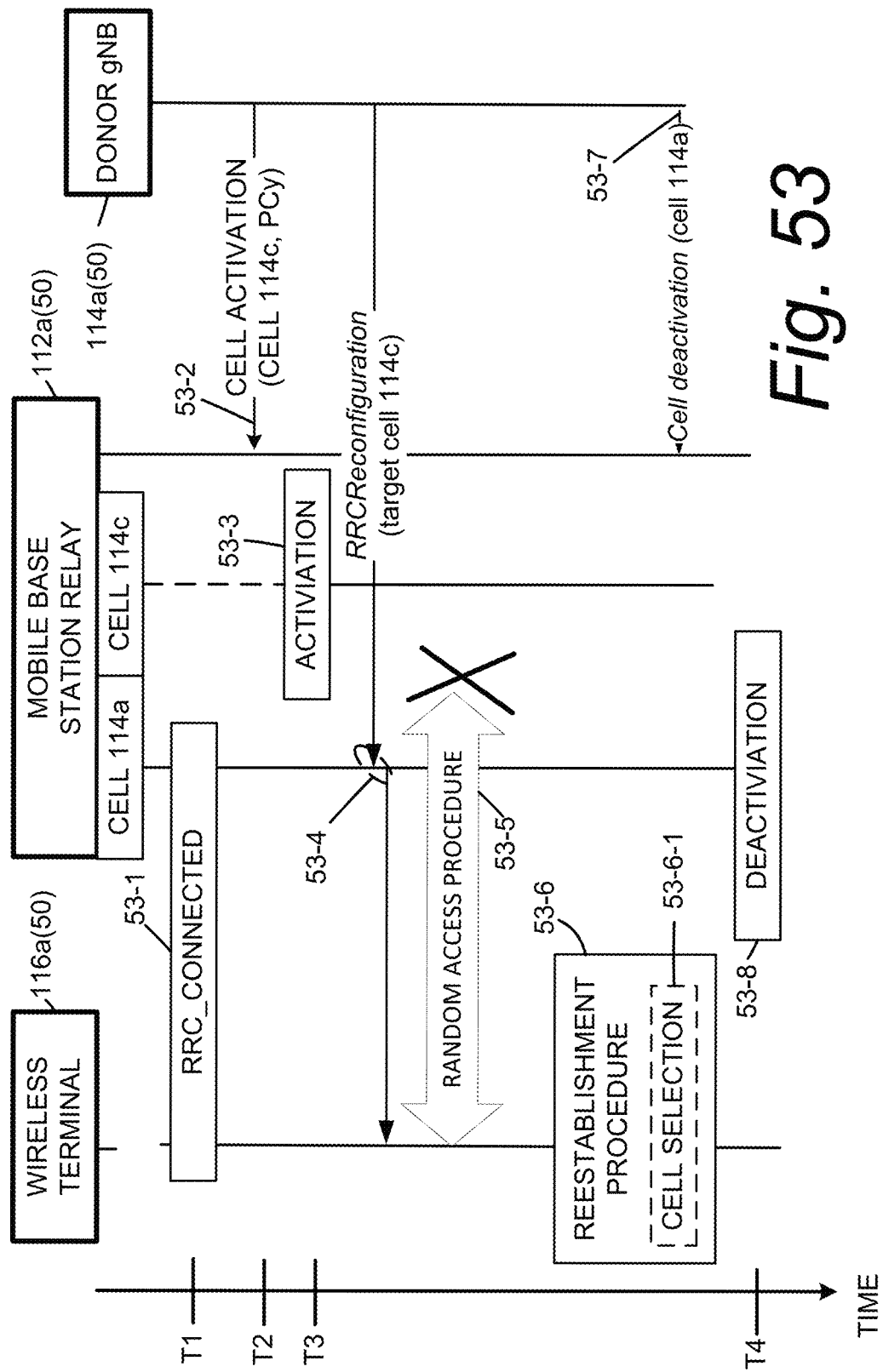
FIG. 53 is a diagrammatic view of a second example message flow and associated events for the communication system of FIG. 50.

Wireless terminal 116a that receives the RRCReconfiguration message of Listing 15 may attempt to perform a handover to the target cell, whose PCI is specified in the PhysCellId field of ServingCellConfigCommon. If the wireless terminal discovers the target cell and performs the handover, as shown in the scenario of FIG. 51, the handover procedure, e.g., the reconfiguration with sync procedure, may successfully end. However, FIG. 53 shows an example scenario where the handover procedure results in a failure. Act 53-1 to act 53-4 and act 53-7 to act 53-8 are identical to act 51-1 to act 51-4 and act 51-7 to act 51-8 of FIG. 51 At act 53-5, wireless terminal 116a may fail to get synchronized to cell 114c. For example, there may be no random access response from cell 114c. The synchronization failure may cause a radio link failure, RLF. The RLF may occur when the radio link to cell 114c is temporarily blocked or wireless terminal 116a is moving away from cell 114c. In this scenario, wireless terminal 116a may then initiate a reestablishment procedure as shown by act 53-6 of FIG. 53. In the reestablishment procedure of act 53-6, a cell selection procedure may be performed first, as depicted by act 53-6-1.

The cell selection procedure, e.g., act 53-6-1, is a procedure to find a suitable cell after an RLF so that wireless terminal 116a may recover the RRC connection. In the scenario of FIG. 53, wireless terminal 116a may scan RF channels and, in certain circumstances, it may discover cell 114c, the target cell (new cell) directed by the RRCReconfiguration message. However, in other circumstances, wireless terminal 116a may discover cell 114a, the source cell that will be deactivated momentarily at the end of the soft cell identity change. Consequently, the wireless terminal should not attempt to recover or reestablish the RRC connection to cell 114a.

The wireless terminal of the example embodiment and mode of FIG. 50-FIG. 56 may utilize the indication softPCIChange in the RRCReconfiguration message of Listing 15 to avoid selecting the source cell, e.g., cell 114a, when the handover results in a failure as depicted by 53-5. Specifically, in the cell selection procedure depicted as act 53-6-1 of FIG. 53, for example, if the RRCReconfiguration message received in act 53-4 includes softPCIChange, wireless terminal 116a may treat the source cell that provides the RRCReconfiguration messge, e.g., Primary Cell (PCell), or Special Cell (SpCell) of Master Cell Group (MCG), as either "not considered as a candidate", "not selectable", or "not suitable" during the cell selection procedure.

In the cell selection procedure, wireless terminal 116a may perform the cell selection procedure based on 3GPP TS 38.304 and may also perform the extension of the TS 38.304 cell selection procedure shown in the bold text in Listing 16. The extension is aimed to exclude the source cell, e.g., cell 114a, from candidates for the cell selection procedure depicted by act 53-6-1.

Listing 16

Cell selection is performed by one of the following two procedures:
  a) Initial cell selection (no prior knowledge of which RF channels are NR frequencies):
    1. The UE shall scan all RF channels in the NR bands according to its capabilities to find a suitable cell.

|  |
|---|
| Listing 16 |

2. On each frequency, the UE need only search for the strongest cell, except for operation with shared spectrum channel access where the UE may search for the next strongest cell(s).
 3. Once a suitable cell is found, this cell shall be selected.
b) Cell selection by leveraging stored information:
 1. This procedure requires stored information of frequencies and optionally also information on cell parameters from previously received measurement control information elements or from previously detected cells.
 2. Once the UE has found a suitable cell, the UE shall select it.
 3. If no suitable cell is found, the initial cell selection procedure in a) shall be started.
suitable cell:
For UE not operating in SNPN Access Mode, a cell is considered as suitable if the following conditions are fulfilled:
- The cell is part of either the selected PLMN or the registered PLMN or PLMN of the Equivalent PLMN list, and for that PLMN either:
 - The PLMN-ID of that PLMN is broadcast by the cell with no associated CAG-IDs and CAG-only indication in the UE for that PLMN (TS 23.501 [10]) is absent or false;
 - Allowed CAG list in the UE for that PLMN (TS 23.501 [10]) includes a CAG-ID broadcast by the cell for that PLMN;
- The cell selection criteria are fulfilled, see clause 5.2.3.2.
- The cell is not the PCell or SpCell that provided RRCReconfiguration message with softPCIChange.
According to the latest information provided by NAS:
- The cell is not barred, see clause 5.3.1;
- The cell is part of at least one TA that is not part of the list of "Forbidden Tracking Areas for Roaming" (TS 22.011 [18]), which belongs to a PLMN that fulfils the first bullet above.
For UE operating in SNPN Access Mode, a cell is considered as suitable if the following conditions are fulfilled:
- The cell is part of either the selected SNPN or the registered SNPN of the UE;
- The cell selection criteria are fulfilled, see clause 5.2.3.2;
According to the latest information provided by NAS:
- The cell is not barred, see clause 5.3.1;
- The cell is part of at least one TA that is not part of the list of "Forbidden Tracking Areas for Roaming" which belongs to either the selected SNPN or the registered SNPN of the UE.

11.2 Example Network Structure

In the example embodiment and mode of FIG. 50, core network 102(50) comprises one or more core network servers 746(50), which may include one or more processors. The core network server 746(50) may include a mobile relay base station manager 750. The core network 102(50) and/or the core network servers 746(50) communicate through an interface 756 with other entities or networks. As shown in FIG. 50, the core network 102(50) communicates through interface 756 with the radio access network.

A node of core network 102(44) is an example of a node of a communications network, e.g., a network entity, that may make a determination to change the cell identity of a cell served by a mobile base station relay.

As in the preceding embodiment and modes, Donor gNB 104a(50), in one example implementation as comprising central unit 420 and distributed unit 422. Central unit 420 and distributed unit 422 may be realized by, e.g., be comprised of or include, one or more processor circuits, e.g., donor gNB node processor(s) 424. The one or more node processor(s) 424 may be shared by central unit 420 and distributed unit 422, or each of central unit 420 and distributed unit 422 may comprise one or more node processor(s) 424. Moreover, central unit 420 and distributed unit 422 may be co-located at the same node site, or alternatively one or more distributed units 422 may be located at sites remote from central unit 420 and connected thereto by a packet network. The distributed unit 422 may comprise transceiver circuitry 426, which in turn may comprise transmitter circuitry 427 and receiver circuitry 428. The transceiver circuitry 426 may include antenna(e) for the wireless transmission. Transmitter circuitry 427 may include, e.g., amplifier(s), modulation circuitry and other conventional transmission equipment. Receiver circuitry 428 may comprise, e.g., amplifiers, demodulation circuitry, and other conventional receiver equipment.

As further shown in FIG. 50, gNB node processor(s) 424 may comprise reconfiguration message generator 960. The reconfiguration message generator 960, which may be realized by gNB node processor(s) 424, generates a reconfiguration message, shown by arrow 962, to comprise second cell information including a cell identity and an operating frequency of a second cell and an indication indicating whether or not the first cell will be replaced by the second cell. The transmitter circuitry 427 is configured to transmit, via the mobile base station relay, the reconfiguration message 962 to the wireless terminal. In a case that the indication indicates that the first cell will be replaced by the second cell, the first cell is not considered by the wireless terminal as a candidate during a cell selection procedure performed by the wireless terminal, the cell selection procedure being initiated after a failure of a handover procedure directed by the reconfiguration message.

As also in the preceding embodiment and modes, the mobile base station relay 112(50) includes gNB controller 201; relay controller 202; and mobile termination (MT) function 204. The mobile base station relay 112a(44) may comprise one or more mobile station relay processors or mobile station processor circuitry, shown generically as mobile station relay processor 200, which in turn may comprise or host at least portions one or more of of gNB controller 201; relay controller 202; and mobile termination (MT) function 204. The mobile termination (MT) function 204 comprises transmitter circuitry 206 and receiver circuitry 208. The gNB controller includes transmission and reception point (TRP) 222, which in turn comprises transmitter 224 and receiver 226.

As understood from FIG. 50 and other example embodiments, mobile base station relay 112(50) communicates with an access node, e.g., Donor gNB 104a(50). Mobile base station relay 112(50) serves a wireless terminal via a first cell, e.g., cell 114a. Mobile base station relay 112(50) comprises receiver circuitry 208 which is configured to receive, from the access node, the reconfiguration message 962. As explained above, the reconfiguration message 962 comprises second cell information including a cell identity and an operating frequency of a second cell and an indication indicating whether or not the first cell will be replaced by the second cell. The transmitter 224 of mobile base station relay 112(50) is configured to transmit the reconfiguration message 962 to the wireless terminal 116a(50) via the first cell 114a. In a case that the indication indicates that the first cell will be replaced by the second cell, the first cell is not considered by wireless terminal 116a(50) as a candidate during a cell selection procedure performed by the wireless terminal. At wireless terminal 116a(50), the cell selection procedure is initiated after a failure of a handover procedure directed by the reconfiguration message.

FIG. 50 shows wireless terminal wireless terminal 116a (50) as comprising transceiver circuitry 276. The transceiver circuitry 276 in turn may comprise transmitter circuitry 277 and receiver circuitry 278. The transceiver circuitry 276 may include antenna(e) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 50 further shows wireless terminal 116a(50) as also comprising wireless terminal processor circuitry, e.g., one or more wireless terminal processor(s) 290. The wireless terminal 116a(50), e.g., wireless terminal processor(s) 290, may comprise frame/message generator/handler 294, handover controller 966, and cell selection controller 968.

As shown in FIG. 51, for example, wireless terminal 116a(50) communicates with a first cell such as cell 114a served by a mobile base station relay such as mobile base station relay 112(50). The wireless terminal 116a(50) comprises receiver circuitry 278 which is configured to receive, from the first cell, a reconfiguration message such as reconfiguration message 962. The reconfiguration message 962 comprises second cell information including a cell identity and an operating frequency of a second cell and an indication indicating whether or not the first cell will be replaced by the second cell. The wireless terminal processor(s) 290 is configured to perform: (1) based on the reconfiguration message, a handover procedure to handover to the second cell, and (2) a cell selection procedure in a case that the handover procedure fails. The handover procedure may be performed by handover controller 966; the cell selection procedure may be performed by cell selection controller 968. The cell selection controller 968 is configured to not consider the first cell as a candidate in a case that the indication indicates that the first cell will be replaced by the second cell. In the sense that cell selection controller 968 is configured to not consider the first cell as a candidate in a case that the indication indicates that the first cell will be replaced by the second cell, the cell selection controller 968 may be referred to as a restrictive or qualified cell selection controller 968.

11.3 Example Operation

Figure 54:
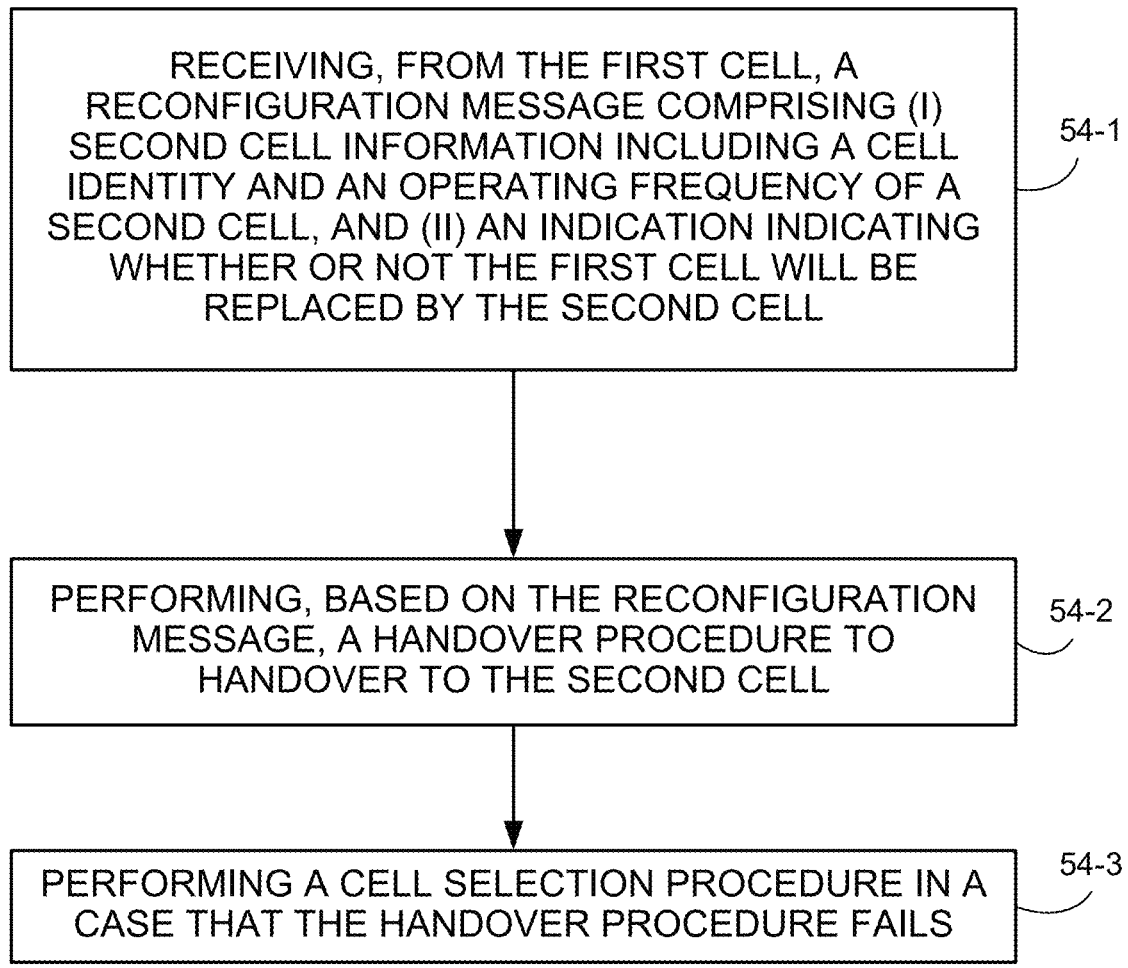
FIG. 54 is a flowchart view showing representative, example steps or acts performed by an example wireless terminal of the communications system of the example embodiment and mode of FIG. 50.

FIG. 54 is a flow chart showing example representative steps or acts performed by a wireless terminal of this embodiment, e.g., wireless terminal 116a of FIG. 50 and FIG. 51, communicating with a first cell served by a mobile base station relay.

Act 54-1 comprises receiving, from the first cell, a reconfiguration message comprising (i) second cell information including a cell identity and an operating frequency of a second cell, and (ii) an indication indicating whether or not the first cell will be replaced by the second cell. In some configurations, the first cell may be replaced by the second cell to avoid a collision of a cell identity of the first cell with other neighboring cells. In addition, the cell identity of the second cell may be different from a cell identity of the first cell. Furthermore, the second cell may be also served by the mobile base station relay.

Act 54-2 comprises performing, based on the reconfiguration message, a handover procedure to handover to the second cell. The handover procedure may be performed by handover controller 966.

Act 54-3 comprises performing a cell selection procedure in a case that the handover procedure fails. The cell selection procedure may be performed by cell selection controller 968. During the cell selection procedure, the first cell may not be considered as a candidate in a case that the indication indicates that the first cell will be replaced by the second cell. The handover procedure may fail in a case that a random access procedure to the second cell fails.

Figure 55:
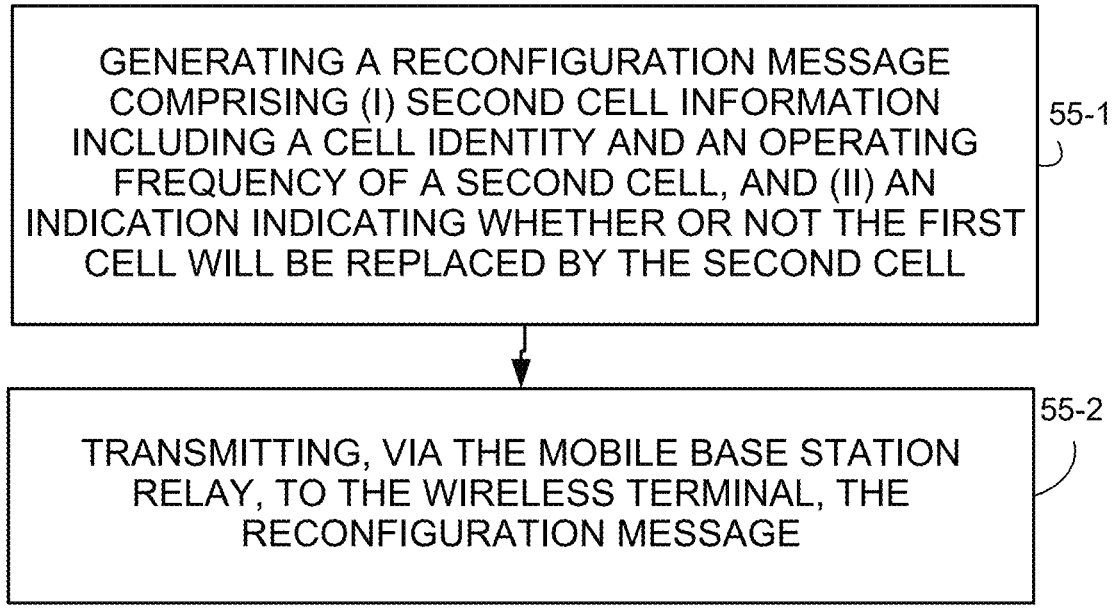
FIG. 55 is a flowchart view showing representative, example steps or acts performed by an example access node of the communications system of the example embodiment and mode of FIG. 50.

FIG. 55 is a flow chart showing example representative steps or acts performed by an access node of this embodiment, e.g., donor gNB 104a of FIG. 50 and FIG. 51, serving a wireless terminal via a first cell served by a mobile base station relay.

Act 55-1 comprises generating a reconfiguration message comprising (i) second cell information including a cell identity and an operating frequency of a second cell, and (ii) an indication indicating whether or not the first cell will be replaced by the second cell. In some configurations, the first cell may be replaced by the second cell to avoid a collision of a cell identity of the first cell with other neighboring cells. In addition, the cell identity of the second cell may be different from a cell identity of the first cell. Furthermore, the second cell may be also served by the mobile base station relay.

Act 55-2 comprises transmitting, via the mobile base station relay, to the wireless terminal, the reconfiguration message. In a case that the indication indicates that the first cell will be replaced by the second cell, the first cell may not be considered as a candidate during a cell selection procedure performed by the wireless terminal. The cell selection procedure may be initiated after a failure of a handover procedure directed by the reconfiguration message. The handover procedure may fail in a case that a random access procedure to the second cell performed fails.

Figure 56:
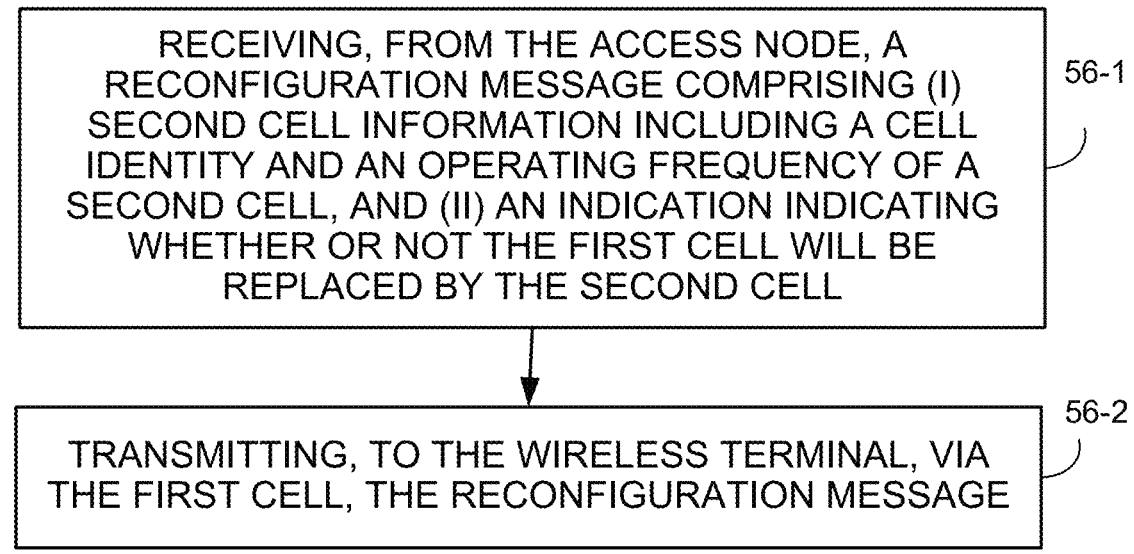
FIG. 56 is a flowchart view showing representative, example steps or acts performed by an example mobile station relay of the communications system of the example embodiment and mode of FIG. 50.

FIG. 56 is a flow chart showing example representative steps or acts performed by a mobile base station relay of this embodiment, e.g., mobile base station relay 112a of FIG. 50 and FIG. 51, communicating with an access node and serving a wireless terminal via a first cell.

Act 56-1 comprises receiving, from the access node, a reconfiguration message comprising (i) second cell information including a cell identity and an operating frequency of a second cell, and (ii) an indication indicating whether or not the first cell will be replaced by the second cell. In some configurations, the first cell may be replaced by the second cell to avoid a collision of a cell identity of the first cell with other neighboring cells. In addition, the cell identity of the second cell may be different from a cell identity of the first cell. Furthermore, the second cell may be also served by the mobile base station relay.

Act 56-2 comprises transmitting, to the wireless terminal, via the first cell, the reconfiguration message. In a case that the indication indicates that the first cell will be replaced by the second cell, the first cell may not be considered as a candidate during a cell selection procedure performed by the wireless terminal. The cell selection procedure may be initiated after a failure of a handover procedure directed by the reconfiguration message. The handover procedure may fail in a case that a random access procedure to the second cell performed fails.

12.0 Further Considerations

Thus, in some of its example aspects the technology disclosed herein involves structure and operation of mobile base station relays and nodes operating in conjunction therewith, including but not limited to the following:

- An access node serving a cell transmits serving cell mobility information comprising mobility state of the cell. A wireless terminal uses the serving cell mobility information to detect the mobility of the cell.
- An access node serving a cell transmits neighboring cell mobility information comprising mobility state of a neighboring cell. A wireless terminal uses the neighboring cell mobility information to detect the mobility of the neighboring cell.
- The serving cell mobility information and/or the neighboring cell mobility information is used for a cell reselection procedure based on mobility state of the serving cell and/or the neighboring cell.
- Neighboring cell relative mobility information is configured to a wireless terminal by a serving cell. The neighboring cell relative mobility information indicates mobility state of a neighboring cell, the mobility state being relative to the serving cell. A cell reselection procedure is performed for the neighboring cell based on the neighboring cell relative mobility information.
- A mobile base station relay mounted on a vehicle transmits, to a wireless terminal, vehicle information comprising information about the vehicle. The wireless terminal may use the vehicle information to perform cell selection/reselection.
- A mobile base station relay provides, to a wireless terminal, via a current cell, a notification of a soft cell identity change and information regarding a new cell that will replace the current cell. The wireless terminal may reselect the new cell based on the notification and the information.
- During a cell reselection procedure, intra-frequency measurements and reselection of a new cell are performed based on whether a soft cell identity change is notified.
- The dedicated cell reselection priorities configured by dedicated signaling may be discarded/invalidated upon receiving information indicating a soft cell identity change to replace the serving cell with an inter-frequency cell.
- A mobile base station relay provides, to a wireless terminal, via a current cell, a notification of a hard cell identity change and information regarding a new cell that will replace the current cell after the current cell gets deactivated. The wireless terminal reselect the new cell based on the notification and the information.
- An access node provides a reconfiguration message comprising (i) second cell information including a cell identity and an operating frequency of a second cell, and (ii) an indication indicating whether or not a first cell (serving cell) will be replaced by the second cell.

It should be understood that the various foregoing example embodiments and modes may be utilized in conjunction with one or more other example embodiments and modes described herein.

Figure 57:
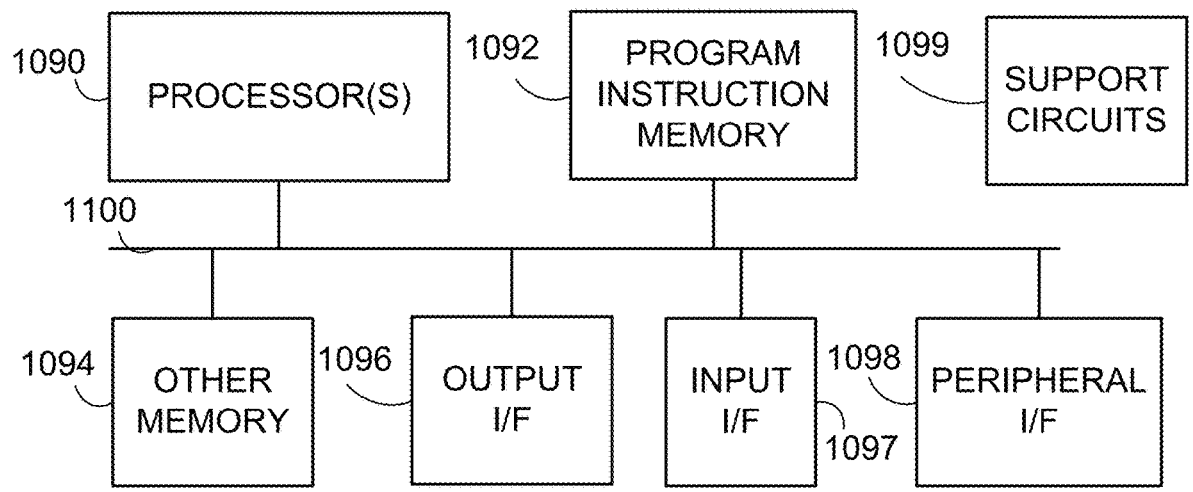
FIG. 57 is a diagrammatic view showing example elements comprising electronic machinery which may comprise a wireless terminal, a radio access node, and a core network node according to an example embodiment and mode.
Figure 58:
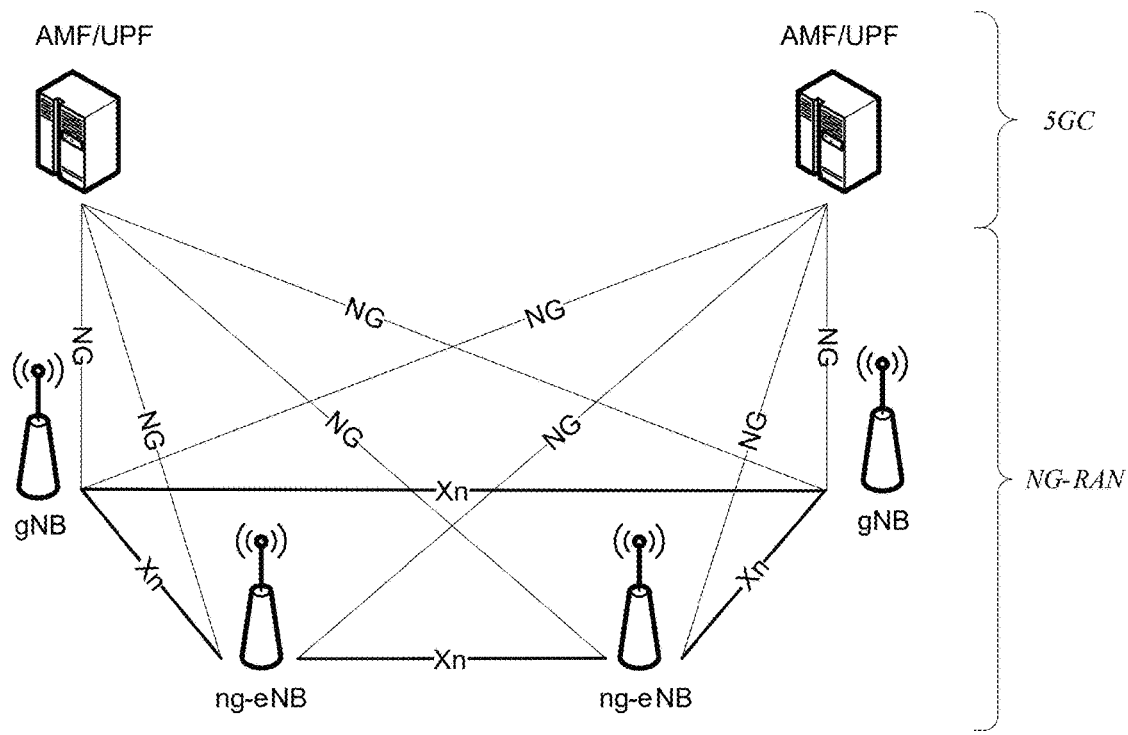
FIG. 58 is a diagrammatic view of overall architecture for a 5G New Radio system.

Certain units and functionalities of the systems 100 may be implemented by electronic machinery. For example, electronic machinery may refer to the processor circuitry described herein, such as terminal processor circuitry 290, mobile station relay processor 200, and node processor(s) 424. Moreover, the term "processor circuitry" is not limited to mean one processor, but may include plural processors, with the plural processors operating at one or more sites. Moreover, as used herein the term "server" is not confined to one server unit but may encompasses plural servers and/or other electronic equipment and may be co-located at one site or distributed to different sites. With these understandings, FIG. 57 shows an example of electronic machinery, e.g., processor circuitry, as comprising one or more processors 1090, program instruction memory 1092; other memory 1094 (e.g., RAM, cache, etc.); input/output interfaces 1096 and 1097, peripheral interfaces 1098; support circuits 1099; and busses 1400 for communication between the aforementioned units. The processor(s) 1090 may comprise the processor circuitries described herein, for example, terminal processor circuitry 290, node processor circuitry 424, and mobile station relay processor 200, or any processor(s) of a network entity of the core network.

A memory or register described herein may be depicted by memory 394, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 1099 are coupled to the processors 1090 for supporting the processor in a conventional manner. These circuits include cache, power supplies, clock circuits, input/output circuitry and subsystems, and the like.

The term "configured" may relate to the capacity of a device whether the device is in an operational or nonoperational state. Configured may also refer to specific settings in a device that effect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided using hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

The technology of the example embodiments and modes described herein encompasses a non-transitory computer readable medium encoded with a computer program that, when executed by a computer or processor of the wireless terminal described herein, causes the computer to implement the acts described herein, and/or a non-transitory computer readable medium encoded with a computer program that, when executed by a computer or processor of the mobile base station relay described herein, causes the computer to implement the acts described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves cell selection in a communications system and may do so by taking neighboring cell relative mobility information into consideration.

The technology disclosed herein encompasses one or more of the following non-limiting, non-exclusive example embodiments and modes:

Example Embodiment 1: Example Embodiment 1: A wireless terminal of a cellular telecommunication system, the wireless terminal communicating with a first cell served by a mobile base station relay, the wireless terminal comprising:
receiver circuitry configured to receive, from the first cell, a reconfiguration message comprising:
second cell information including a cell identity and an operating frequency of a second cell, and;
an indication indicating whether or not the first cell will be replaced by the second cell;
processor circuitry configured to:
perform, based on the reconfiguration message, a handover procedure to handover to the second cell, and;
perform a cell selection procedure in a case that the handover procedure fails;
wherein during the cell selection procedure, the first cell is not considered as a candidate in a case that the indication indicates that the first cell will be replaced by the second cell.

Example Embodiment 2: The wireless terminal of Example Embodiment 1, wherein the handover procedure fails in a case that a random access procedure to the second cell fails.

Example Embodiment 3: The wireless terminal of Example Embodiment 1, wherein the first cell is replaced by the second cell to avoid a collision of a cell identity of the first cell with other neighboring cells.

Example Embodiment 4: The wireless terminal of Example Embodiment 1, wherein the cell identity of the second cell is different from a cell identity of the first cell.

Example Embodiment 5: The wireless terminal of Example Embodiment 1, wherein the second cell is served by the mobile base station relay.

Example Embodiment 6: An access node of a cellular telecommunication system, the access node serving a wireless terminal via a first cell served by a mobile base station relay, the access node comprising:

processor circuitry configured to generate a reconfiguration message comprising:
    second cell information including a cell identity and an operating frequency of a second cell, and;
    an indication indicating whether or not the first cell will be replaced by the second cell;
transmitter circuitry configured to transmit, via the mobile base station relay, to the wireless terminal, the reconfiguration message;
wherein in a case that the indication indicates that the first cell will be replaced by the second cell, the first cell is not considered as a candidate during a cell selection procedure performed by the wireless terminal, the cell selection procedure being initiated after a failure of a handover procedure directed by the reconfiguration message.

Example Embodiment 7: The access node of Example Embodiment 6, wherein the handover procedure fails in a case that a random access procedure to the second cell performed fails.

Example Embodiment 8: The access node of Example Embodiment 6, wherein the first cell is replaced by the second cell to avoid a collision of a cell identity of the first cell with other neighboring cells.

Example Embodiment 9: The access node of Example Embodiment 6, wherein the cell identity of the second cell is different from a cell identity of the first cell.

Example Embodiment 10: The access node of Example Embodiment 6, wherein the second cell is served by the mobile base station relay.

Example Embodiment 11: A mobile base station relay of a cellular telecommunication system, the mobile base station relay communicating with an access node, the mobile base station relay serving a wireless terminal via a first cell, the mobile base station relay comprising:
    receiver circuitry configured to receive, from the access node, a reconfiguration message comprising:
        second cell information including a cell identity and an operating frequency of a second cell, and;
        an indication indicating whether or not the first cell will be replaced by the second cell;
    transmitter circuitry configured to transmit, to the wireless terminal, via the first cell, the reconfiguration message;
    wherein in a case that the indication indicates that the first cell will be replaced by the second cell, the first cell is not considered as a candidate during a cell selection procedure performed by the wireless terminal, the cell selection procedure being initiated after a failure of a handover procedure directed by the reconfiguration message.

Example Embodiment 12: The mobile base station relay of Example Embodiment 11, wherein the handover procedure fails in a case that a random access procedure to the second cell performed fails.

Example Embodiment 13: The mobile base station relay of Example Embodiment 11, wherein the first cell is replaced by the second cell to avoid a collision of a cell identity of the first cell with other neighboring cells.

Example Embodiment 14: The mobile base station relay of Example Embodiment 11, wherein the cell identity of the second cell is different from a cell identity of the first cell.

Example Embodiment 15: The mobile base station relay of Example Embodiment 11, wherein the second cell is served by the mobile base station relay.

One or more of the following documents may be pertinent to the technology disclosed herein (all of which are incorporated herein by reference in their entirety):
    3GPP TS 38.304 v17.1.0
    3GPP TS 38.331 v17.1.0
    3GPP TR 22.839 v18.1.0

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal of a cellular telecommunication system, the wireless terminal communicating with a first cell served by a mobile base station relay, the wireless terminal comprising:
    receiver circuitry configured to receive, from the first cell, a reconfiguration message comprising:
        second cell information including a cell identity and an operating frequency of a second cell, and;
        an indication indicating whether or not the first cell will be shut down and replaced by the second cell;
    processor circuitry configured to:
        perform, based on the reconfiguration message, a handover procedure to handover to the second cell, and;
        perform a cell reselection procedure in a case that the handover procedure fails;
    wherein during the cell reselection procedure, the first cell is not considered as a candidate in a case that the indication indicates that the first cell will be shut down and replaced by the second cell.

2. The wireless terminal of claim 1, wherein the handover procedure fails in a case that a random access procedure to the second cell fails.

3. The wireless terminal of claim 1, wherein the cell identity of the second cell is different from a cell identity of the first cell.

4. The wireless terminal of claim 1, wherein the second cell is served by the mobile base station relay.

5. An access node of a cellular telecommunication system, the access node serving a wireless terminal via a first cell served by a mobile base station relay, the access node comprising:
    processor circuitry configured to generate a reconfiguration message comprising:

second cell information including a cell identity and an operating frequency of a second cell, and;

an indication indicating whether or not the first cell will be deactivated shut down and replaced by the second cell;

transmitter circuitry configured to transmit, via the mobile base station relay, to the wireless terminal, the reconfiguration message;

wherein in a case that the indication indicates that the first cell will be shut down and replaced by the second cell, the first cell is not considered as a candidate during a cell reselection procedure performed by the wireless terminal, the cell reselection procedure being initiated after a failure of a handover procedure directed by the reconfiguration message.

6. The access node of claim 5, wherein the handover procedure fails in a case that a random access procedure to the second cell performed fails.

7. The access node of claim 5, wherein the cell identity of the second cell is different from a cell identity of the first cell.

8. The access node of claim 5, wherein the second cell is served by the mobile base station relay.

9. A mobile base station relay of a cellular telecommunication system, the mobile base station relay communicating with an access node, the mobile base station relay serving a wireless terminal via a first cell, the mobile base station relay comprising:

receiver circuitry configured to receive, from the access node, a reconfiguration message comprising:

second cell information including a cell identity and an operating frequency of a second cell, and;

an indication indicating whether or not the first cell will be shut down and replaced by the second cell;

transmitter circuitry configured to transmit, to the wireless terminal, via the first cell, the reconfiguration message;

wherein in a case that the indication indicates that the first cell will be shut down and replaced by the second cell, the first cell is not considered as a candidate during a cell reselection procedure performed by the wireless terminal, the cell reselection procedure being initiated after a failure of a handover procedure directed by the reconfiguration message.

10. The mobile base station relay of claim 9, wherein the handover procedure fails in a case that a random access procedure to the second cell performed fails.

11. The mobile base station relay of claim 9, wherein the cell identity of the second cell is different from a cell identity of the first cell.

12. The mobile base station relay of claim 9, wherein the second cell is served by the mobile base station relay.

\* \* \* \* \*